(12) United States Patent
Jo et al.

(10) Patent No.: US 11,840,447 B1
(45) Date of Patent: Dec. 12, 2023

(54) SYSTEMS AND METHODS OF PROCESSING AMMONIA

(71) Applicant: AMOGY Inc., Brooklyn, NY (US)

(72) Inventors: Young Suk Jo, Brooklyn, NY (US); Gregory Robert Johnson, Annandale, NJ (US); Hyunho Kim, Brooklyn, NY (US)

(73) Assignee: AMOGY Inc., Brooklyn, NY (US)

( * ) Notice: Subject to any disclaimer, the term of this patent is extended or adjusted under 35 U.S.C. 154(b) by 0 days.

(21) Appl. No.: 17/975,184

(22) Filed: Oct. 27, 2022

Related U.S. Application Data

(63) Continuation of application No. 17/974,885, filed on Oct. 27, 2022, and a continuation of application No. 17/974,997, filed on Oct. 27, 2022.
(Continued)

(51) Int. Cl.
 *C01B 3/04* (2006.01)

(52) U.S. Cl.
 CPC ...... *C01B 3/047* (2013.01); *C01B 2203/0244* (2013.01); *C01B 2203/066* (2013.01);
(Continued)

(58) Field of Classification Search
 CPC ......... B63B 39/03; B63B 43/06; B63B 13/00; B63B 2211/00; B63B 25/002; B63B 34/05; B63B 34/26; B63B 1/048; B63B 1/107; B63B 2001/044; B63B 2001/145; B63B 2035/442; B63B 2035/446; B63B 2035/4466; B63B 2043/047; B63B 43/14;
(Continued)

(56) References Cited

U.S. PATENT DOCUMENTS

| 2,013,809 A | 9/1935 | Hall |
| 3,198,604 A | 8/1965 | Pfefferle |
| (Continued) | | |

FOREIGN PATENT DOCUMENTS

| AU | 2020267318 A1 | 6/2021 |
| CA | 2676027 A1 | 8/2008 |
| (Continued) | | |

OTHER PUBLICATIONS

Metkemeijer et al. "Ammonia as a feedstock for a hydrogen fuel cell; reformer and fuel cell behaviour" Journal of Power Sources, 49 (1994) 271-282 (Year: 1994).*
(Continued)

*Primary Examiner* — Steven J Bos
*Assistant Examiner* — Syed T Iqbal
(74) *Attorney, Agent, or Firm* — Wilson Sonsini Goodrich & Rosati

(57) ABSTRACT

The present disclosure provides systems and methods for processing ammonia. A heater may heat reformers, where the reformers comprise ammonia ($NH_3$) reforming catalysts in thermal communication with the heater. $NH_3$ may be directed to the reformers from storage tanks, and the $NH_3$ may be decomposed to generate a reformate stream comprising hydrogen ($H_2$) and nitrogen ($N_2$). At least part of the reformate stream can be used to heat reformers. Additionally, the reformate stream can be directed to a hydrogen processing module such as a fuel cell.

48 Claims, 39 Drawing Sheets

Related U.S. Application Data

(60) Provisional application No. 63/413,717, filed on Oct. 6, 2022.

(52) U.S. Cl.
CPC .............. *C01B 2203/0811* (2013.01); *C01B 2203/1614* (2013.01)

(58) Field of Classification Search
CPC ......... B63B 75/00; B63B 77/00; B63H 21/32; B63H 21/00
See application file for complete search history.

(56) References Cited

U.S. PATENT DOCUMENTS

| | | | |
|---|---|---|---|
| 3,352,716 A | 11/1967 | Olle | |
| 3,689,042 A | 9/1972 | Pere et al. | |
| 3,807,963 A | 4/1974 | Smith | |
| 4,155,986 A | 5/1979 | Gladden | |
| 5,055,282 A | 10/1991 | Shikada et al. | |
| 5,912,198 A | 6/1999 | Feitelberg et al. | |
| 6,350,540 B1 | 2/2002 | Sugita et al. | |
| 6,555,084 B2 | 4/2003 | Ohtsuka | |
| 6,936,363 B2 | 8/2005 | Kordesch et al. | |
| 6,984,750 B2 | 1/2006 | Chaturvedi et al. | |
| 7,071,239 B2 | 7/2006 | Ortego, Jr. et al. | |
| 7,157,166 B2 | 1/2007 | Vajo | |
| 7,160,360 B2 | 1/2007 | Wu et al. | |
| 7,220,699 B2 | 5/2007 | Chellappa | |
| 7,276,214 B2 | 10/2007 | Johnston et al. | |
| 7,282,467 B2 | 10/2007 | Huisman et al. | |
| 7,294,425 B2 | 11/2007 | Hodge et al. | |
| 7,374,838 B2 | 5/2008 | Gallagher | |
| 7,439,273 B2 | 10/2008 | Woods et al. | |
| 7,569,294 B2 | 8/2009 | Graham et al. | |
| 7,662,435 B2 | 2/2010 | Chellappa et al. | |
| 7,670,587 B2 | 3/2010 | Porter et al. | |
| 7,731,918 B2 | 6/2010 | Chellappa | |
| 7,763,086 B2 | 7/2010 | Woods et al. | |
| 7,803,496 B2 | 9/2010 | Koyama et al. | |
| 7,862,631 B2 | 1/2011 | Burch et al. | |
| 8,043,767 B2 | 10/2011 | Benson | |
| 8,166,926 B2 | 5/2012 | Sasaki et al. | |
| 8,440,357 B2 | 5/2013 | Hossain et al. | |
| 8,617,265 B2 | 12/2013 | Chellappa | |
| 8,664,148 B2 | 3/2014 | Brey et al. | |
| 8,795,918 B2 | 8/2014 | Shimomura | |
| 8,877,407 B2 | 11/2014 | Akiyama | |
| 8,900,420 B2 | 12/2014 | Veeraraghavan et al. | |
| 8,916,300 B2 | 12/2014 | McElroy et al. | |
| 8,921,000 B2 | 12/2014 | Takeshita et al. | |
| 8,932,773 B2 | 1/2015 | Nakanishi et al. | |
| 8,961,923 B2 | 2/2015 | Grannell et al. | |
| 9,023,542 B2 | 5/2015 | Kaneko et al. | |
| 9,105,891 B2 | 8/2015 | Nagaosa | |
| 9,163,541 B2 | 10/2015 | Kumagai et al. | |
| 9,172,106 B2 | 10/2015 | Berning | |
| 9,187,321 B2 | 11/2015 | Fuse et al. | |
| 9,236,624 B2 | 1/2016 | Page et al. | |
| 9,341,111 B2 | 5/2016 | Hikazudani et al. | |
| 9,359,270 B2 | 6/2016 | Daly et al. | |
| 9,359,271 B2 | 6/2016 | LeViness et al. | |
| 9,506,400 B2 | 11/2016 | Tange et al. | |
| 9,670,063 B2 | 6/2017 | David et al. | |
| 9,737,869 B2 | 8/2017 | Kamata et al. | |
| 9,819,040 B2 | 11/2017 | Littau | |
| 9,861,951 B2 | 1/2018 | Vu | |
| 9,884,770 B2 | 2/2018 | Takeshima | |
| 9,896,332 B2 | 2/2018 | Hikazudani et al. | |
| 9,958,211 B2 | 5/2018 | Vernon | |
| 10,166,526 B2 | 1/2019 | Hamada et al. | |
| 10,322,940 B2 | 6/2019 | Hosono et al. | |
| 10,449,506 B2 | 10/2019 | Kamata et al. | |
| 10,450,192 B2 | 10/2019 | Finkelshtain et al. | |
| 10,478,805 B2 | 11/2019 | Hinokuma et al. | |
| 10,596,551 B2 | 3/2020 | Sharma et al. | |
| 10,830,125 B2 | 11/2020 | Pomar | |
| 10,875,002 B2 | 12/2020 | Patel et al. | |
| 10,906,804 B2 | 2/2021 | Li et al. | |
| 10,914,212 B1 | 2/2021 | Bargman et al. | |
| 10,919,025 B2 | 2/2021 | Li et al. | |
| 10,961,890 B2 | 3/2021 | Sung et al. | |
| 11,014,809 B2 | 5/2021 | Miura | |
| 11,038,181 B2 | 6/2021 | Kandlikar | |
| 11,065,591 B2 | 7/2021 | Speth et al. | |
| 11,084,012 B2 | 8/2021 | Jiang et al. | |
| 11,084,719 B2 | 8/2021 | Andersen et al. | |
| 11,110,434 B2 | 9/2021 | Jiang et al. | |
| 11,117,809 B2 | 9/2021 | Hojlund Nielsen | |
| 11,148,955 B2 | 10/2021 | Gorval et al. | |
| 11,149,662 B2 | 10/2021 | Heggen | |
| 11,156,168 B2 | 10/2021 | Nose et al. | |
| 11,161,739 B2 | 11/2021 | Gray | |
| 11,167,732 B1 | 11/2021 | Cohen et al. | |
| 11,287,089 B1 | 3/2022 | Cohen et al. | |
| 11,305,250 B2 | 4/2022 | Verykios et al. | |
| 11,309,568 B2 | 4/2022 | Achrai et al. | |
| 11,374,246 B2 | 6/2022 | Luo et al. | |
| 11,437,637 B2 | 9/2022 | Ikemoto et al. | |
| 11,465,114 B2 | 10/2022 | Jo et al. | |
| 11,539,063 B1 | 12/2022 | Choi et al. | |
| 2002/0028171 A1 | 3/2002 | Goetsch et al. | |
| 2003/0015093 A1 | 1/2003 | Wegeng et al. | |
| 2003/0189037 A1 | 10/2003 | Kochman et al. | |
| 2004/0163313 A1 | 8/2004 | Buxbaum | |
| 2004/0261379 A1 | 12/2004 | Bruun et al. | |
| 2006/0112636 A1 | 6/2006 | Chellappa et al. | |
| 2006/0121322 A1 | 6/2006 | Haas et al. | |
| 2007/0051041 A1 | 3/2007 | Genkin et al. | |
| 2007/0190389 A1 | 8/2007 | Hinsenkamp et al. | |
| 2007/0221060 A1 | 9/2007 | Song | |
| 2007/0254204 A1 | 11/2007 | Shin et al. | |
| 2008/0145733 A1 | 6/2008 | Asazawa et al. | |
| 2008/0171255 A1 | 7/2008 | Brantley et al. | |
| 2010/0060404 A1 | 3/2010 | Raiser et al. | |
| 2011/0136027 A1 | 6/2011 | Chen et al. | |
| 2012/0088168 A1 | 4/2012 | Pledger | |
| 2012/0121488 A1 | 5/2012 | Comrie | |
| 2012/0148925 A1 | 6/2012 | Grannell et al. | |
| 2013/0037122 A1 | 2/2013 | Nager et al. | |
| 2013/0084508 A1 | 4/2013 | Yukimasa et al. | |
| 2013/0140295 A1 | 6/2013 | Yoshioka et al. | |
| 2013/0189603 A1 | 7/2013 | Sakamoto et al. | |
| 2014/0105816 A1* | 4/2014 | Grannell ................ | C01B 3/06 422/198 |
| 2014/0287911 A1 | 9/2014 | Wang et al. | |
| 2014/0356738 A1 | 12/2014 | Bell et al. | |
| 2016/0167962 A1 | 6/2016 | Hikazudani et al. | |
| 2016/0375985 A1 | 12/2016 | Ribarov et al. | |
| 2017/0070088 A1 | 3/2017 | Berntsen et al. | |
| 2018/0015443 A1 | 1/2018 | Finkelshtain et al. | |
| 2018/0230006 A1 | 8/2018 | Finkelshtain et al. | |
| 2018/0261856 A1 | 9/2018 | Akashi et al. | |
| 2020/0032676 A1 | 1/2020 | Nose et al. | |
| 2020/0062590 A1 | 2/2020 | McCullough et al. | |
| 2020/0099072 A1 | 3/2020 | Ikemoto et al. | |
| 2020/0123006 A1 | 4/2020 | Speth et al. | |
| 2020/0197889 A1 | 6/2020 | Jo et al. | |
| 2020/0266469 A1 | 8/2020 | Kojima et al. | |
| 2020/0269208 A1 | 8/2020 | Way et al. | |
| 2020/0346937 A1 | 11/2020 | Beach et al. | |
| 2020/0388869 A1 | 12/2020 | Galbiati | |
| 2020/0398240 A1 | 12/2020 | Jiang et al. | |
| 2020/0403258 A1 | 12/2020 | Luo et al. | |
| 2021/0001311 A1 | 1/2021 | Wu et al. | |
| 2021/0113983 A1 | 4/2021 | Mortensen et al. | |
| 2021/0178377 A1 | 6/2021 | Khatiwada et al. | |
| 2021/0178378 A1 | 6/2021 | Khatiwada et al. | |
| 2021/0234179 A1 | 7/2021 | Klein et al. | |
| 2021/0237046 A1 | 8/2021 | Gascon et al. | |
| 2021/0245139 A1 | 8/2021 | Seabaugh et al. | |
| 2021/0395082 A1 | 12/2021 | Iwai | |
| 2021/0395101 A1 | 12/2021 | Giddey et al. | |
| 2021/0395883 A1 | 12/2021 | Dip | |

(56) References Cited

U.S. PATENT DOCUMENTS

| | | |
|---|---|---|
| 2022/0002151 A1 | 1/2022 | Katikaneni et al. |
| 2022/0090576 A1 | 3/2022 | Sia |
| 2022/0119250 A1 | 4/2022 | Shin et al. |
| 2022/0154646 A1 | 5/2022 | Araki et al. |
| 2022/0158202 A1 | 5/2022 | Nishibayashi et al. |
| 2022/0162490 A1 | 5/2022 | Jo et al. |
| 2022/0162989 A1 | 5/2022 | Cocks et al. |
| 2022/0162999 A1 | 5/2022 | Cocks et al. |
| 2022/0163002 A1 | 5/2022 | Takeuchi |
| 2022/0195919 A1 | 6/2022 | Akbari et al. |
| 2022/0205415 A1 | 6/2022 | Takeuchi et al. |
| 2022/0212172 A1 | 7/2022 | Song et al. |
| 2022/0234886 A1 | 7/2022 | Yamazaki et al. |
| 2022/0347644 A1 | 11/2022 | Jo et al. |
| 2022/0362748 A1 | 11/2022 | Jo et al. |
| 2022/0364505 A1 | 11/2022 | Kim et al. |
| 2022/0389864 A1 | 12/2022 | Jo et al. |
| 2022/0395810 A1 | 12/2022 | Sheludko et al. |
| 2022/0395812 A1 | 12/2022 | Sheludko et al. |
| 2022/0403775 A1 | 12/2022 | Jo et al. |
| 2023/0001377 A1 | 1/2023 | Jo et al. |
| 2023/0053230 A1 | 2/2023 | Jo et al. |
| 2023/0053549 A1 | 2/2023 | Choi et al. |
| 2023/0055180 A1 | 2/2023 | Choi et al. |
| 2023/0055949 A1 | 2/2023 | Choi et al. |

FOREIGN PATENT DOCUMENTS

| | | |
|---|---|---|
| CA | 3132213 A1 | 9/2020 |
| CN | 101172575 A | 5/2008 |
| CN | 106517092 A | 3/2017 |
| CN | 210528460 U | 5/2020 |
| CN | 111332447 A | 6/2020 |
| CN | 210973870 U | 7/2020 |
| CN | 112901339 A | 6/2021 |
| CN | 113048469 A | 6/2021 |
| CN | 113058595 A | 7/2021 |
| CN | 113058610 A | 7/2021 |
| CN | 113074046 A | 7/2021 |
| CN | 113181957 A | 7/2021 |
| CN | 213651846 U | 7/2021 |
| CN | 213726378 U | 7/2021 |
| CN | 213738601 U | 7/2021 |
| CN | 113198476 A | 8/2021 |
| CN | 113202660 A | 8/2021 |
| CN | 113289693 A | 8/2021 |
| CN | 213943062 U | 8/2021 |
| CN | 213976966 U | 8/2021 |
| CN | 214059903 U | 8/2021 |
| CN | 214060653 U | 8/2021 |
| CN | 113332987 A | 9/2021 |
| CN | 113363545 A | 9/2021 |
| CN | 113451615 A | 9/2021 |
| CN | 113540541 A | 10/2021 |
| CN | 214399815 U | 10/2021 |
| CN | 214406970 U | 10/2021 |
| CN | 214406981 U | 10/2021 |
| CN | 214486811 U | 10/2021 |
| CN | 113604813 A | 11/2021 |
| CN | 113666334 A | 11/2021 |
| CN | 113694922 A | 11/2021 |
| CN | 214611516 U | 11/2021 |
| CN | 214716493 U | 11/2021 |
| CN | 214753865 U | 11/2021 |
| CN | 214880199 U | 11/2021 |
| CN | 214959115 U | 11/2021 |
| CN | 214959751 U | 11/2021 |
| CN | 113775924 A | 12/2021 |
| CN | 113788134 A | 12/2021 |
| CN | 113864783 A | 12/2021 |
| CN | 214990264 U | 12/2021 |
| CN | 215002336 U | 12/2021 |
| CN | 215066412 U | 12/2021 |
| CN | 215364901 U | 12/2021 |
| CN | 113896168 A | 1/2022 |
| CN | 215578650 U | 1/2022 |
| CN | 215592611 U | 1/2022 |
| DE | 102010006153 A1 | 8/2011 |
| DE | 102017011833 A1 | 6/2019 |
| DK | 201900097 U3 | 3/2020 |
| EP | 2070141 B1 | 12/2012 |
| EP | 2774202 B1 | 8/2015 |
| EP | 1868941 B9 | 2/2017 |
| EP | 3028990 B1 | 8/2017 |
| EP | 3059206 B1 | 8/2017 |
| EP | 3258524 A1 | 12/2017 |
| EP | 2715847 B1 | 1/2019 |
| EP | 3448803 A1 | 3/2019 |
| EP | 3632543 A1 | 4/2020 |
| EP | 2332646 B1 | 7/2020 |
| EP | 3409354 B1 | 9/2021 |
| EP | 3878806 A1 | 9/2021 |
| EP | 3015164 B1 | 2/2022 |
| EP | 3981054 A1 | 4/2022 |
| EP | 3981739 A1 | 4/2022 |
| EP | 4017947 A1 | 6/2022 |
| IN | 394309 B | 4/2022 |
| JP | 2005145748 A | 6/2005 |
| JP | 3940551 B2 | 7/2007 |
| JP | 2008153091 A | 7/2008 |
| JP | 2009035458 A | 2/2009 |
| JP | 2010195642 A | 9/2010 |
| JP | 4666301 B2 | 4/2011 |
| JP | 2012005926 A | 1/2012 |
| JP | 5263677 B2 | 8/2013 |
| JP | 5272762 B2 | 8/2013 |
| JP | 5272767 B2 | 8/2013 |
| JP | 5321230 B2 | 10/2013 |
| JP | 5346693 B2 | 11/2013 |
| JP | 5352343 B2 | 11/2013 |
| JP | 5371542 B2 | 12/2013 |
| JP | 5380233 B2 | 1/2014 |
| JP | 5389525 B2 | 1/2014 |
| JP | 5426201 B2 | 2/2014 |
| JP | 5430224 B2 | 2/2014 |
| JP | 5755160 B2 | 7/2015 |
| JP | 5810710 B2 | 11/2015 |
| JP | 5811494 B2 | 11/2015 |
| JP | 2016131065 A | 7/2016 |
| JP | 2016198720 A | 12/2016 |
| JP | 6308844 B2 | 4/2018 |
| JP | 2018076214 A | 5/2018 |
| JP | 6381131 B2 | 8/2018 |
| JP | 6482022 B2 | 3/2019 |
| JP | 2019053854 A | 4/2019 |
| JP | 2019177381 A | 10/2019 |
| JP | 6604501 B2 | 11/2019 |
| JP | 2020040860 A | 3/2020 |
| JP | WO2018221701 A1 | 4/2020 |
| JP | 6706277 B2 | 6/2020 |
| JP | 6778370 B2 | 11/2020 |
| JP | 6789080 B2 | 11/2020 |
| JP | 2020183337 A | 11/2020 |
| JP | 2020196646 A | 12/2020 |
| JP | 2020197169 A | 12/2020 |
| JP | 6850449 B2 | 3/2021 |
| JP | 6866570 B2 | 4/2021 |
| JP | 2021095300 A | 6/2021 |
| JP | 2021110463 A | 8/2021 |
| JP | 6929045 B2 | 9/2021 |
| JP | 6938186 B2 | 9/2021 |
| JP | 2021127861 A | 9/2021 |
| JP | 2021128904 A | 9/2021 |
| JP | 2021130100 A | 9/2021 |
| JP | 2021161006 A | 10/2021 |
| JP | 2021161921 A | 10/2021 |
| JP | 2021173232 A | 11/2021 |
| JP | 6996181 B2 | 2/2022 |
| JP | 7036318 B2 | 3/2022 |
| JP | 7074103 B2 | 5/2022 |
| JP | 7076930 B2 | 5/2022 |
| JP | 7079068 B2 | 6/2022 |
| KR | 20040039951 A | 5/2004 |
| KR | 101173456 B1 | 8/2012 |

(56) References Cited

FOREIGN PATENT DOCUMENTS

| | | |
|---|---|---|
| KR | 101388755 B1 | 4/2014 |
| KR | 101768078 B1 | 8/2017 |
| KR | 102159237 B1 | 9/2020 |
| KR | 102174654 B1 | 11/2020 |
| KR | 102219136 B1 | 2/2021 |
| KR | 102247199 B1 | 5/2021 |
| KR | 102254196 B1 | 5/2021 |
| KR | 102256907 B1 | 5/2021 |
| KR | 102303094 B1 | 9/2021 |
| KR | 102304381 B1 | 9/2021 |
| KR | 102304406 B1 | 9/2021 |
| KR | 102309466 B1 | 10/2021 |
| KR | 102315763 B1 | 10/2021 |
| KR | 20210136381 A | 11/2021 |
| KR | 102335322 B1 | 12/2021 |
| KR | 20220005829 A | 1/2022 |
| KR | 102392578 B1 | 5/2022 |
| KR | 20220057717 A | 5/2022 |
| KR | 20220093960 A | 7/2022 |
| KR | 20220094475 A | 7/2022 |
| NL | 2017963 B1 | 6/2018 |
| TW | 1274604 B | 3/2007 |
| WO | WO-9840311 A1 | 9/1998 |
| WO | WO-0183108 A1 | 11/2001 |
| WO | WO-0187770 A1 | 11/2001 |
| WO | WO-0208117 A1 | 1/2002 |
| WO | WO-02071451 A2 | 9/2002 |
| WO | WO-2005091418 A2 | 9/2005 |
| WO | WO-2005099885 A1 | 10/2005 |
| WO | WO-2006113451 A2 | 10/2006 |
| WO | WO-2006134419 A2 | 12/2006 |
| WO | WO-2007119262 A2 | 10/2007 |
| WO | WO-2008024089 A2 | 2/2008 |
| WO | WO-2008088319 A2 | 7/2008 |
| WO | WO-2009098452 A2 | 8/2009 |
| WO | WO-2009116679 A1 | 9/2009 |
| WO | WO-2010116874 A3 | 4/2011 |
| WO | WO-2011107279 A1 | 9/2011 |
| WO | WO-2012039183 A1 | 3/2012 |
| WO | WO-2013057473 A1 | 4/2013 |
| WO | WO-2013063169 A1 | 5/2013 |
| WO | WO-2013122849 A1 | 8/2013 |
| WO | WO-2013142123 A1 | 9/2013 |
| WO | WO-2014054277 A1 | 4/2014 |
| WO | WO-2015044691 A1 | 4/2015 |
| WO | WO-2015074127 A1 | 5/2015 |
| WO | WO-2016013652 A1 | 1/2016 |
| WO | WO-2016051633 A1 | 4/2016 |
| WO | WO-2017099143 A1 | 6/2017 |
| WO | WO-2017186614 A1 | 11/2017 |
| WO | WO-2018185663 A1 | 10/2018 |
| WO | WO-2018198635 A1 | 11/2018 |
| WO | WO-2019032591 A1 | 2/2019 |
| WO | WO-2019038251 A1 | 2/2019 |
| WO | WO-2021063795 A1 | 4/2021 |
| WO | WO-2021156626 A1 | 8/2021 |
| WO | WO-2021168226 A1 | 8/2021 |
| WO | WO-2021172545 A1 | 9/2021 |
| WO | WO-2021177359 A2 | 9/2021 |
| WO | WO-2021221943 A1 | 11/2021 |
| WO | WO-2021225254 A1 | 11/2021 |
| WO | WO-2021228428 A1 | 11/2021 |
| WO | WO-2021241841 A1 | 12/2021 |
| WO | WO-2021260108 A1 | 12/2021 |
| WO | WO-2022010178 A1 | 1/2022 |
| WO | WO-2022055225 A1 | 3/2022 |
| WO | WO-2021257944 A9 | 4/2022 |
| WO | WO-2022070597 A1 | 4/2022 |
| WO | WO-2022076341 A1 | 4/2022 |
| WO | WO-2022079435 A1 | 4/2022 |
| WO | WO-2022106568 A1 | 5/2022 |
| WO | WO-2022119376 A1 | 6/2022 |
| WO | WO-2022129294 A1 | 6/2022 |
| WO | WO-2022153059 A1 | 7/2022 |
| WO | WO-2022153060 A1 | 7/2022 |
| WO | WO-2022153061 A1 | 7/2022 |
| WO | WO-2022153718 A1 | 7/2022 |
| WO | WO-2022153719 A1 | 7/2022 |
| WO | WO-2022153720 A1 | 7/2022 |
| WO | WO-2022241260 A1 | 11/2022 |
| WO | WO-2022261488 A1 | 12/2022 |
| WO | WO-2023022995 A1 | 2/2023 |

OTHER PUBLICATIONS

Co-pending U.S. Appl. No. 17/401,993, inventors Jo; Young Suk et al., filed Aug. 13, 2021.

Co-pending U.S. Appl. No. 17/501,090, inventor Mann; Maxwell Spencer, filed Oct. 14, 2021.

Co-pending U.S. Appl. No. 17/968,109, inventors Choi; Jongwon et al., filed Oct. 18, 2022.

Co-pending U.S. Appl. No. 17/968,125, inventors Choi; Jongwon et al., filed Oct. 18, 2022.

Co-pending U.S. Appl. No. 17/968,211, inventors Choi; Jongwon et al., filed Oct. 18, 2022.

Co-pending U.S. Appl. No. 17/974,997, inventors Jo; Young Suk et al., filed Oct. 27, 2022.

Co-pending U.S. Appl. No. 18/065,915, inventors Sheludko; Boris et al., filed Dec. 14, 2022.

Co-pending U.S. Appl. No. 18/066,163, inventors Sheludko; Boris et al., filed Dec. 14, 2022.

Co-pending U.S. Appl. No. 18/081,512, inventors Jo; Young Suk et al., filed Dec. 14, 2022.

Gallucci, M. The Ammonia Solution: Ammonia engines and fuel cells in cargo ships could slash their carbon emissions. IEEE Spectrum. 58(3): 44-50. Mar. 2021. doi: 10.1109/MSPEC.2021.9370109.

Hansgen, et al. Using first principles to predict bimetallic catalysts for the ammonia decomposition reaction. Nat Chem. Jun. 2010;2(6):484-489. doi: 10.1038/nchem.626. Epub Apr. 25, 2010.

International search report with written opinion dated Sep. 21, 2022 for PCT/US2022/029264.

Kumar S. Heat Exchanger—Types, Working, Construction. https://marinerspoint.in/working-of-heatexchanger/2020/11/, Nov. 4, 2020, 9 pages.

Machine Translation of JP 2020-040860 A (Year: 2020).

Notice of Allowance dated Aug. 11, 2022 for U.S. Appl. No. 17/589,287.

Notice of Allowance dated Sep. 14, 2022 for U.S. Appl. No. 17/589,287.

Office action dated Jun. 2, 2022 for U.S. Appl. No. 17/589,287.

Office action dated Nov. 17, 2022 for U.S. Appl. No. 17/401,993.

Co-pending U.S. Appl. No. 17/974,885, inventors Jo; Young Suk et al., filed Oct. 27, 2022.

Office action dated Jan. 27, 2023 for U.S. Appl. No. 17/974,885.

Office action dated Feb. 14, 2023 for U.S. Appl. No. 17/974,997.

Office action dated Mar. 9, 2023 for U.S. Appl. No. 17/366,633.

Translation of DE102010006153A1 (Year: 2011).

Notice of Allowance dated Jun. 1, 2023 for U.S. Appl. No. 17/974,885.

Notice of Allowance dated Jun. 12, 2023 for U.S. Appl. No. 18/081,512.

Notice of Allowance dated Jul. 14, 2023 for U.S. Appl. No. 17/401,993.

Notice of Allowance dated Jul. 24, 2023 for U.S. Appl. No. 17/974,997.

Notice of Allowance dated Aug. 4, 2023 for U.S. Appl. No. 17/889,260.

Notice of Allowance dated Aug. 7, 2023 for U.S. Appl. No. 17/889,256.

Office action dated May 12, 2023 for U.S. Appl. No. 17/889,256.

Office action dated May 19, 2023 for U.S. Appl. No. 18/081,512.

Office action dated Jun. 15, 2023 for U.S. Appl. No. 17/889,260.

Notice of Allowance dated Aug. 30, 2023 for U.S. Appl. No. 17/974,997.

Notice of Allowance dated Aug. 31, 2023 for U.S. Appl. No. 17/889,256.

Notice of Allowance dated Sep. 12, 2023 for U.S. Appl. No. 17/889,260.

(56) References Cited

OTHER PUBLICATIONS

Notice of Allowance dated Sep. 13, 2023 for U.S. Appl. No. 17/974,885.
Notice of Allowance dated Sep. 20, 2023 for U.S. Appl. No. 18/081,512.
Office action dated Oct. 4, 2023 for U.S. Appl. No. 18/454,638.
Office action dated Oct. 5, 2023 for U.S. Appl. No. 18/454,692.

* cited by examiner

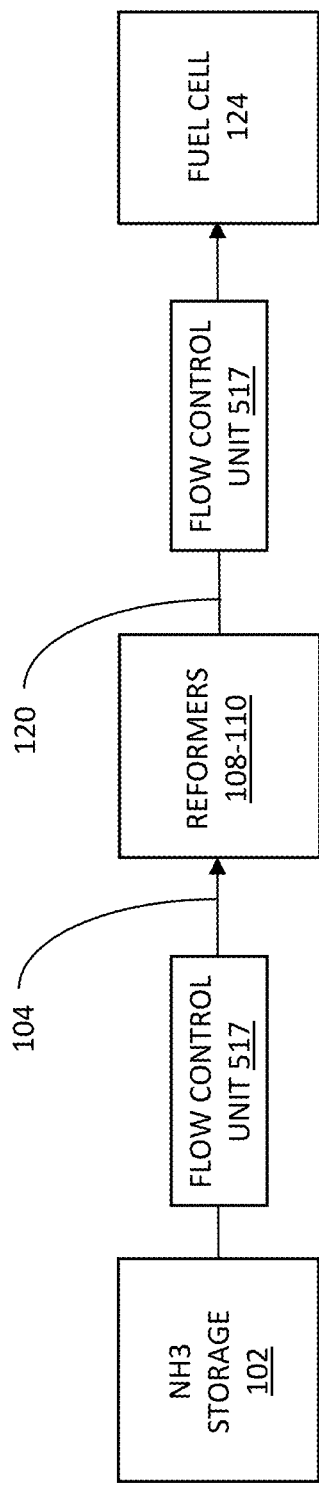
FIG. 6I
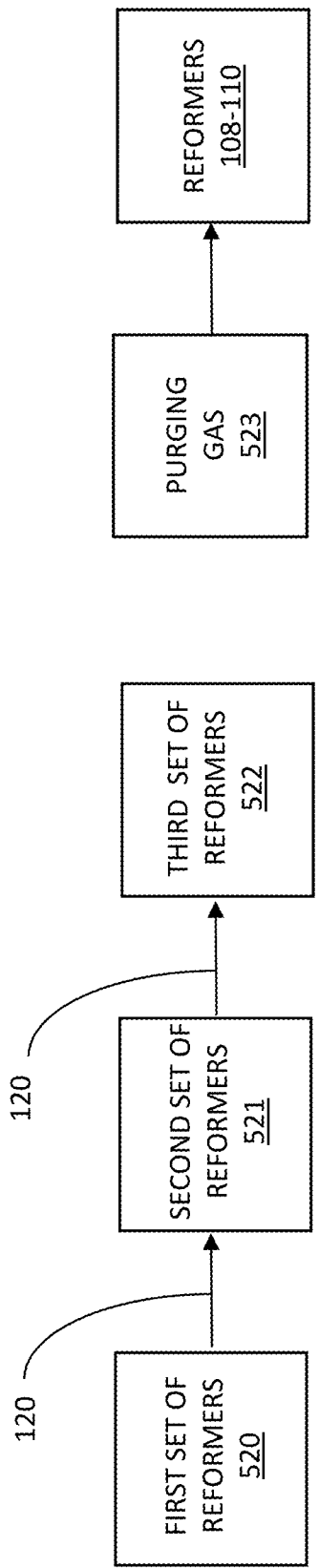
FIG. 6K
FIG. 6J

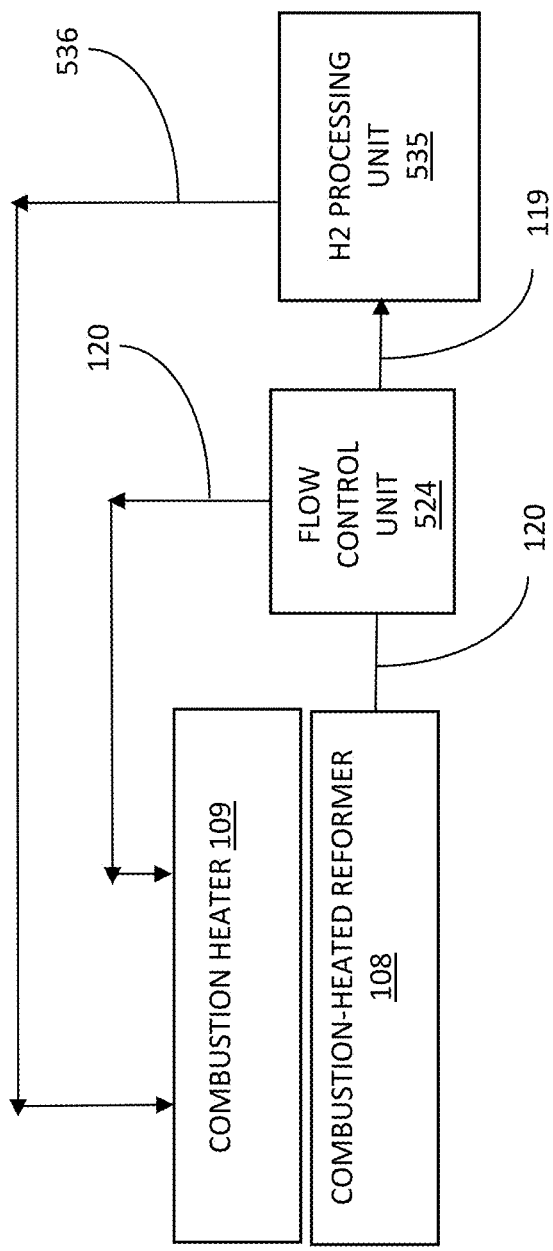

SYSTEMS AND METHODS OF PROCESSING AMMONIA

CROSS-REFERENCE TO RELATED APPLICATIONS

This application is a continuation of U.S. application Ser. No. 17/974,997 filed Oct. 27, 2022, which is a continuation of U.S. application Ser. No. 17/974,885 filed Oct. 27, 2022, which claims benefit of U.S. Provisional Application No. 63/413,717, filed Oct. 6, 2022, the disclosure of which is hereby incorporated by reference in its entirety.

BACKGROUND

As the world economy aims to decarbonize by 2050 or sooner, interest in zero-carbon (or carbon-neutral) energy systems has grown rapidly. Scalable zero-emission fuels (SZEFs; chemical fuels that are produced using renewable, zero-carbon energy) are of particular interest, since SZEFs can replace fuels used in hard-to-decarbonize sectors.

SUMMARY

Hydrogen, being a scalable zero-emission fuel (SZEF), can be leveraged as clean energy to power various systems. Hydrogen can be synthetically produced without carbon emissions, for example, by electrolyzing freshwater using wind and solar energy.

Hydrogen can provide advantages over other chemical fuels, such as diesel, gasoline, or jet fuel, which have specific energies of about 45 megajoules per kilogram (heat), as well as over lithium-ion batteries, which have specific energies of about 0.95 mega Joule (MJ)/kilogram (kg) (electrical). In contrast, hydrogen has a specific energy of over 140 MJ/kg (heat), such that 1 kg of hydrogen can provide the same amount of energy as about 3 kg of gasoline or kerosene. Thus, hydrogen reduces the amount of fuel (by mass) needed to provide a comparable amount of energy.

Further, systems that consume hydrogen as a fuel generally produce benign or nontoxic byproducts such as water, and minimal or near zero greenhouse gas emissions (e.g., carbon dioxide and nitrous oxide), thereby reducing the environmental impacts of various systems (e.g., modes of transportation) that use hydrogen as a fuel source.

Recognized herein are various limitations with hydrogen storage and production systems currently available. Although hydrogen has a relatively high gravimetric density (measured in MJ/kg), fuel storage systems for compressed and liquefied hydrogen are often complex due to specialized storage conditions.

For example, storage of hydrogen may require tanks that can withstand high pressures (e.g., 350-700 bar or 5,000-10,000 psi), and/or may require cryogenic temperatures (since the boiling point of hydrogen at 1 atm of pressure is −252.8° C.). Additionally, hydrogen storage containers may be constructed using materials that are highly-specialized, costly, and difficult to develop, which may limit the ability to manufacture such hydrogen storage containers at a large scale.

Ammonia ($NH_3$) is a SZEF that can be used as a hydrogen storage vector. Since ammonia can be stored at significantly lower pressures (and/or higher temperatures) than hydrogen, ammonia overcomes some of the aforementioned shortcomings of hydrogen. Further recognized herein are various limitations of conventional ammonia processing systems, which generally have slow startup times, non-ideal thermal characteristics, suboptimal ammonia conversion efficiencies, and high weight and volume requirements.

Embodiments of the present disclosure are directed to ammonia reforming systems and methods. The present ammonia reforming systems and methods address the abovementioned shortcomings of conventional systems for storing and/or releasing hydrogen for utilization as a fuel. The present ammonia reforming systems may generate high electrical power (about 5 kilowatts or greater), provide a high energy density (about 655 watt-hour (Wh)/kilogram (kg) or greater by weight and about 447 watt-hour (Wh)/liter (L) or greater by volume), and provide a high power density.

The present ammonia reforming systems and methods may advantageously enable the decarbonization of long-distance transportation where refueling can be difficult via other decarbonized methods (for example, on trucking routes longer than 500 miles, or on transoceanic shipping routes). Over such long-distance routes, using batteries to power motors may entail excessively long recharging times and excessive weight and volume requirements, which reduces revenues for ship operators by decreasing the space available for cargo. Additionally, using compressed hydrogen or liquid hydrogen over such long-distance routes may not be feasible due to the specialized hydrogen storage conditions described previously, as well as the large volume requirements for the hydrogen storage tanks.

Additionally, the present ammonia reforming systems and methods may advantageously provide combustion fuel for self-heating (i.e., auto-thermal heating). In other words, the ammonia reformers may be heated by the combustion of hydrogen extracted from the ammonia reforming itself, as opposed being heated by combustion of hydrocarbons or ammonia (which undesirably emits greenhouse gases, nitrogen oxides ($NO_x$), and/or particulate matter). By reforming ammonia into hydrogen, a separate tank may not be required for storing combustion fuel (e.g., hydrocarbons, hydrogen, or ammonia).

Additionally, the present ammonia reforming systems and methods may advantageously provide a high purity reformate stream (e.g., at least about 99.9% $H_2/N_2$ mixture by molar fraction, or less than about 10 parts per million (ppm) of ammonia). This high purity is achieved by utilizing an ammonia filter (e.g., adsorbents) to remove unconverted or trace ammonia, and by high $NH_3$ conversion efficiency (conferred by the effective design of the reforming reactor, as well as the reforming catalyst). The high purity reformate stream ($H_2/N_2$ mixture, or $H_2$ stream) may be consumed by a proton exchange membrane fuel cell (PEMFC) or other power generation device (e.g., internal combustion engine (ICE) or solid oxide fuel cell (SOFC)).

Additionally, the present ammonia reforming systems and methods may be simple to operate and may provide a high degree of safety. Ammonia may be provided to reformers using a single inlet (e.g., as opposed to a first inlet for a first reformer, a second inlet for a second reformer, and so on). Furthermore, a single stream of ammonia may pass through several reformers (e.g., first passing through a startup reformer, and then into a main reformer, or vice versa). This configuration may facilitate heat transfer from the reformers to the incoming ammonia stream (to vaporize the incoming ammonia stream), and may increase the overall ammonia conversion efficiency (i.e., by fully reforming the ammonia stream). In some embodiments, the ammonia flow rate may be controlled at the single inlet, and in the case of a major fault or dangerous event, the ammonia flow may be quickly shut off via the single inlet.

In one aspect, the present disclosure is directed to a method for reforming ammonia, comprising: (a) heating a first reformer to a first target temperature range; (b) directing ammonia to the first reformer to produce a reformate stream comprising hydrogen and nitrogen; (c) combusting the reformate stream to heat a second reformer to a second target temperature range; and (d) directing additional ammonia to the second reformer to produce additional reformate for the reformate stream. A first portion of the reformate stream is combusted to heat the second reformer while ammonia is being reformed in the second reformer.

In some embodiments, the first portion of the reformate stream is produced from the ammonia and/or the additional ammonia.

In some embodiments, the method further comprises processing a second portion of the reformate stream in a hydrogen processing module.

In some embodiments, the hydrogen processing module is a fuel cell.

In some embodiments, the reformate stream is directed through a hydrogen processing module prior to combusting the first portion of the reformate stream to heat the second reformer.

In some embodiments, the reformate stream from the first reformer is further reformed in the second reformer.

In some embodiments, the additional reformate from the second reformer is directed to the first reformer.

In some embodiments, the additional reformate from the second reformer is further reformed in the first reformer.

In some embodiments, the additional ammonia is directed to the first reformer before being directed to the second reformer.

In some embodiments, a pressure of the reformate stream is reduced when the reformate stream is directed through the hydrogen processing module compared to when the reformate stream is not directed through the hydrogen processing module.

In some embodiments, a threshold amount of the reformate stream being directed to the hydrogen processing module results in substantially all of the reformate stream passing through the hydrogen processing module.

In some embodiments, an amount of ammonia directed to the second reformer is increased over a time period, the time period beginning when the second reformer is heated to the second target temperature range.

In some embodiments, the amount of ammonia directed to the second reformer is increased to a first target ammonia flowrate range.

In some embodiments, the reformate stream is directed to a hydrogen processing module when the first target ammonia flowrate range is reached.

In some embodiments, the ammonia flowrate is subsequently increased to a second target ammonia flowrate.

In some embodiments, the first portion of the reformate stream is combusted with oxygen, and the oxygen is provided in a substantially constant proportion relative to the hydrogen in the first portion of reformate.

In some embodiments, the method further comprises ceasing to perform (a)-(c) after the second reformer reaches the second target temperature range.

In some embodiments, the first portion of the reformate stream is controlled so that the second reformer maintains a temperature in the second target temperature range.

In some embodiments, combustion of the reformate stream maintains a temperature in the second reformer within the second target temperature range.

In some embodiments, the reformate stream is directed to a combustion heater in thermal communication with the second reformer so that the combustion heater receives substantially all of the reformate stream.

In some embodiments, a second portion of the reformate stream is vented or flared.

In some embodiments, at least about 50% of the reformate stream is vented or flared.

In some embodiments, the method further comprises increasing an amount of a second portion of the reformate stream that is processed in a hydrogen processing module.

In some embodiments, the method further comprises increasing the amount of ammonia directed to the second reformer to a first target ammonia flowrate range.

In some embodiments, the first reactor is electrically heated.

In some embodiments, the first reactor is heated using combustion of a fuel.

In some embodiments, the reformate stream is combusted with a stoichiometric excess of oxygen.

In some embodiments, the oxygen is sourced from air.

In some embodiments, the first reformer comprises a first ammonia reforming catalyst and the second reformer comprises a second ammonia reforming catalyst.

In some embodiments, the first and second ammonia reforming catalysts are substantially the same catalyst.

In some embodiments, the first target temperature range and the second target temperature range at least partially overlap.

In some embodiments, the first target temperature range and/or the second target temperature range are between about 400° C. and about 700° C.

In another aspect, the present disclosure is directed to a method for reforming ammonia, comprising: (a) directing ammonia to a reformer at an ammonia flow rate to produce a reformate stream comprising hydrogen and nitrogen; (b) combusting a first portion of the reformate stream with oxygen to heat the reformer; (c) processing a second portion of the reformate stream in a hydrogen processing module; and (d) based at least in part on a stimulus, performing one or more of: (i) changing the ammonia flow rate; (ii) changing a percentage of the reformate stream that is the first portion of the reformate stream; (iii) changing a percentage of the reformate stream that is the second portion of the reformate stream; or (iv) changing a percentage of the reformate stream that is vented or flared.

In some embodiments, at least two of (i)-(iv) are performed.

In some embodiments, at least three of (i)-(iv) are performed.

In some embodiments, all of (i)-(iv) are performed.

In some embodiments, the method further comprises changing an oxygen flow rate used for combustion to heat the reformer.

In some embodiments, the stimulus comprises a changed amount of the hydrogen used by the hydrogen processing module.

In some embodiments, the stimulus comprises a temperature of the reformer being outside of a target temperature range.

In some embodiments, the stimulus comprises a changed amount or concentration of ammonia in the reformate stream.

In some embodiments, one or more of (i)-(iv) are performed so that: a temperature of the reformer is within a target temperature range; or at most about 10% of the reformate is vented or flared.

In some embodiments, one or more of (i)-(iv) are achieved for at least 95% of an operational time period.

In some embodiments, the operational time period is at least about 8 consecutive hours.

In some embodiments, the stimulus is based at least in part on an increased amount of the hydrogen used by the hydrogen processing module.

In some embodiments, the increased amount of hydrogen is a projected increased amount of hydrogen.

In some embodiments, based on the stimulus, one or more of: the ammonia flow rate is increased; the percentage of the reformate stream that is the first portion of the reformate stream is decreased; the percentage of the reformate stream that is the second portion of the reformate stream is increased; or the percentage of the reformate stream that is vented or flared is increased.

In some embodiments, the stimulus is based at least in part on a decreased amount of the hydrogen used by the hydrogen processing module.

In some embodiments, the decreased amount of hydrogen is a projected decreased amount of hydrogen.

In some embodiments, based on the stimulus, one or more of: the ammonia flow rate is decreased; the percentage of the reformate stream that is the first portion of the reformate stream is increased; the percentage of the reformate stream that is the second portion of the reformate stream is decreased; or the percentage of the reformate stream that is vented or flared is increased.

In some embodiments, the stimulus comprises (a) a discontinued processing of hydrogen using the hydrogen processing module and/or (b) a fault or malfunction of the hydrogen processing module.

In some embodiments, a plurality of hydrogen processing modules each comprise the hydrogen processing module, and the stimulus comprises (a) a discontinued processing of the hydrogen using one of the plurality of hydrogen processing modules and/or (b) a fault or malfunction in one of the plurality of hydrogen processing modules.

In some embodiments, the percentage of the reformate stream that is the second portion of the reformate stream is changed to about zero percent in response to the stimulus.

In some embodiments, substantially none of the reformate stream is directed to the hydrogen processing module in response to the stimulus.

In some embodiments, substantially all of the reformate stream is directed to the second reformer and/or a combustion heater in thermal communication with the second reformer in response to the stimulus.

In some embodiments, a portion of the reformate stream is vented or flared in response to the stimulus.

In some embodiments, at least about 50% of the reformate stream is vented or flared in response to the stimulus.

In some embodiments, the stimulus is detected using a sensor.

In some embodiments, the stimulus is communicated to a controller.

In some embodiments, (d) is performed with the aid of a programmable computer or controller.

In some embodiments, (d) is performed using a flow control unit.

In some embodiments, the stimulus is a pressure.

In some embodiments, the pressure is increased in response to decreasing a flowrate to the hydrogen processing module.

In some embodiments, the pressure is a pressure of the reformate stream.

In some embodiments, the hydrogen processing module is a fuel cell.

In some embodiments, the reformer comprises an ammonia reforming catalyst.

In another aspect, the present disclosure is directed to a method for reforming ammonia, comprising: (a) directing ammonia to a reformer at an ammonia flow rate to produce a reformate stream comprising hydrogen and nitrogen; (b) combusting a first portion of the reformate stream with oxygen at an oxygen flow rate in a combustion heater to heat the reformer; (c) processing a second portion of the reformate stream in a hydrogen processing module; (d) measuring a temperature in the reformer or the combustion heater; (e) based at least in part on the measured temperature being outside of a target temperature range of the reformer or the combustion heater, performing one or more of: (i) changing the ammonia flow rate; (ii) changing the oxygen flow rate; (iii) changing a percentage of the reformate stream that is the second portion of the reformate stream; (iv) changing a percentage of the reformate stream that is the first portion of the reformate stream; or (v) changing a percentage of the reformate stream that is vented or flared out of the combustion heater.

In some embodiments, the hydrogen processing module is a fuel cell.

In some embodiments, the reformer comprises an ammonia reforming catalyst.

In some embodiments, at least two of (i)-(v) are performed.

In some embodiments, at least three of (i)-(v) are performed.

In some embodiments, at least four of (i)-(v) are performed.

In some embodiments, all of (i)-(v) are performed.

In some embodiments, the temperature is measured using a temperature sensor.

In some embodiments, the measured temperature is communicated to a controller.

In some embodiments, (i)-(v) are performed with the aid of a controller.

In some embodiments, (iii) and/or (iv) are performed using a flow control unit.

In some embodiments, (iii) and/or (iv) are performed by changing the second portion of reformate processed in the hydrogen processing module.

In some embodiments, the method further comprises, based at least in part on the measured temperature being greater than the target temperature range, performing one or more of: increasing the ammonia flow rate; decreasing the oxygen flow rate; increasing the percentage of the reformate stream that is the second portion of the reformate stream that is processed by the hydrogen processing module; decreasing the percentage of the reformate stream that is the first portion of the reformate stream; or increasing a percentage of the reformate stream that is vented or flared out of the combustion heater.

In some embodiments, increasing the percentage of the reformate stream that is the second portion of the reformate stream decreases the first portion of the reformate stream that is combusted.

In some embodiments, the hydrogen processing module is a fuel cell, and the first portion of the reformate stream is an anode off-gas that is directed from the fuel cell to the combustion heater.

In some embodiments, decreasing the percentage of the reformate stream that is the first portion comprises decreasing the ammonia flow rate to the reformer to produce less hydrogen in the reformate stream.

In some embodiments, the hydrogen processing module is a fuel cell, and increasing the percentage of the second portion of the reformate stream that is processed by the hydrogen processing module increases an amount of power output by the fuel cell.

In some embodiments, the method further comprises, based at least in part on the measured temperature being less than the target temperature range, performing one or more of: decreasing the ammonia flow rate; increasing the oxygen flow rate; decreasing the percentage of the reformate stream that is the second portion of the reformate stream that is processed by the hydrogen processing module; increasing the percentage of the reformate stream that is the first portion of the reformate stream; or decreasing a percentage of the reformate stream that is vented or flared out of the combustion heater.

In some embodiments, decreasing the percentage of the second portion of the reformate stream that is the second portion increases the first portion of the reformate stream that is combusted.

In some embodiments, the hydrogen processing module is a fuel cell, and the first portion of the reformate stream is an anode off-gas that is directed from the fuel cell to the combustion heater.

In some embodiments, increasing the percentage of the reformate stream that is the first portion comprises increasing the ammonia flow rate to the reformer to produce more hydrogen in the reformate stream.

In some embodiments, the hydrogen processing module is a fuel cell, and decreasing the percentage of the second portion of the reformate stream that is processed by the hydrogen processing module decreases an amount of power output by the fuel cell.

In some embodiments, the method further comprises calculating a temperature difference between the temperature measured in the reformer or the combustion heater and a set-point temperature within the target temperature range; and changing one or more of (i)-(v) by an amount that is based at least in part on the temperature difference.

In some embodiments, one or more of (i)-(v) are changed by a proportional factor.

In some embodiments, the proportional factor is different for each of (i)-(v).

In some embodiments, the method further comprises repeating (x) at a subsequent time point to obtain a subsequent temperature difference and repeating (y) to further change one or more of (i)-(v) by an amount that is proportional to the subsequent temperature difference.

In some embodiments, (x) and (y) are repeated until the measured temperature is within the target temperature range.

In some embodiments, the temperature measured in the reformer or combustion heater is a first temperature that is measured at a first time point, and the method further comprises: (q) at second time point subsequent to the first time point, measuring a second temperature of the reformer or the combustion heater; (r) calculating a time period between the first time point and the second time point; (s) calculating a temperature difference between the first temperature and the second temperature; and (t) changing one or more of (i)-(v) by an amount that is based at least in part on the time period and the temperature difference.

In some embodiments, the method further comprises repeating (q)-(t) until the measured temperature is within the target temperature range.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings, of which:

DETAILED DESCRIPTION

Figure 1A:
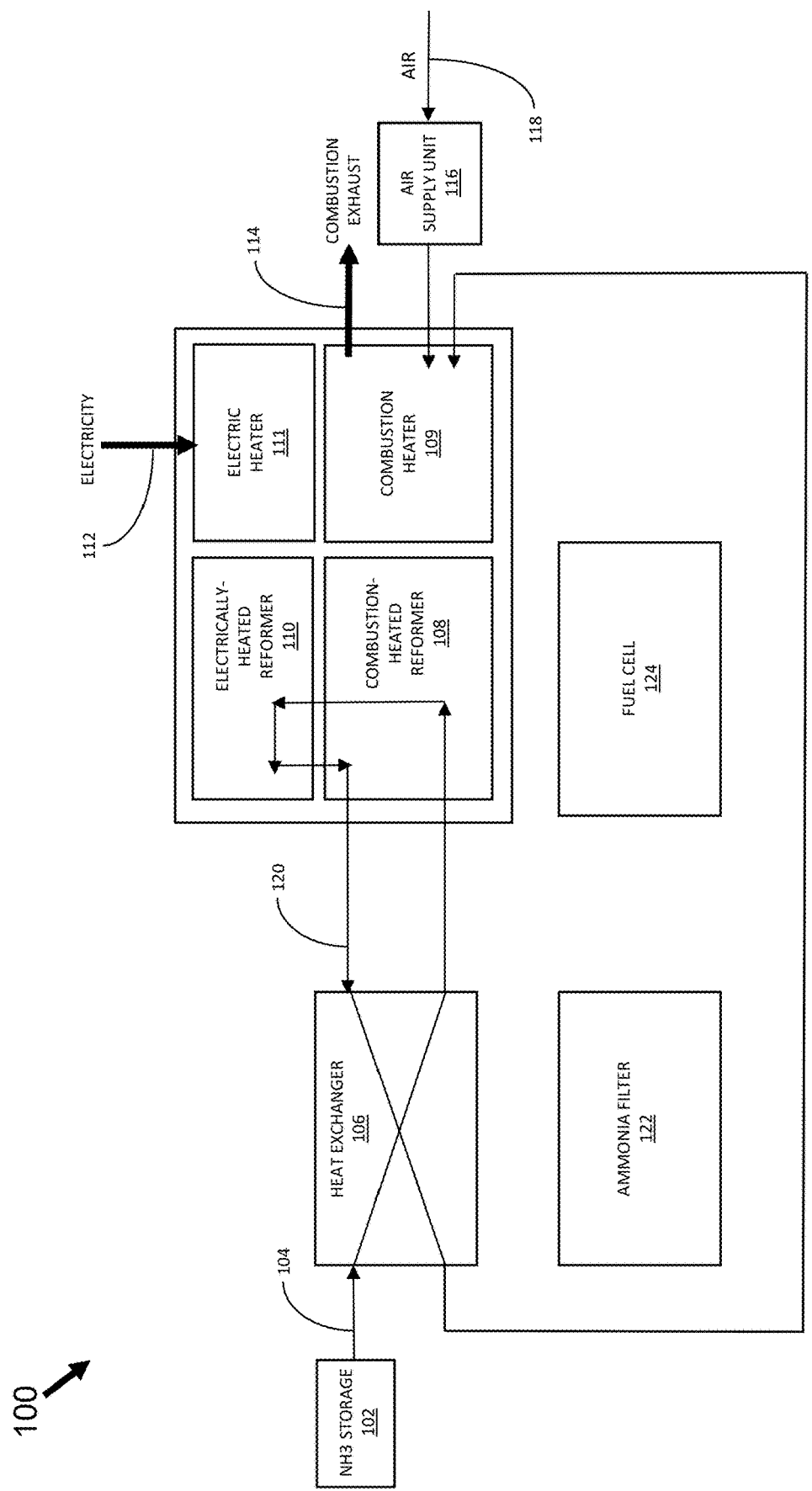
FIGS. 1A-4B are block diagrams illustrating an ammonia reforming system, in accordance with one or more embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It is contemplated that various alternatives to the embodiments of the invention described herein may be employed. It should be understood that any of the embodiments, configurations and/or components described with respect to a particular figure may be combined with other embodiments, configurations, and/or components described with respect to other figures.

The terminology used herein is for the purpose of describing particular embodiments only and is not intended to be limiting of example embodiments. As used herein, the singular forms "a," "an" and "the" are intended to include the plural forms as well (and vice versa), unless the context clearly indicates otherwise. For example, "a," "an," and "the" may be construed as "one or more."

The present disclosure may be divided into sections using headings. The headings should not be construed to limit the present disclosure, and are merely present for organization and clarity purposes.

The expressions "at least one of A and B" and "at least one of A or B" may be construed to mean at least A, at least B, or at least A and B (i.e., a set comprising A and B, which set may include one or more additional elements). The term "A and/or B" may be construed to mean only A, only B, or both A and B.

The expressions "at least about A, B, and C" and "at least about A, B, or C" may be construed to mean at least about A, at least about B, or at least about C. The expressions "at most about A, B, and C" and "at most about A, B, or C" may be construed to mean at most about A, at most about B, or at most about C. Similarly, the expression "about A, B, or C" may be construed to mean about A, about B, or about C.

The expression "between about A and B, C and D, and E and F" may be construed to mean between about A and about B, between about C and about D, and between about E and about F. The expression "between about A and B, C and D, or E and F" may be construed to mean between about A and about B, between about C and about D, or between about E and about F.

As used herein, the terms "module" and "unit" are used interchangeably and are not limited to a single component, piece, part, or individual unit.

The terms "decompose," "dissociate," "reform," "crack," and "break down," and their grammatical variations, may be construed interchangeably. For example, the expression "decomposition of ammonia" may be interchangeable with "dissociation of ammonia," "reforming of ammonia," "cracking of ammonia," etc.

The terms "ammonia conversion," "ammonia conversion rate," and "ammonia conversion efficiency," and their grammatical variations, may be construed as a fraction of ammonia that is converted to hydrogen and nitrogen, and may be construed interchangeably. For example, "an ammonia conversion efficiency of 90%" may represent 90% of ammonia being converted to hydrogen and nitrogen.

The term "auto-thermal reforming" may be construed as a condition where an ammonia decomposition reaction ($2NH_3 \rightarrow N_2 + 3H_2$; an endothermic reaction) is heated by a hydrogen combustion reaction ($2H_2 + O_2 \rightarrow 2H_2O$; an exothermic reaction) using at least part of the hydrogen produced by the ammonia decomposition reaction itself.

In some cases, the term "auto-thermal reforming" may be construed as a condition where an ammonia decomposition reaction is heated by a hydrogen combustion reaction using at least part of hydrogen produced by the ammonia decomposition reaction itself, electrical heating, or a combination of both (which may result in an overall positive electrical and/or chemical energy output). For example, if "auto-thermal reforming" is performed using a hydrogen combustion reaction and/or electrical heating, the hydrogen produced from the ammonia decomposition reaction may be enough to provide the hydrogen combustion reaction with combustion fuel, and/or to provide electrical energy for the electrical heating via hydrogen-to-electricity conversion devices (e.g., fuel cell, combustion engine, etc.).

In some cases, the hydrogen provided for the hydrogen combustion reaction and/or the electrical heating may or may not use the hydrogen from the ammonia decomposition reaction (for example, the hydrogen may be provided by a separate hydrogen source, the electricity may be provided from batteries or a grid, etc.).

In some cases, "auto-thermal reforming" may be construed as a condition where an ammonia decomposition reaction is heated by a combustion reaction (e.g., ammonia combustion, hydrocarbon combustion, etc.), electrical heating, or a combination of both, which may result in an overall positive electrical and/or chemical energy output. For example, if "auto-thermal reforming" is performed using a combustion reaction and/or electrical heating, the chemical energy (e.g., lower heating value) from the hydrogen produced from the ammonia decomposition reaction may be higher than the combustion fuel chemical energy (e.g., lower heating value), and/or may be enough to provide electrical energy for the electrical heating via hydrogen-to-electricity conversion devices (e.g., fuel cell, combustion engine, etc.).

In some cases, a startup mode may be construed as a process in which an ammonia reforming system is initiating an operation (e.g., heating up one or more reformers to a target temperature range). In some cases, an operation mode may be construed as a process in which the ammonia reforming system is generating an electrical power output (using one or more fuel cells) or generating a hydrogen output (for various chemical or industrial processes) while maintaining auto-thermal reforming. In some cases, a hot standby mode may be construed as a process in which auto-thermal reforming of the ammonia reforming system is maintained while the power output (using the one or more fuel cells) and/or the hydrogen output (supplied to various chemical or industrial processes) are reduced (e.g., to zero, or to an amount that is substantially less than the operation mode).

Ammonia Reforming Systems

FIGS. 1A-4B are block diagrams illustrating an ammonia reforming system 100, in accordance with one or more embodiments of the present disclosure. The ammonia reforming system 100 comprises an $NH_3$ storage tank 102, a heat exchanger 106, one or more combustion-heated reformers 108, a combustion heater 109, one or more electrically-heated reformers 110, an electric heater 111, an air supply unit 116, an ammonia filter 122, and a fuel cell 124.

The $NH_3$ storage tank 102 may be configured to store $NH_3$ under pressure (e.g., 7-9 bars absolute) and/or at a low temperature (e.g., −30° C.). The $NH_3$ storage tank 102 may comprise a metallic material that is resistant to corrosion by ammonia (e.g., steel). The storage tank 102 may comprise one or more insulating layers (e.g., perlite or glass wool). In some cases, an additional heater may be positioned near, adjacent, at, or inside the $NH_3$ storage tank 102 to heat and/or pressurize the $NH_3$ stored therein.

The heat exchanger 106 may be configured to exchange heat between various input fluid streams and output fluid streams. For example, the heat exchanger 106 may be configured to exchange heat between an incoming ammonia stream 104 provided by the storage tank 102 (e.g., relatively cold liquid ammonia) and a reformate stream 120 (e.g., a relatively warm $H_2/N_2$ mixture) provided by the reformers 108 and 110. The heat exchanger 106 may be a plate heat exchanger, a shell-and-tube heat exchanger, or a tube-in-tube heat exchanger, although the present disclosure is not limited thereto.

The reformers 108 and 110 may be configured to generate and output the reformate stream 120 comprising at least a mixture of hydrogen ($H_2$) and nitrogen ($N_2$) (with a molar ratio of $H_2$ to $N_2$ of about 3:1 at a high ammonia conversion). The $H_2/N_2$ mixture may be generated by contacting the incoming ammonia stream 104 with $NH_3$ reforming catalyst 130 positioned inside each of the reformers 108 and 110. The reformers 108 and 110 may be heated to a sufficient temperature range to facilitate ammonia reforming (for example, of from about 400° C. to about 650° C.).

In some embodiments, the reformers 108 and 110 may comprise a plurality of reformers, which may fluidically communicate in various series and/or parallel arrangements. For example, an electrically-heated reformer 110 may fluidically communicate in series or in parallel with a combustion-heated reformer 108 (or vice versa) as a pair of reformers 108-110. Such a pair of reformers 108-110 may fluidically communicate in parallel with other reformer 108-110 or pairs of reformers 108-110 (so that pairs of reformers 108-110 combine their outputs into a single reformate stream 120), or may fluidically communicate in series with other reformers 108-110 or pairs of reformers 108-110.

In some embodiments, the number of combustion-heated reformers 108 may be the same as the number of electrically-heated reformers 110, and the reformers 108-110 may fluidically communicate in various series and/or parallel arrangements. For example, two electrically-heated reformers 110 may fluidically communicate in series with two combustion-heated reformers 108 (or vice versa).

In some embodiments, the number of combustion-heated reformers 108 may be different from the number of electrically-heated reformers 110 and the reformers 108-110 may fluidically communicate in various series and/or parallel arrangements. For example, two electrically-heated reformers 110 may fluidically communicate in series with four combustion-heated reformers 108 (or vice versa).

The combustion heater 109 may be in thermal communication with the combustion-heated reformer 108 to heat the $NH_3$ reforming catalyst 130 in the reformer 108. The combustion heater 109 may react at least part of the reformate stream 120 (e.g., the $H_2$ in the $H_2/N_2$ mixture) with an air stream 118 (e.g., at least oxygen ($O_2$)). The heat from the exothermic combustion reaction in the combustion heater 109 may be transferred to the $NH_3$ reforming catalyst 130 in the reformer 108. For example, the hot combustion product gas 114 may contact walls of the reformer 108, and the hot combustion product gas 114 may be subsequently output from the combustion heater 109 as combustion exhaust 114. The combustion heater 109 may comprise a separate component from the reformer 108 (and may be slidably insertable or removable in the reformer 108). In some cases, the combustion heater 109 is a unitary structure with the combustion-heated reformer 108 (and both the reformer 108 and the heater 109 may be manufactured via 3D printing and/or casting).

The air supply unit 116 (e.g., one or more pumps and/or compressors) may be configured to supply the air stream 118 (which may be sourced from the atmosphere, and may comprise at least about 20% oxygen by molar fraction). The air stream 118 may comprise pure oxygen by molar fraction, or substantially pure oxygen by molar fraction (e.g., at least about 99% pure oxygen).

The electric heater 111 may be in thermal communication with the electrically-heated reformer 110 to heat the $NH_3$ reforming catalyst 130 in the reformer 110. The electric heater 111 may heat the $NH_3$ reforming catalyst 130 in the electrically-heated reformer 110 by resistive heating or Joule heating. In some cases, the electrical heater 111 may comprise at least a heating element (e.g., nichrome or ceramic) that transfers heat to the catalyst 130 in the electrically-heated reformer 110. In some cases, the electrical heater 111 may comprise metal electrodes (e.g., copper or steel electrodes) that pass a current through the catalyst 130 to heat the catalyst 130 in the reformer 110.

The ammonia filter 122 may be configured to filter or remove trace ammonia in the reformate stream 120. The ammonia filter 122 may be configured to reduce the concentration of $NH_3$ in the reformate stream 120, for example, from greater than about 10,000 parts per million (ppm) to less than about 100 ppm. The ammonia filter 122 may comprise a fluidized bed comprising a plurality of particles or pellets. The ammonia filter 122 may be cartridge-based (for simple replaceability, for example, after the ammonia filter 122 is saturated with ammonia).

The ammonia filter 122 may comprise an adsorbent (e.g., bentonite, zeolite, clay, biochar, activated carbon, silica gel, metal organic frameworks (MOFs), and other nanostructured materials). The adsorbent may comprise pellets, and may be stored in one or more columns or towers. In some instances, the ammonia filter 122 may comprise an absorbent, a solvent-based material, and/or a chemical solvent.

In some embodiments, the ammonia filter 122 comprises a multi-stage ammonia filtration system (e.g., water-based) comprising a plurality of filtration stages. The replacement of water-based absorbents may be performed for continuous operation. The multi-stage ammonia filter is described in detail with respect to FIGS. 15A-15B.

In some embodiments, the ammonia filter 122 comprises a selective ammonia oxidation (SAO) reactor including oxidation catalysts configured to react the trace ammonia in the reformate stream 120 with oxygen ($O_2$) to generate nitrogen ($N_2$) and water ($H_2O$). The air stream 118 (or a separate oxygen source) may be provided to the SAO reactor to provide the oxygen for the oxidation reaction.

In some embodiments, the ammonia filter 122 may comprise an acidic ammonia remover (for example, in addition to adsorbents), which may include an acidic solid or solution. The acidic ammonia remover may be regenerated (to desorb the ammonia captured therein) by passing an electric current through the acidic ammonia remover.

The fuel cell 124 may comprise an anode, a cathode, and an electrolyte between the anode and the cathode. The fuel cell 124 may comprise a polymer electrolyte membrane fuel cell (PEMFC), a solid oxide fuel cell (SOFC), a molten carbonate fuel cell (MCFC), a phosphoric acid fuel cell (PAFC), or an alkaline fuel cell (AFC), although the present disclosure is not limited thereto. The fuel cell 124 may process the $H_2$ in the reformate stream 120 at an anode, and process the $O_2$ in the air stream at a cathode, to generate electricity (to power an external electrical load). The fuel cell 124 may be configured to receive hydrogen (e.g., at least part of the reformate stream 120) via one or more anode inlets, and oxygen (e.g., at least part of the air stream 118 or a separate air stream) via one or more cathode inlets.

In some embodiments, the fuel cell 124 may output unconsumed hydrogen (e.g., as an anode off-gas) via one or more anode outlets, and/or may output unconsumed oxygen (e.g., as a cathode off-gas) via one or more cathode outlets. The anode off-gas and/or the cathode off-gas may be provided to the combustion heater 109 as reactants for the combustion reaction performed therein.

Figure 1B:
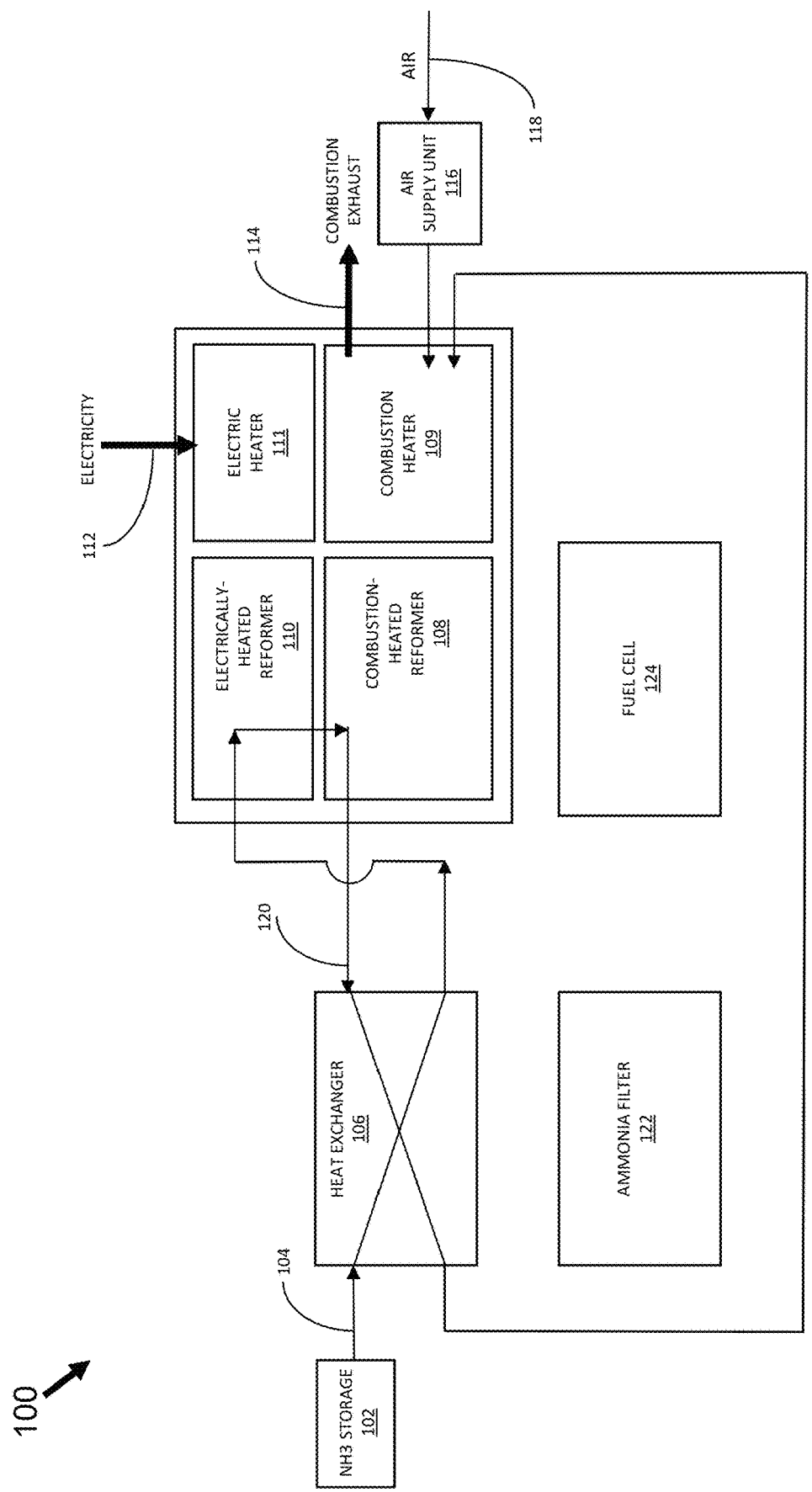

As shown in FIGS. 1A-B, the storage tank 102 may be in fluid communication with the combustion-heated reformer 108 and/or the electrically-heated reformer 110 (e.g., using one or more lines or conduits). The storage tank 102 may provide the incoming ammonia stream 104 (for example, by actuating a valve). In some instances, the heat exchanger 106 may facilitate heat transfer from the (relatively warmer) reformate stream 120 to the (relatively cooler) incoming ammonia stream 104 to preheat and/or vaporize the incoming ammonia stream 104 (changing the phase of the ammonia stream 104 from liquid to gas). The incoming ammonia stream 104 may then enter the reformers 108 and 110 to be reformed into hydrogen and nitrogen.

In some embodiments, the incoming ammonia stream 104 may first be partially reformed by the electrically-heated reformer 110 into a partially cracked reformate stream 120 (e.g., comprising at least about 10% $H_2/N_2$ mixture by molar fraction) (for example, during a start-up or initiation process). Subsequently, the partially cracked reformate stream 120 may be further reformed in the combustion-heated reformer 108 to generate a substantially cracked reformate stream (e.g., comprising less than about 10,000 ppm of residual or trace ammonia by volume and/or greater than about 99% $H_2/N_2$ mixture by molar fraction). Passing the ammonia stream 104 through the electrically-heated reformer 110 first, and then subsequently passing the ammonia stream 104 through the combustion-heated reformer 108, may advantageously result in more complete ammonia conversion (e.g., greater than about 99%).

In some embodiments, the incoming ammonia stream 104 may first be partially reformed by the combustion-heated reformer 108 into a partially cracked reformate stream 120 (e.g., comprising at least about 10% $H_2/N_2$ mixture by molar fraction). Subsequently, the partially cracked reformate stream 120 may be further reformed in the electrically-heated reformer 110 to generate a substantially cracked reformate stream (e.g., comprising less than about 10,000 ppm of residual or trace ammonia by volume and/or greater than about 99% $H_2/N_2$ mixture by molar fraction). Passing the ammonia stream 104 through the combustion-heated reformer 108 first, and then subsequently passing the ammonia stream 104 through the electrically-heated reformer 110, may advantageously result in more complete ammonia conversion (e.g., greater than about 99%).

In some cases, the incoming ammonia stream 104 may first be preheated by the combustion exhaust 114 and/or the combustion heater 109. In some cases, the preheated incoming ammonia stream 104 may then enter the reformers 108 and 110 to be reformed into hydrogen and nitrogen.

In some embodiments, the incoming ammonia stream 104 may first be reformed by the electrically-heated reformer 110 to generate a partially or substantially cracked reformate stream 120 (for example, during a start-up or initiation process). Subsequently, at least part of the partially or substantially cracked reformate stream 120 generated by the electrically-heated reformer 110 may be combusted as a combustion fuel to heat at least one combustion heater 109 of the one or more combustion-heated reformers 108.

In some cases, power input to the electric heater 111 of the electrically-heated reformer 110 may be reduced or entirely turned off based on a temperature of the combustion-heated reformer 108 and/or the combustion heater 109 being equal to or greater than a target temperature (e.g., in a target temperature range). In some cases, power input to the electric heater 111 of the electrically-heated reformer 110 may be reduced or entirely turned off based on a flow rate of the incoming ammonia stream 104 being equal to or greater than a target flow rate range.

Figure 2:
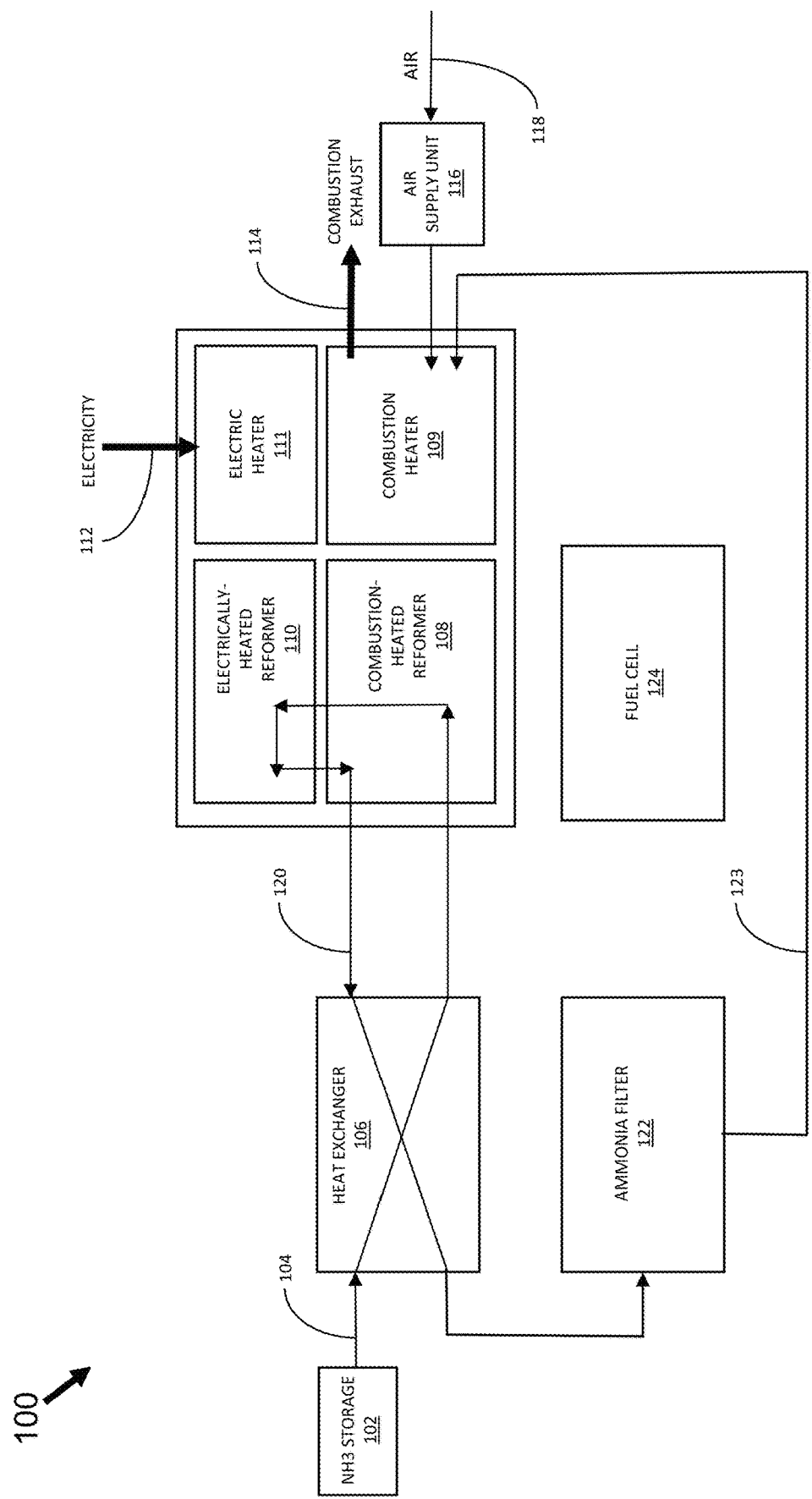

As shown in FIG. 2, the ammonia filter 122 may be configured to remove trace ammonia in the reformate stream 120 and output a filtered reformate stream 123. The filtered reformate stream 123 may then be provided to the combustion heater 109 to combust for heating the reformer 108 (i.e., by auto-thermal reforming).

Figure 3:
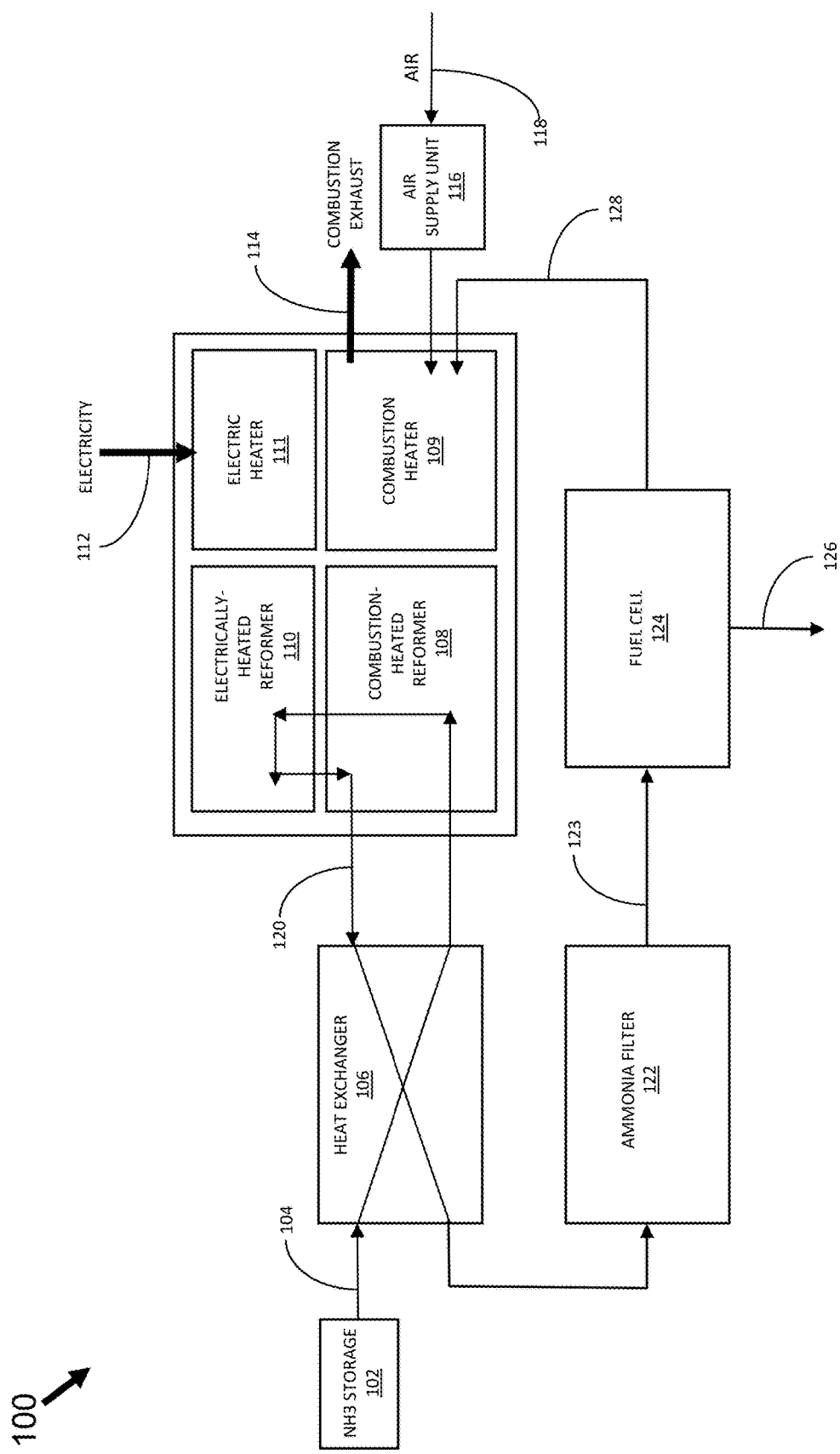

As shown in FIG. 3, the filtered reformate stream 123 may be provided to the fuel cell 124 to generate electrical power 126. An external load (e.g., an electrical motor to power a transport vehicle, or a stationary electrical grid) may utilize the electrical power 126. The fuel cell 124 may provide the anode off-gas 128 (e.g., containing unconsumed or unconverted hydrogen) to the combustion heater 109 to combust for self-heating.

In some embodiments, the ammonia reforming system 100 includes a battery (so that the system 100 is a hybrid fuel cell-battery system). The battery may be configured to power an external load in addition to the fuel cell 124. The fuel cell 124 may be configured to charge the battery (for example, based a charge of the battery being less than a threshold charge).

Figure 4A:
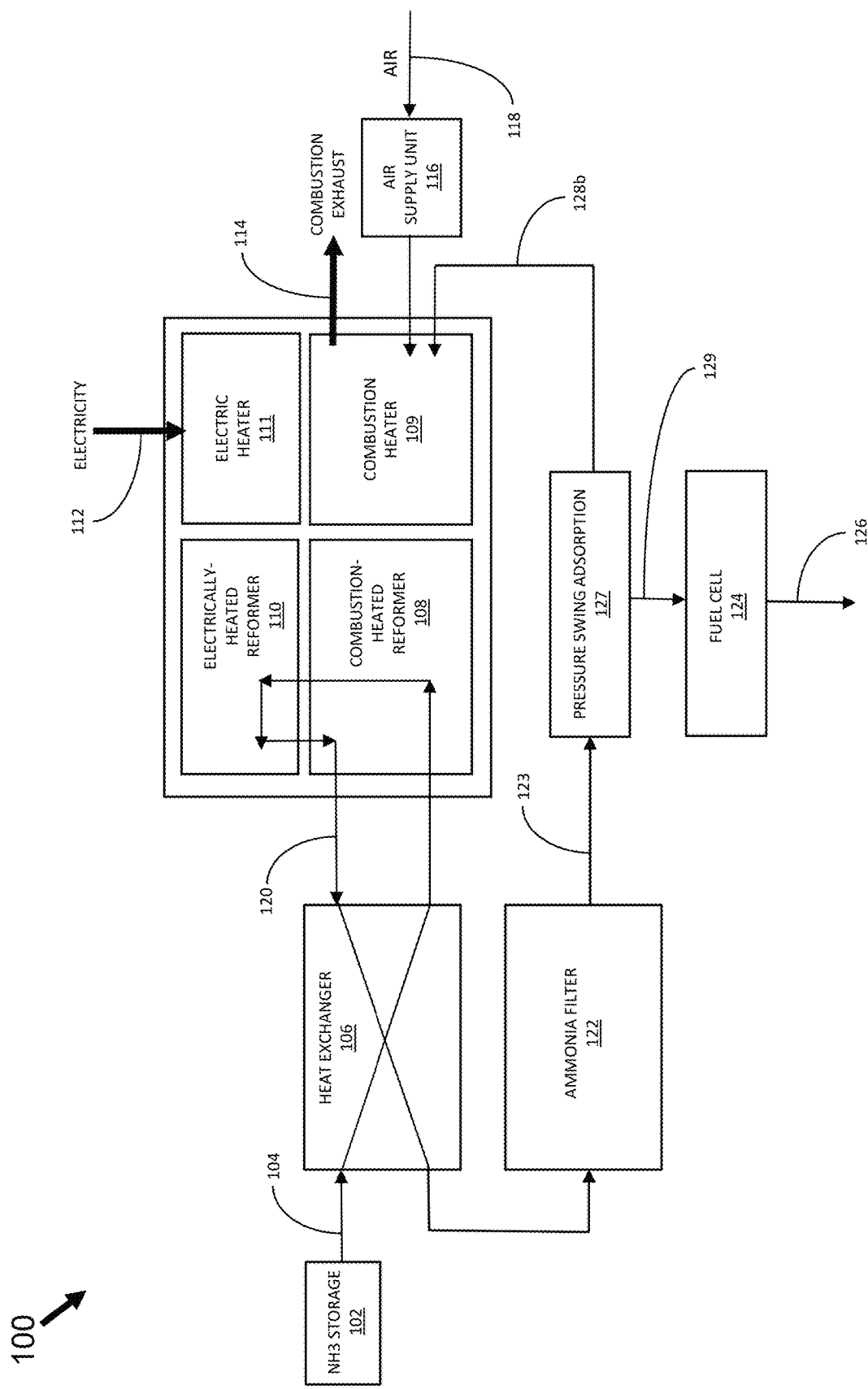

As shown in FIG. 4A, a pressure swing adsorber (PSA) 127 may be configured to adsorb $NH_3$ and/or $N_2$ in the filtered reformate stream 123 (or the reformate stream 120) to further purify the filtered reformate stream 123. The PSA may be configured to increase the molar fraction of $H_2$ in the filtered reformate stream 123 (or the reformate stream 120), and decrease the molar fractions of $NH_3$ and/or $N_2$ in the filtered reformate stream 123 (or the reformate stream 120). A PSA exhaust stream 128b comprising $H_2$ (and which may additionally comprise $NH_3$ and/or $N_2$) may then be provided to the combustion heater 109 to combust for self-heating the reformer 108 (i.e., by auto-thermal reforming). Additionally, a purified reformate stream 129 may be provided to the fuel cell 124 to generate the electrical power output 126.

Figure 4B:
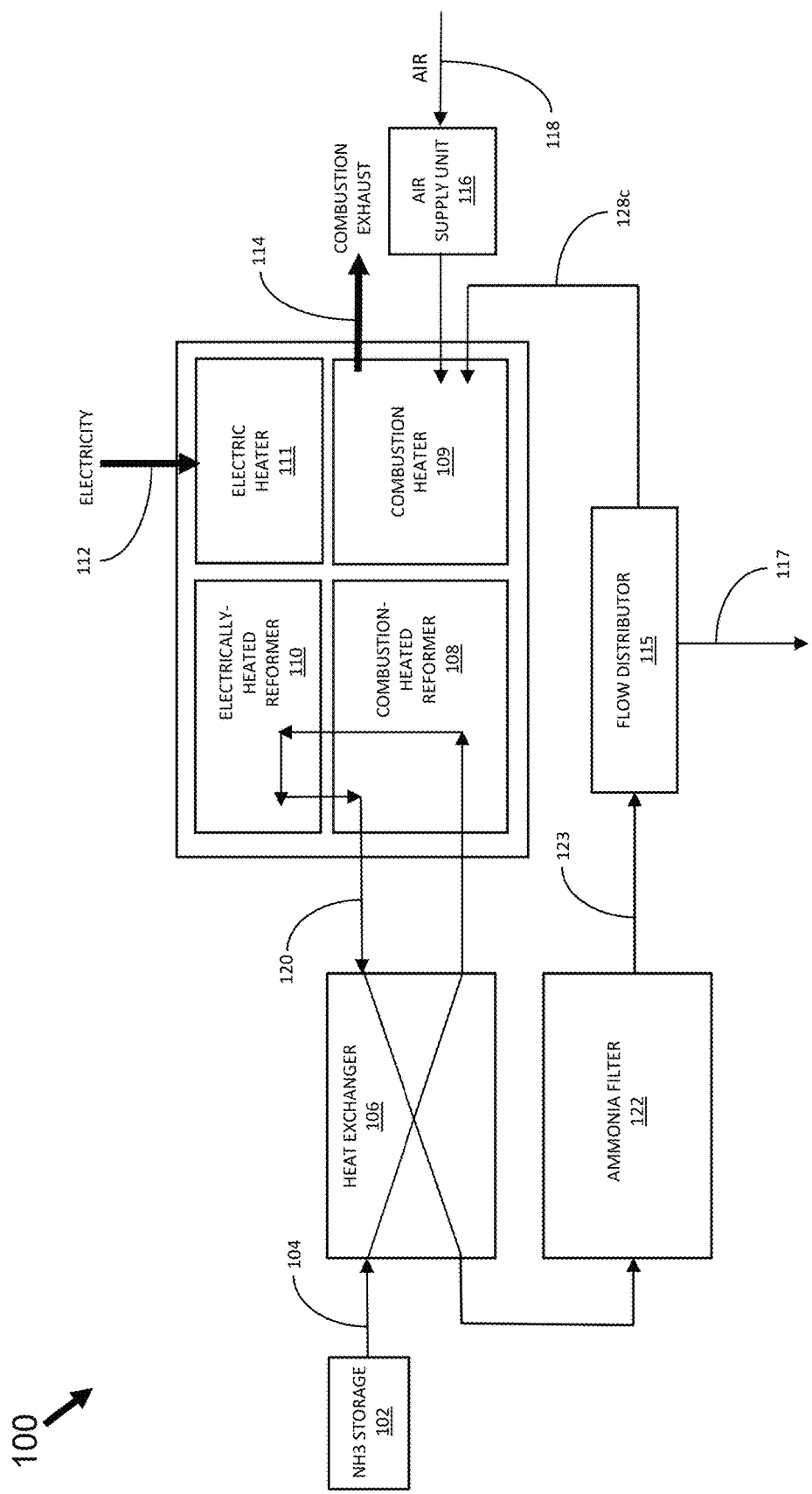

As shown in FIG. 4B, a flow distributor 115 may be configured to distribute at least portion 128c of the reformate stream 120 (or the filtered reformate stream 123) to the combustion heater 109 as a combustion fuel. The flow distributor 130 may comprise, for example, one or more flow control units (e.g., one or more valves, one or more pumps, one or more flow regulators, etc.). A remaining reformate stream 117 may be provided to various chemical or industrial processes, including, but not limited to, steel or iron processing, combustion engines, combustion turbines, hydrogen storage, hydrogen for chemical processes, hydrogen fueling stations, etc. In some cases, the remaining reformate stream 117 can be supplied as a pilot, auxiliary, or main fuel to the combustion engines or combustion turbines.

In some embodiments, the reformate stream 120, the filtered reformate stream 123, the purified reformate stream 129, and/or the remaining reformate stream 117 may be provided to an internal combustion engine (ICE). Heat emitted by the ICE may be used to heat the reformer 108 and/or the reformer 110 (e.g., using a heat exchanger).

In some embodiments, the reformate stream 120, the filtered reformate stream 123, the purified reformate stream 129, and/or the remaining reformate stream 117 may be used directly for chemical or industrial processes (e.g., to reduce iron), storage (e.g., hydrogen storage), and/or hydrogen fueling stations.

In any of embodiments and/or configurations described with respect to FIGS. 1A-4B, the fuel cell 124 may be absent, and at least part of the reformate 120 may be combusted to maintain an auto-thermal reforming process. The remaining reformate 120 (that is not combusted) may be provided for chemical or industrial processes, storage (e.g., hydrogen storage), and/or hydrogen fueling stations. In some cases, the remaining reformate stream 120 is provided to an ICE. In some cases, heat emitted by the ICE may provide at least part or all of the heat required for ammonia reforming in the reformer 108 and/or the reformer 110. Any of the embodiments, configurations and/or components described with respect to FIGS. 1A-4B, may be partially or entirely powered by exhaust heat from a combustion engine.

Controller and Sensors

FIGS. 5A-5I are block diagrams illustrating utilization of a controller 200 (e.g., computer or computing device), sensors P1-P10, T1-T11, FM1-FM11, AC1-AC10, HC1-HC5 and flow control units FCU1-FCU11 to control the ammonia reforming system 100 shown in FIGS. 1A-4B, in accordance with one or more embodiments of the present disclosure.

Figure 5A:
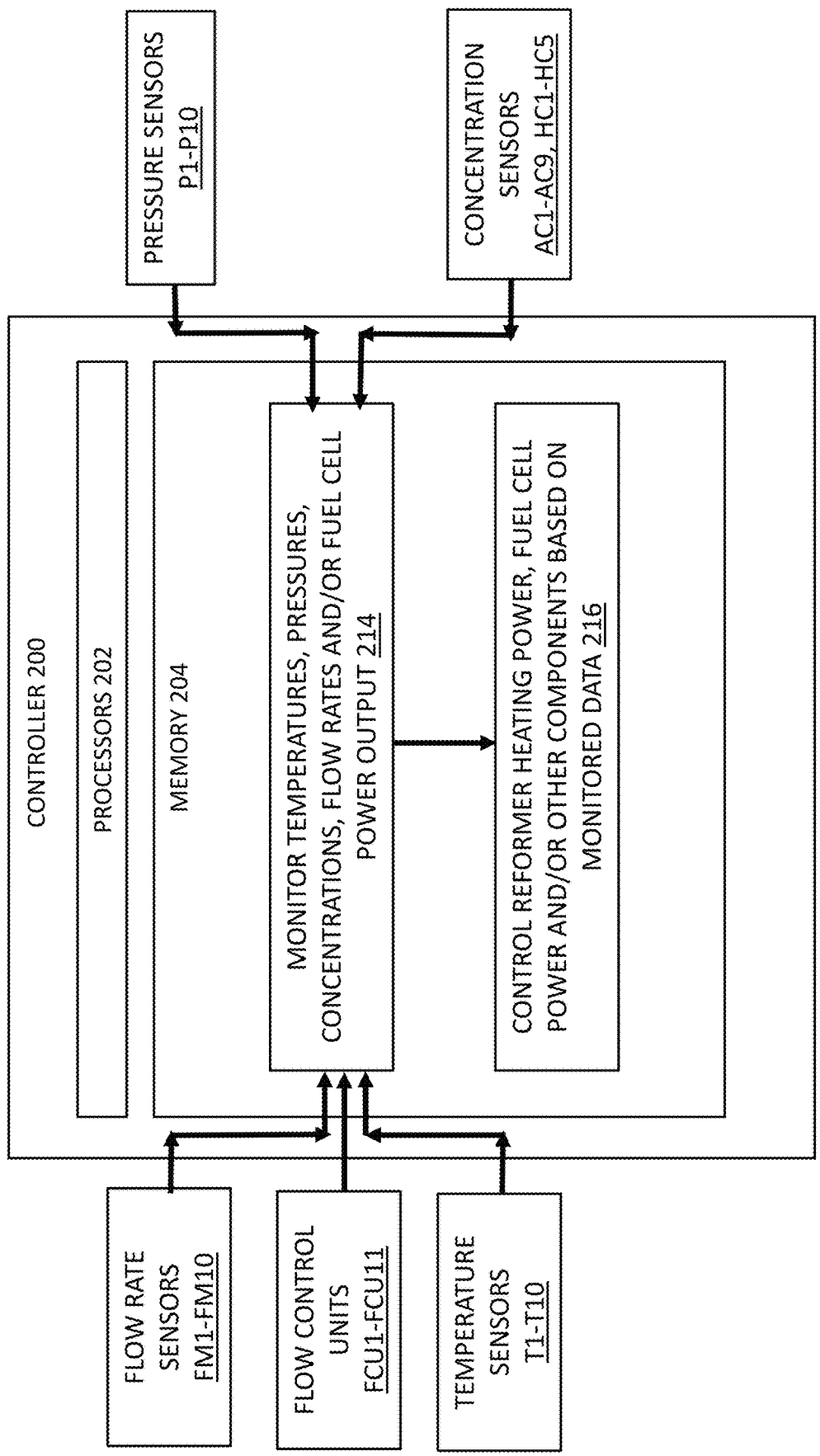
FIGS. 5A-5I are block diagrams illustrating utilization of a controller and sensors to control the ammonia reforming system shown in FIGS. 1A-4B, in accordance with one or more embodiments of the present disclosure.

As shown in FIG. 5A, the controller 200 may comprise one or more processors 202 and a memory 204. The one or more processors 202 may comprise one or more processing or logic elements (e.g., one or more micro-processor devices, one or more central processing units (CPUs), one or more graphics processing units (GPUs), one or more application specific integrated circuit (ASIC) devices, one or more field programmable gate arrays (FPGAs), or one or more digital signal processors (DSPs)), and may be configured to execute, perform or implement algorithms, modules, processes and/or instructions (e.g., program instructions stored in memory). The one or more processors 202 may be embodied in an embedded system (for example, as part of a terrestrial vehicle, an aerial vehicle, a marine vehicle, a stationary device, etc.). The memory 204 may be configured to store program instructions executable, performable or implementable by the associated one or more processors 202. For example, the memory medium 204 may comprise a non-transitory memory medium, and may comprise, but is not limited to, a read-only memory (ROM), a random-access memory (RAM), a magnetic or optical memory device (e.g., disk), a magnetic tape, a solid-state drive and the like.

The controller 200 may be in electronic communication with at least one of the sensors P1-P10, T1-T11, FM1-FM11, AC1-AC10, HC1-HC5, and flow control units FCU1-FCU11 to monitor, measure, and/or control one or more characteristics or parameters of the ammonia reforming system 100. For example, the controller 200 may be connected by wire, or wirelessly, with the sensors P1-P10, T1-T11, FM1-FM11, AC1-AC10, and HC1-HC5, and flow control units FCU1-FCU11.

A module 214 stored in the memory 204 may be configured to initiate or stop the monitoring or measurement of the ammonia reforming system 100. A module 216 may be configured to control components of the ammonia reforming system 100 based on the monitored data (for example, by modulating heating power to the heaters 109 and 111, by modulating power output of the fuel cell 124, etc.). The modules 214 and/or 216 may be implemented using a graphical user interface, such that a user of the controller 200 may view the monitored data (e.g., via one or more tables or charts) and/or manually control the ammonia reforming system 100. In some embodiments, the modules 214 and/or 216 may automatically control the ammonia reforming system 100 based on the measured on monitored data. It is noted that the modules 214 and 216 may be the same module (e.g., instead of being different modules).

The flow rate sensors FM1-FM11 may be configured to monitor or measure a flow rate (e.g., unit volume or unit mass per unit time) of a fluid (liquid or gas) in any component of the ammonia reforming system 100, and transmit data associated with the flow rate measurement to be stored in the memory 204.

The temperature sensors T1-T11 may be configured to detect a temperature (e.g., in Celsius or Kelvin) of any component of the ammonia reforming system 100 (for example, the walls of the reformers 108-110 or the walls of the heaters 109-111), or may be configured to detect the temperature of a fluid (liquid or gas) in any component of the ammonia reforming system 100, and transmit data associated with the temperature measurement to be stored in the memory 204.

The pressure sensors P1-P10 may be configured to detect a pressure (e.g., gauge pressure (barg) or absolute pressure (bara)) of a fluid stream (liquid or gas) in any component of the ammonia reforming system 100, and transmit data associated with the pressure measurement to be stored in the memory 204.

The concentration sensors AC1-AC10 and HC1-HC5 may be configured to detect a concentration (e.g., in parts per million) of a fluid (liquid or gas) in any component of the ammonia reforming system 100, and transmit data associated with the concentration measurement to be stored in the memory 204.

Figure 5B:
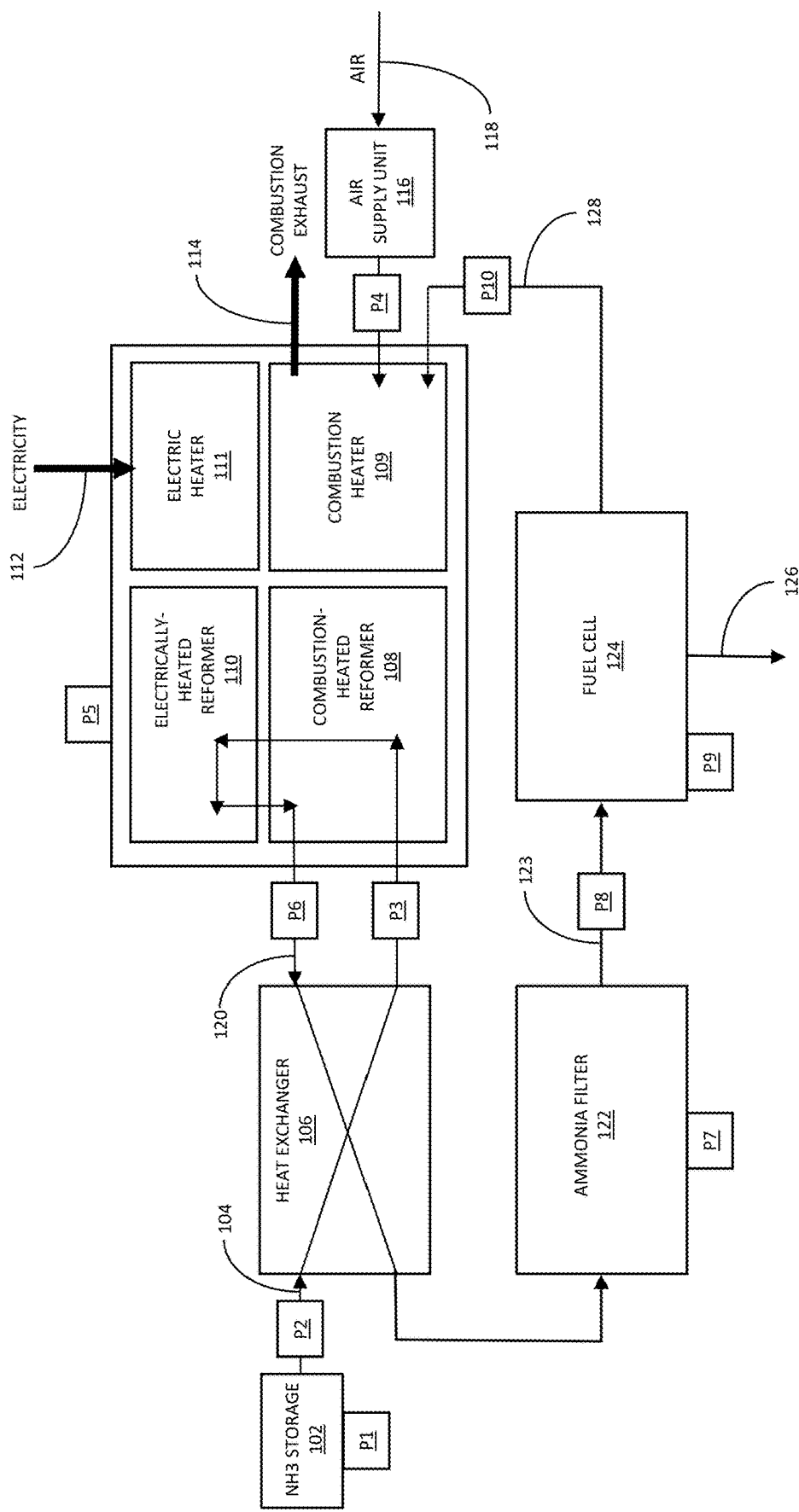

Referring now to FIG. 5B, the pressure sensors P1-P10 may be positioned in various components and/or fluid lines of the ammonia reforming system 100. The pressure sensor P1 may be configured to measure the pressure of ammonia stored in the tank 102. The pressure sensor P2 may be configured to measure the pressure of the incoming ammonia stream 104 before the stream 104 enters the heat exchanger 106. The pressure sensor P3 may be configured to measure the pressure of the incoming ammonia stream 104 after the stream 104 exits the heat exchanger 106. The pressure sensor P4 may be configured to measure the pressure of the air stream 118 after the stream 118 exits the air supply unit 116. The pressure sensor(s) P5 may be configured to measure the pressure of fluid at one or more inlets, one or more outlets, and/or inside of the reformers 108-110 and/or the combustion heater 109. For example, the pressure sensor(s) P5 may be configured to measure the pressure of the incoming ammonia stream 104 at the inlets of the reformers 108-110, the partially cracked reformate stream 120 inside the reformers 108-110, and/or the substantially cracked reformate stream 120 at the outlets of the reformers 108-110. In another example, the pressure sensor(s) 135 may be configured to measure the pressure of the reformate stream 120 and/or the air stream 118 at the inlets of the combustion heater 109, the combustion product gas 114 inside the combustion heater 109, and/or the combustion exhaust 114 at the outlets of the combustion heater 109. The pressure sensor P6 may be configured to measure the pressure of the reformate stream 120 after the reformate stream exits the reformer 108-110 and before the reformate stream 120 enters the heat exchanger 106. The pressure sensor(s) P7 may be configured to measure the pressure at one or more inlets, one or more outlets, and/or inside the ammonia filter 122. The pressure sensor P8 may be configured to measure the pressure of the filtered reformate stream 123 before the stream 123 enters the fuel cell 124. The pressure sensor(s) P9 may be configured to measure the pressure at one or more inlets, one or more outlets, and/or inside the fuel cell 124. The pressure sensor P10 may be configured to measure the pressure of the anode off-gas 128 after the off-gas 128 exits the fuel cell 124 and/or before the off-gas 128 enters the combustion heater 109.

Figure 5C:
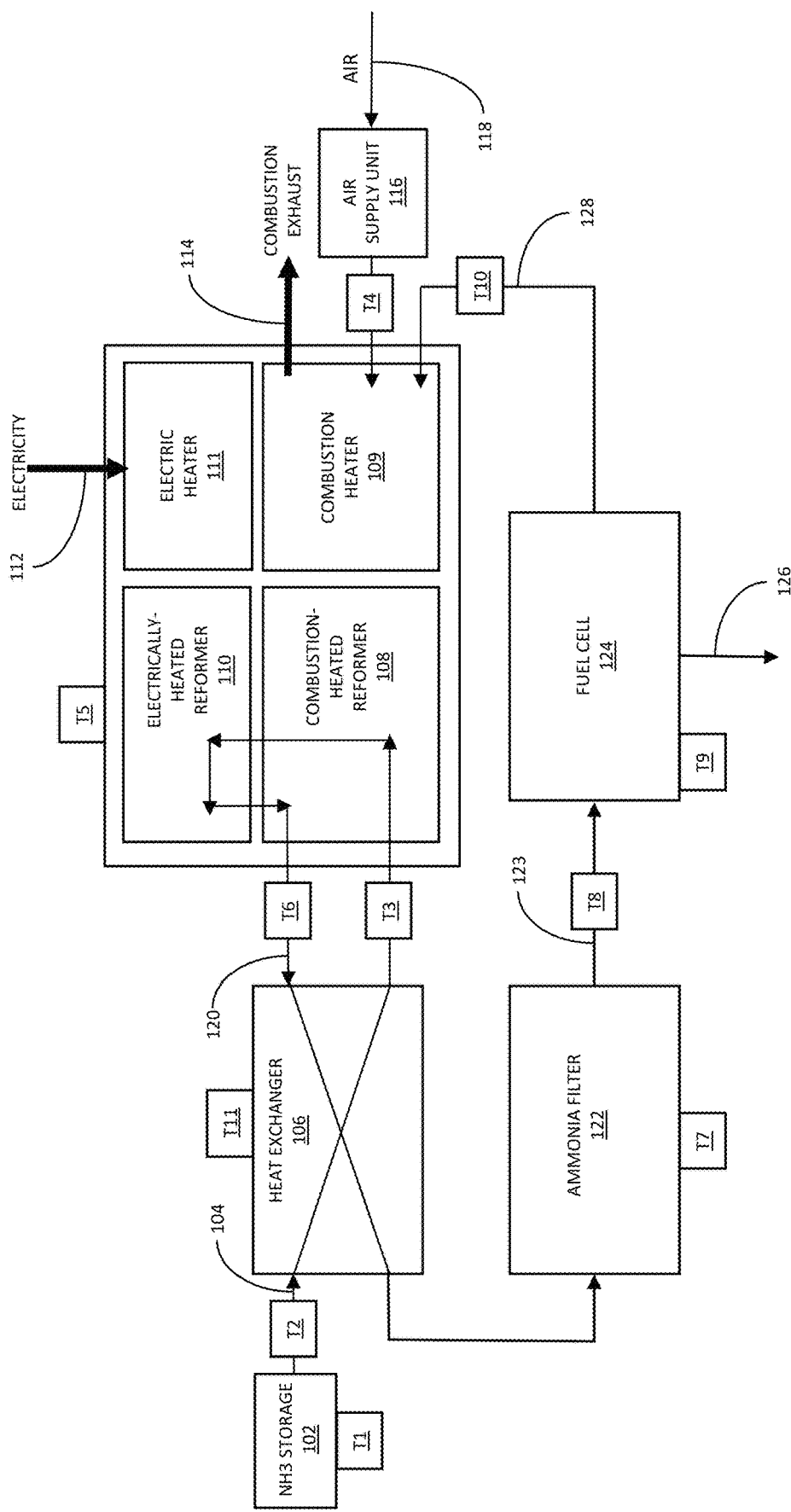

Referring now to FIG. 5C, the temperature sensors T1-T11 may be positioned in various components and/or fluid lines of the ammonia reforming system 100. The temperature sensor T1 may be configured to measure the temperature of ammonia stored in the tank 102. The temperature sensor T2 may be configured to measure the temperature of the incoming ammonia stream 104 before the stream 104 enters the heat exchanger 106. The temperature sensor T3 may be configured to measure the temperature of the incoming ammonia stream 104 after the stream 104 exits the heat exchanger 106. The temperature sensor T4 may be configured to measure the temperature of the air stream 118 after the stream 118 exits the air supply unit 116. The temperature sensor T5 may be configured to measure the temperature of fluid at one or more inlets, one or more outlets, and/or inside of the reformers 108-110 and/or the combustion heater 109. For example, the temperature sensor T5 may be configured to measure the temperature of the incoming ammonia stream 104 at the inlets of the reformers 108-110, the partially cracked reformate stream 120 inside the reformers 108-110, and/or the substantially cracked reformate stream 120 at the outlets of the reformers 108-110. In another example, the temperature sensor T5 may be configured to measure the temperature of the reformate stream 120 and/or the air stream 118 at the inlets of the combustion heater 109, the combustion product gas 114 inside the combustion heater 109, and/or the combustion exhaust 114 at the outlets of the combustion heater 109. The temperature sensor T6 may be configured to measure the temperature of the reformate stream 120 after the reformate stream exits the reformer 108-110 and before the reformate stream 120 enters the heat exchanger 106. The temperature sensor T7 may be configured to measure the temperature at one or more inlets, one or more outlets, and/or inside the ammonia filter 122. The temperature sensor T8 may be configured to measure the temperature of the filtered reformate stream 123 before the stream 123 enters the fuel cell 124. The temperature sensor T9 may be configured to measure the temperature at one or more inlets, one or more outlets, and/or inside the fuel cell 124. The temperature sensor T10 may be configured to measure the temperature of the anode off-gas 128 after the off-gas 128 exits the fuel cell 124 and before the off-gas 128 enters the combustion heater 109. The temperature sensor T11 may be configured to measure the temperature at one or more inlets, one or more outlets, and/or inside the heat exchanger 106).

It is noted that the temperature sensors T1-T11 may be configured to measure temperatures of the walls of the components and/or fluid lines of the ammonia reforming system 100 (as opposed to directly measuring the temperature of the fluids passing therethrough, for example, by physically contacting the sensors with the fluid streams).

Figure 5D:
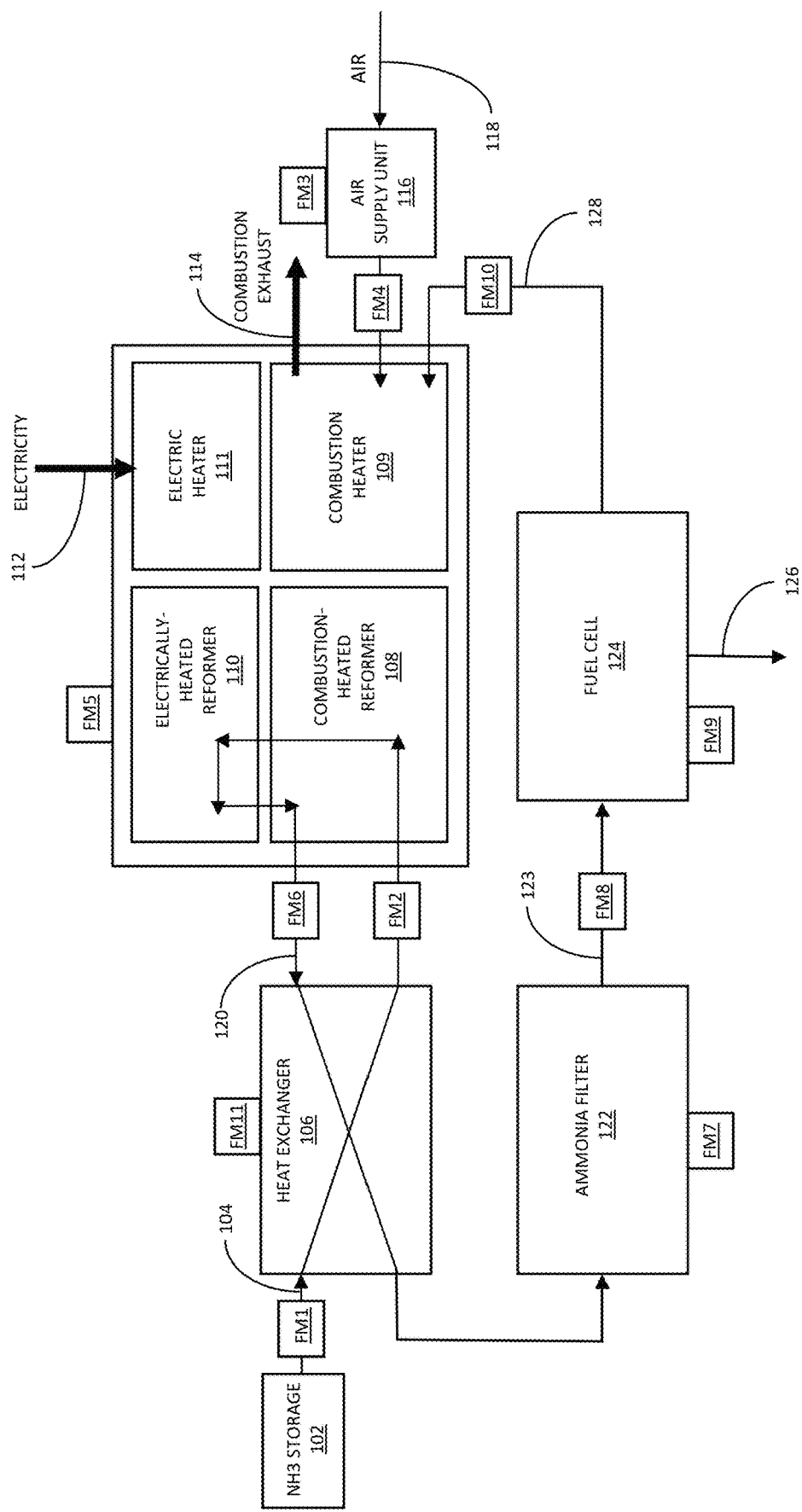

Referring now to FIG. 5D, the flow rate sensors FM1-FM11 (e.g., comprising flow meters or flow controllers) may be positioned in various components and/or fluid lines of the ammonia reforming system 100. FM1-FM11 may comprise one or more valves, one or more regulators, or one or more flow rate sensors configured to monitor and/or control the flow rates of fluid streams of the ammonia reforming system 100. The flow meter FM1 may be configured to measure the flow rate of the incoming ammonia stream 104 before the stream 104 enters the heat exchanger 106. The flow meter FM2 may be configured to measure the flow rate of the incoming ammonia stream 104 after the stream 104 exits the heat exchanger 106. The flow meter FM3 may be configured to measure the flow rate of the air stream 118 at or inside the air supply unit 116. The flow meter FM4 may be configured to measure the flow rate of the air stream 118 after the stream 118 exits the air supply unit 116. The flow meter FM5 may be configured to measure the flow rate of fluid at one or more inlets, one or more outlets, and/or inside of the reformers 108-110 and/or the combustion heater 109. For example, the flow meter FM5 may be configured to measure the flow rate of the incoming ammonia stream 104 at the inlets of the reformers 108-110, the partially cracked reformate stream 120 inside the reformers 108-110, and/or the substantially cracked reformate stream 120 at the outlets of the reformers 108-110. In another example, the flow meter FM5 may be configured to measure the flow rate of the reformate stream 120 or anode off-gas 128 and/or the air stream 118 at the inlets of the combustion heater 109, the combustion product gas 114 inside the combustion heater 109, and/or the combustion exhaust 114 at the outlets of the combustion heater 109. The flow meter FM6 may be configured to measure the flow rate of the reformate stream 120 after the reformate stream exits the reformer 108-110 and before the reformate stream 120 enters the heat exchanger 106. The flow meter FM7 may be configured to measure the flow rate at one or more inlets, one or more outlets, and/or inside the ammonia filter 122. The flow meter FM8 may be configured to measure the flow rate of the filtered reformate stream 123 before the stream 123 enters the fuel cell 124. The flow meter FM9 may be configured to measure the flow rate at one or more inlets, one or more outlets, and/or inside the fuel cell 124. The flow meter FM10 may be configured to measure the flow rate of the anode off-gas 128 after the off-gas 128 exits the fuel cell 124 and before the off-gas 128 enters the combustion heater 109. The flow meter FM11 may be configured to measure the one or more flow rates the one or more inlets, one or more outlets, or one or more locations in the heat exchanger 106.

It is noted that, in some embodiments, the flow rate meters FM1-FM11 may comprise pumps, valves, blowers, compressors, or other fluid supply device, and the respective flow rate measurements may be performed by correlating a parameter of the fluid supply device with the flow rate. For example, the flow meter FM3 may be the air supply unit 116 itself. If the air supply unit 116 comprises a valve, the flow rate may be measured by correlating a size of an opening of the valve and/or one or more pressure measurements in the air supply unit 116. If the air supply unit comprises a pump or a compressor, the flow rate may be measured by at least partly correlating a revolutions-per-minute (RPM) of the pump or the compressor.

Figure 5E:
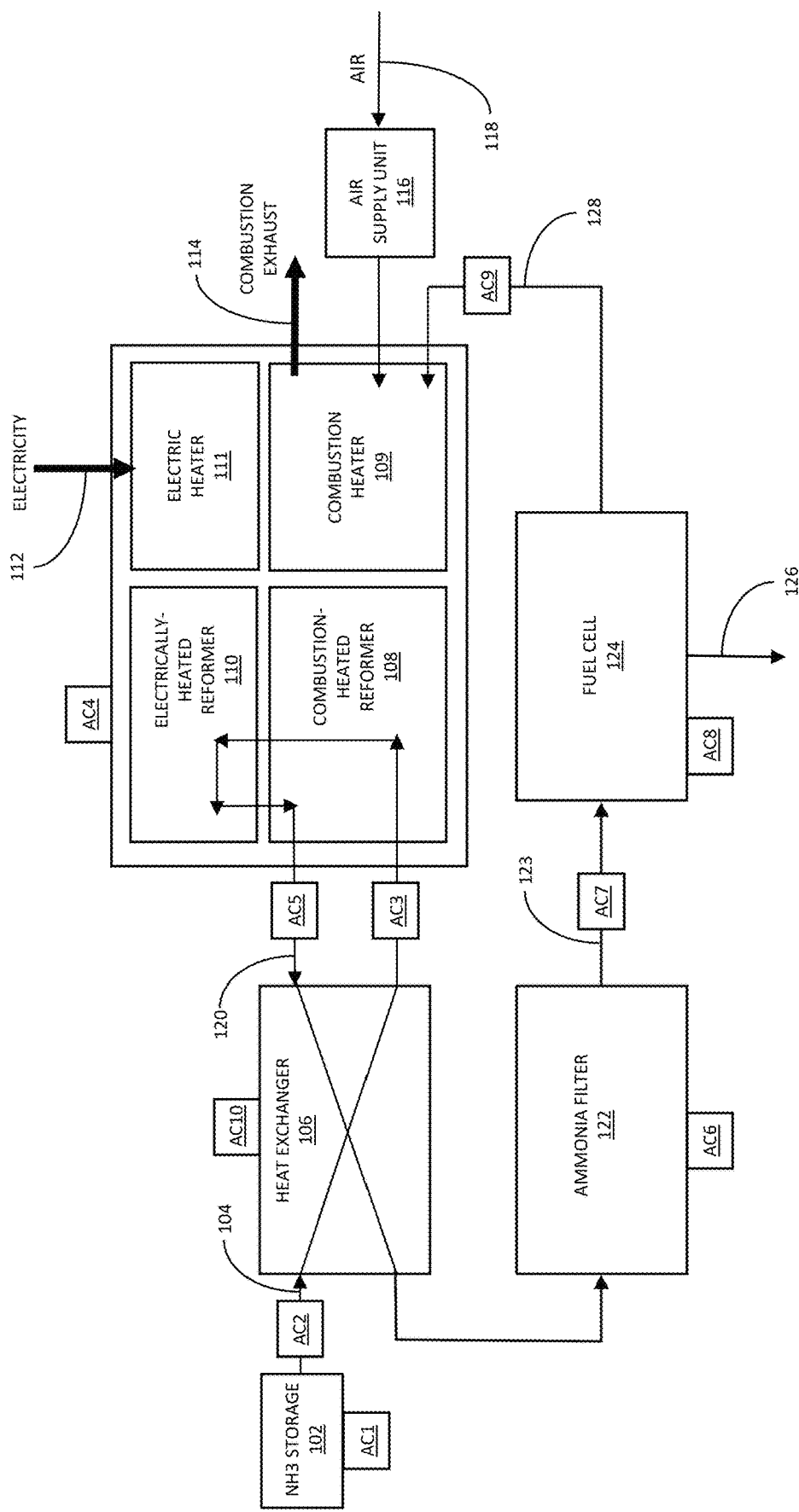

Referring now to FIG. 5E, the ammonia sensors AC1-AC10 may be positioned in various components and/or fluid lines of the ammonia reforming system 100. The ammonia sensor AC1 may be configured to measure the concentration of ammonia in the storage tank 102. The ammonia sensor AC2 may be configured to measure the concentration of ammonia in the incoming ammonia stream 104 before the stream 104 enters the heat exchanger 106. The ammonia sensor AC3 may be configured to measure the concentration of ammonia in the incoming ammonia stream 104 after the stream 104 exits the heat exchanger 106. The ammonia sensor AC4 may be configured to measure the concentration of ammonia at one or more inlets, one or more outlets, and/or inside of the reformers 108-110 and/or the combustion heater 109. For example, the ammonia sensor AC4 may be configured to measure the concentration of ammonia in the incoming ammonia stream 104 at the inlets of the reformers 108-110, the partially cracked reformate stream 120 inside the reformers 108-110, and/or the substantially cracked reformate stream 120 at the outlets of the reformers 108-110. In another example, the ammonia sensor AC4 may be configured to measure the concentration of ammonia in the reformate stream 120 and/or the air stream 118 at the inlets of the combustion heater 109, the combustion product gas 114 inside the combustion heater 109, and/or the combustion exhaust 114 at the outlets of the combustion heater 109. The ammonia sensor AC5 may be configured to measure the concentration of ammonia in the reformate stream 120 after the reformate stream exits the reformer 108-110 and before the reformate stream 120 enters the heat exchanger 106. The ammonia sensor AC6 may be configured to measure the concentration of ammonia at one or more inlets, one or more outlets, and/or inside the ammonia filter 122. The ammonia sensor AC7 may be configured to measure the concentration of ammonia in the filtered reformate stream 123 before the stream 123 enters the fuel cell 124. The ammonia sensor AC8 may be configured to measure the concentration of ammonia at one or more inlets, one or more outlets, and/or inside the fuel cell 124. The ammonia sensor AC9 may be configured to measure the concentration of ammonia in the anode off-gas 128 after the off-gas 128 exits the fuel cell 124 and before the off-gas 128 enters the combustion heater 109. The ammonia sensor AC10 may be configured to measure the concentration of ammonia at one or more inlets, one or more outlets, and/or inside the heat exchanger 106.

Figure 5F:
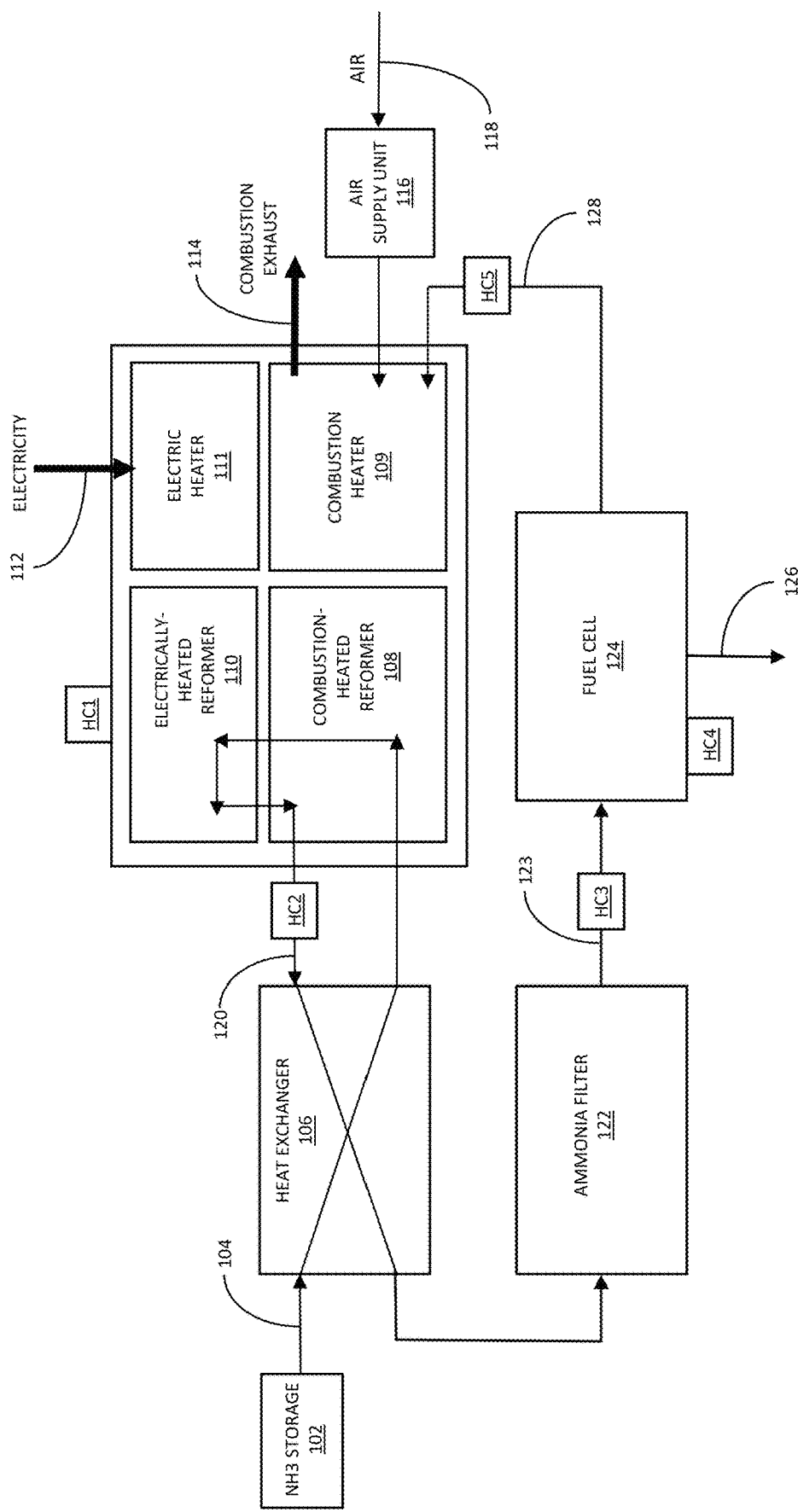

Referring now to FIG. 5F, the hydrogen concentration sensors HC1-HC5 positioned in various components and/or fluid lines of the ammonia reforming system 100. The hydrogen concentration sensor HC1 may be configured to measure the concentration of hydrogen at one or more inlets, one or more outlets, and/or inside of the reformers 108-110 and/or the combustion heater 109. For example, the hydrogen concentration sensor HC1 may be configured to measure the concentration of hydrogen in the incoming ammonia stream 104 at the inlets of the reformers 108-110, the partially cracked reformate stream 120 inside the reformers 108-110, and/or the substantially cracked reformate stream 120 at the outlets of the reformers 108-110. In another example, the hydrogen concentration sensor HC1 may be configured to measure the concentration of hydrogen in the reformate stream 120, the fuel cell off-gas 128, and/or the air stream 118 at the inlets of the combustion heater 109, the combustion product gas 114 inside the combustion heater 109, and/or the combustion exhaust 114 at the outlets of the combustion heater 109. The hydrogen concentration sensor HC2 may be configured to measure the concentration of hydrogen in the reformate stream 120 after the reformate stream exits the reformer 108-110 and before the reformate stream 120 enters the heat exchanger 106. The hydrogen concentration sensor HC3 may be configured to measure the concentration of hydrogen in the filtered reformate stream 123 before the stream 123 enters the fuel cell 124. The hydrogen concentration sensor HC4 may be configured to measure the concentration of hydrogen at one or more inlets, one or more outlets, and/or inside the fuel cell 124. The hydrogen concentration sensor HC5 may be configured to measure the concentration of hydrogen in the anode off-gas 128 after the off-gas 128 exits the fuel cell 124 and before the off-gas 128 enters the combustion heater 109.

Figure 5G:
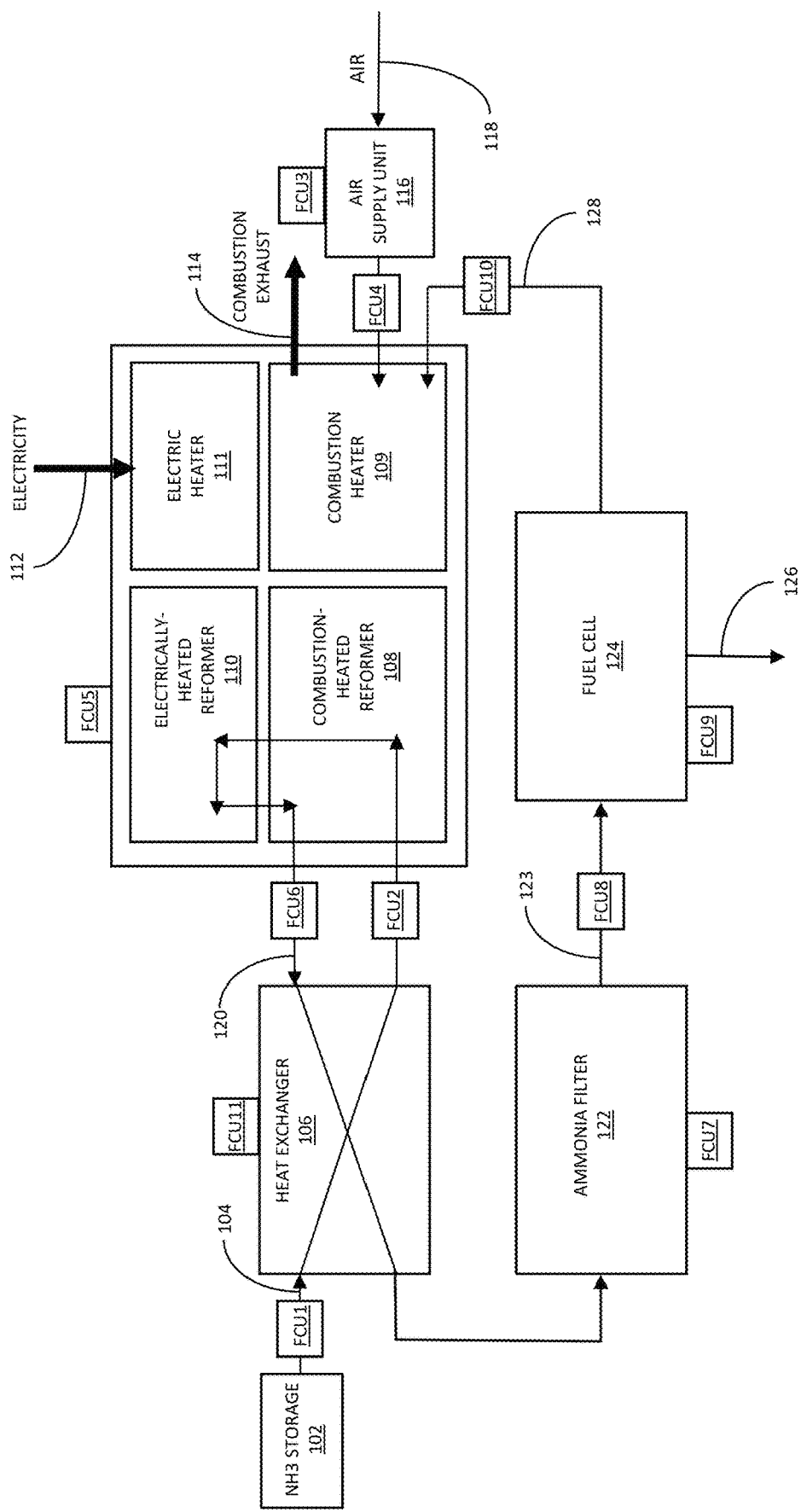

Referring now to FIG. 5G, the flow control units FCU1-FCU11 may be positioned in various components and/or fluid lines of the ammonia reforming system 100. FCU1-FCU11 may configured to monitor and/or control (i.e., increase, decrease, modulate, or maintain) one or more flow rates and/or one or more pressures of the ammonia reforming system 100. FCU1-FCU11 may comprise one or more pressure drop elements configured to reduce pressure, one or more pumps, one or more check valves, one or more one-way valves, one or more three-way valves, one or more restrictive orifices, one or more valves, one or more flow regulators, one or more pressure regulators, one or more back pressure regulators, one or more pressure reducing regulators, one or more back flow regulators, one or more flow meters, one or more flow controllers, or any combination thereof. In some cases, the flow control units FCU1-FCU11 may be controlled manually, automatically, or electronically.

The flow control unit FCU1 may be configured to measure and/or control the flow rate and/or pressure of the incoming ammonia stream 104 before the stream 104 enters the heat exchanger 106. The flow control unit FCU2 may be configured to measure and/or control the flow rate and/or pressure of the incoming ammonia stream 104 after the stream 104 exits the heat exchanger 106. The flow control unit FCU3 may be configured to measure and/or control the flow rate and/or pressure of the air stream 118 at or inside the air supply unit 116. The flow control unit FCU4 may be configured to measure and/or control the flow rate and/or pressure of the air stream 118 after the stream 118 exits the air supply unit 116. The flow control unit FCU5 may be configured to measure and/or control the flow rate and/or pressure of fluid at one or more inlets, one or more outlets, and/or inside the reformers 108-110 and/or the combustion heater 109. For example, the flow control unit FCU5 may be configured to measure and/or control the flow rate and/or pressure of the incoming ammonia stream 104 at the inlets of the reformers 108-110, the partially cracked reformate stream 120 inside the reformers 108-110, and/or the substantially cracked reformate stream 120 at the outlets of the reformers 108-110. In another example, the flow control unit FCU5 may be configured to measure and/or control the flow rate and/or pressure of the reformate stream 120 or anode off-gas 128 and/or the air stream 118 at the inlets of the combustion heater 109, the combustion product gas 114 inside the combustion heater 109, and/or the combustion exhaust 114 at the outlets of the combustion heater 109. The flow control unit FCU6 may be configured to measure and/or control the flow rate and/or pressure of the reformate stream 120 after the reformate stream exits the reformer 108-110 and before the reformate stream 120 enters the heat exchanger 106. The flow control unit FCU7 may be configured to measure and/or control the flow rate and/or pressure at one or more inlets, one or more outlets, and/or inside the ammonia filter 122. The flow control unit FCU8 may be configured to measure and/or control the flow rate and/or pressure of the filtered reformate stream 123 before the stream 123 enters the fuel cell. The flow control unit FCU9 may be configured to measure and/or control the flow rate and/or pressure at one or more inlets, one or more outlets, and/or inside the fuel cell 124. The flow control unit FCU10 may be configured to measure and/or control the flow rate and/or pressure of the anode off-gas 128 after the off-gas 128 exits the fuel cell 124 and before the off-gas 128 enters the combustion heater 109. The flow control unit FM11 may be configured to measure and/or control the flow rate and/or pressure at one or more inlets, one or more outlets, and/or inside the heat exchanger 106.

It is noted that, in some embodiments, the flow control units FCU1-FCU11 may comprise pumps, valves, blowers, compressors, or other fluid supply devices, and the respective flow rate measurements may be performed by correlating a parameter of the fluid supply device with the flow rate. For example, the flow control unit FCU3 may be the air supply unit 116 itself. If the air supply unit 116 comprises a valve, the flow rate may be measured by correlating a size of an opening of the valve and/or one or more pressure measurements in the air supply unit 116. If the air supply unit 116 comprises a pump or a compressor, the flow rate may be measured by at least partly correlating a revolutions-per-minute (RPM) of the pump or the compressor. In some cases, the flow control unit FCU1-FCU11 and the flow meter FM1-FM11 are interchangeable and/or may have one or more identical or similar functionalities.

In some instances, the flow control units FCU1-FCU11 and/or flow rate meters FM1-FM11 may maintain a flow rate to a target flow rate within a selected tolerance. In some instances, the selected tolerance may be at least about 1, 5, 10, 20, 30, 40, 50, 60, 70, 80, or 90%. In some instances, the selected tolerance may be at most about 1, 5, 10, 20, 30, 40, 50, 60, 70, 80, or 90%. In some instances, the selected tolerance may be between about 1 and 90, 5 and 80, 10 and about 70, 20 and 60, 30 and 50, or 40 and 90%. In some instances, the selected tolerance may be less than 20%.

In some cases, the flow control units FCU1-FCU11 and/or flow rate meters FM1-FM11 may increase a flow rate to a target flow rate at a predefined ramp-up rate (within a selected tolerance). In some cases, the selected tolerance may be at least about 1, 5, 10, 20, 30, 40, 50, 60, 70, 80, or 90%. In some cases, the selected tolerance may be at most about 1, 5, 10, 20, 30, 40, 50, 60, 70, 80, or 90%. In some cases, the selected tolerance may be between about 1 and 90, 5 and 80, 10 and 70, 20 and 60, 30 and 50, or 40 and 90%. In some cases, the selected tolerance may be less than 20%.

In some cases, the flow control units FCU1-FCU11 and/or flow rate meters FM1-FM11 may decrease a flow rate to a target flow rate at a predefined ramp-down rates (within a selected tolerance). In some cases, the selected tolerance may be at least about 1, 5, 10, 20, 30, 40, 50, 60, 70, 80, or 90%. In some cases, the selected tolerance may be at most about 1, 5, 10, 20, 30, 40, 50, 60, 70, 80, or 90%. In some cases, the selected tolerance may be between about 1 and 90, 5 and 80, 10 and 70, 20 and 60, 30 and 50, or 40 and 90%. In some cases, the selected tolerance may be less than 20%.

Figure 5H:
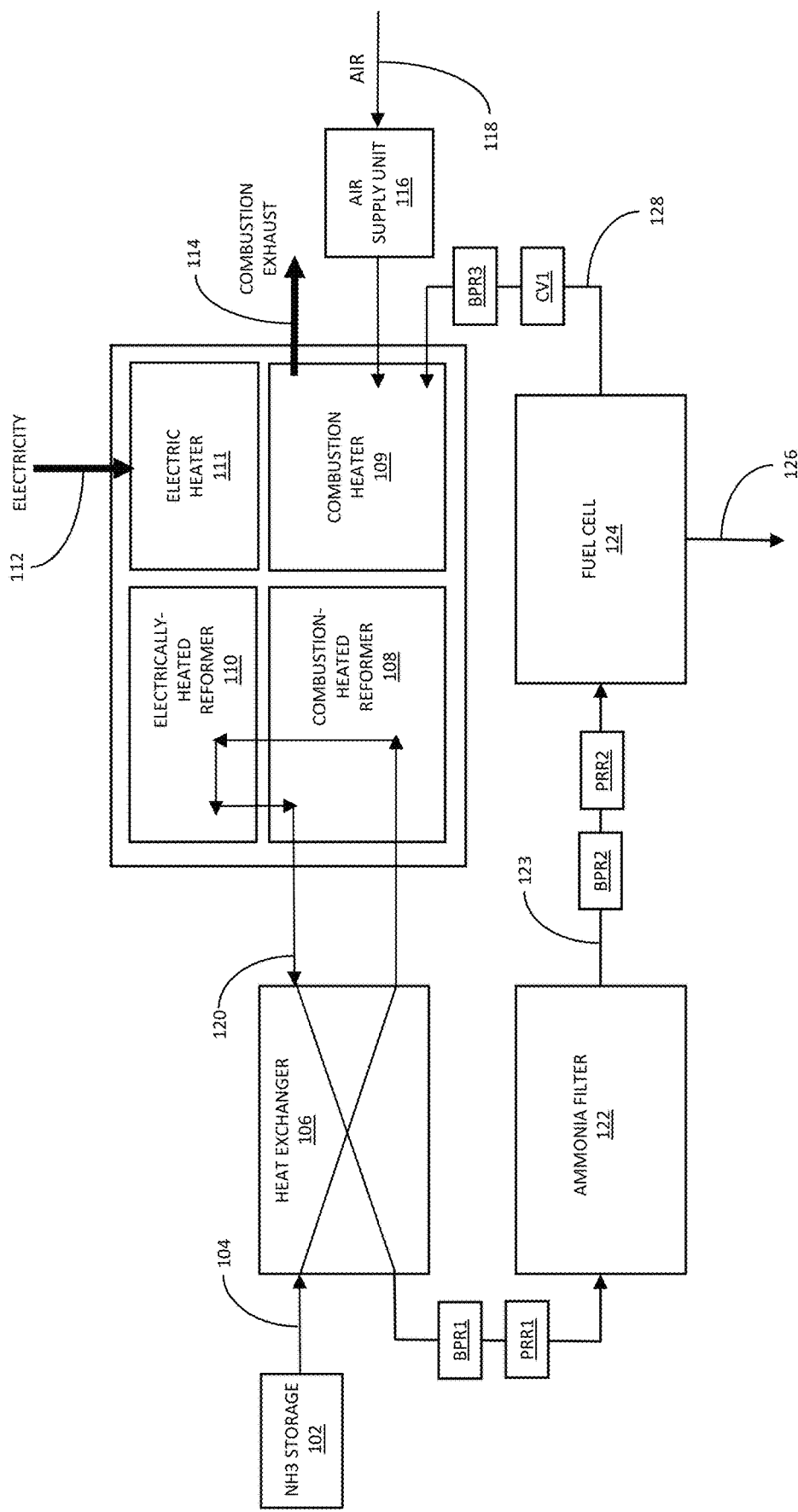

Referring now to FIG. 5H, one or more pressure regulators may be positioned in various components and/or fluid lines of the ammonia reforming system 100. For example, a back pressure regulator BPR1 (or a pressure reducing regulator PRR1) may be configured to maintain a pressure of the reformate stream 120 after the reformate stream exits the reformer 108-110, after (or before) the reformate stream 120 enters the heat exchanger 106, or before the reformate stream 120 enters the ammonia filter 122. A back pressure regulator BPR2 (or a pressure reducing regulator PRR2) may be configured to maintain a pressure of the filtered reformate stream 123 after the reformate stream 123 exits the ammonia filter 122. A back pressure regulator BPR3 (or a check valve CV1) may be configured to maintain a pressure of the anode off-gas 128.

Fault Detection

Figure 5I:
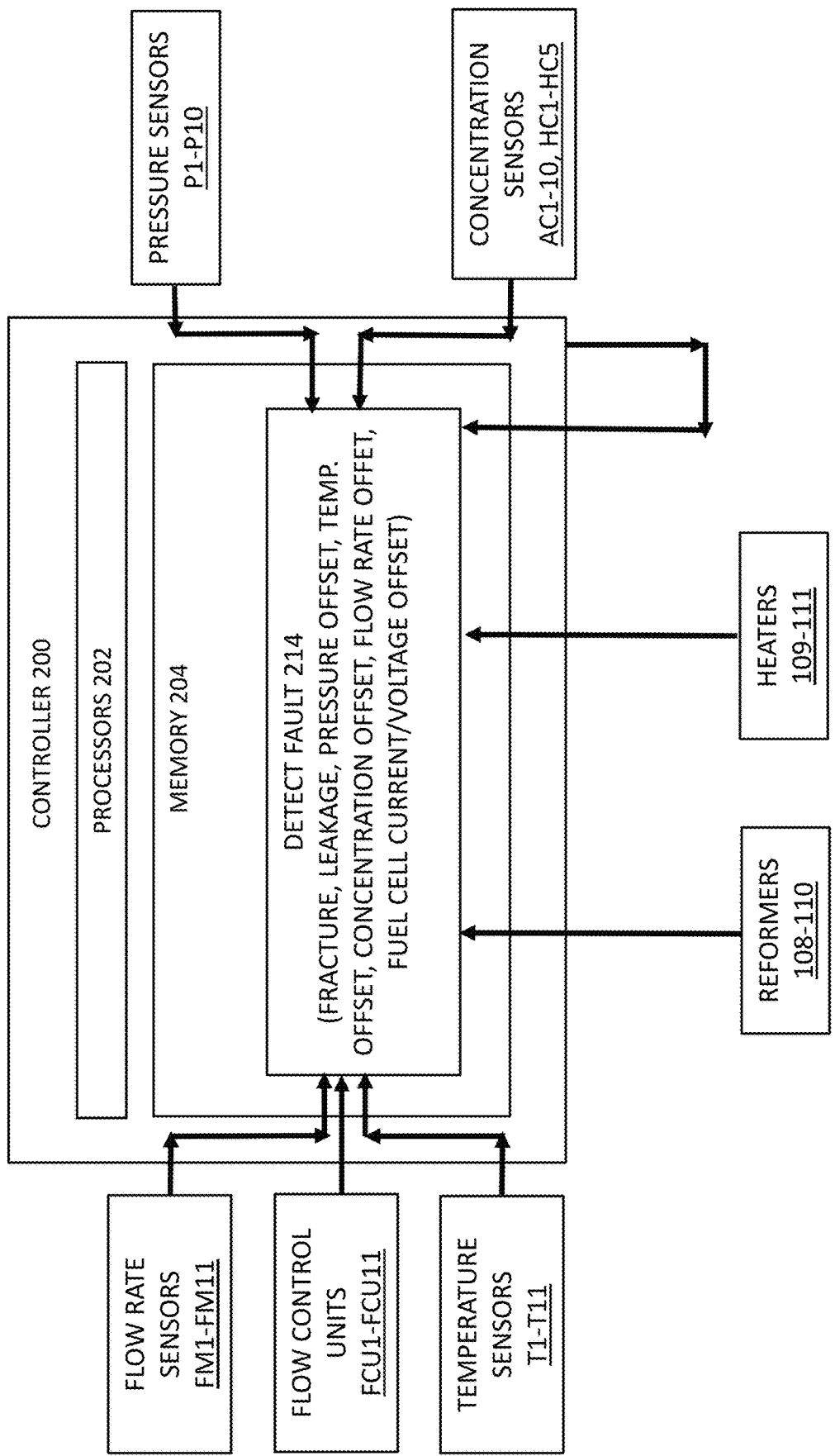

Referring now to FIG. 5I, a fault detection module 214 may be stored in the memory 204 of the controller 200 and may be configured to detect one or more faults in the ammonia reforming system 100 (e.g., by utilizing the sensors P1-P10, T1-T11, FM1-FM11, AC1-AC10, and HC1-HC5). The faults may include major faults or minor faults.

An example of a fault may comprise a fracture of and/or leak from a reactor vessel (e.g., a fracture in the reformers 108-110 or the heater 109). The fracture and/or leak may be detected after a pressure sensor P1-P10 measures a sudden drop in pressure of the reformate stream 120 in the combustion heater 109, or a sudden drop in pressure of the incoming ammonia stream 104 (or the partially cracked reformate stream 120) in the combustion-heated reformer 108 or the electrically-heated reformer 110. For example, the sudden drop in pressure may comprise a greater than 50% pressure drop (e.g., from 10 bara to less than or equal to 5 bara) within a predefined time. The predefined time may be at least about 1, 5, 10, 20, 30, 40, 50, 60, 70, 80, or 90 minutes. In some cases, the predefined time may be at most about 1, 5, 10, 20, 30, 40, 50, 60, 70, 80, or 90 minutes.

Another example of a fault may comprise a leakage of ammonia above predetermined leakage levels. The leakage of ammonia may be detected after an ammonia concentration sensor AC1-AC10 detects a concentration of ammonia greater than a threshold concentration (e.g., about 25 ppm) adjacent or near any component or fluid line of the ammonia reforming system 100. In some instances, to detect the leakage, the ammonia concentration sensor AC1-AC10 may be positioned outside the wall(s) or container(s) of the component or fluid line of the ammonia reforming system 100.

An example of a fault may comprise a temperature offset (e.g., by a tolerance about 10% or more) from a target temperature range. For example, a target temperature range of the reformers 108-110 may comprise about 400 to about 600° C., and a temperature sensor T1-T11 may measure a temperature of less than about 360° C. or greater than about 660° C., indicating a temperature offset fault. In some cases, the reformers 108 and/or the reformer 110 may be maintained at a target temperature range of at least about 300, 350, 400, 450, 500, 550, 600, 650, 700, 750, or 800° C., and at most about 400, 450, 500, 550, 600, 650, 700, 750, 800, or 900° C. In some cases, the target temperature ranges between about 300 and 900, 350 and 800, 400 and 750, 450 and 700, 500 and 650, or 550 and 600° C. In some cases, a target temperature range of the reformer 108 and a target temperature range of the reformer 110 may at least partially overlap.

In some cases, a temperature offset is defined by a selected tolerance of a target temperature (or a tolerance of a lower limit of a target temperature range, or an upper limit of a target temperature range). The selected tolerance may be at least about 1, 5, 10, 20, 30, 40, 50, 60, 70, 80, 90, or 100% of the target temperature. The selected tolerance may be at most about 1, 5, 10, 20, 30, 40, 50, 60, 70, 80, 90, or 100% of the target temperature. In some cases, the selected tolerance may be between about 1 and 100, 5 and 90, 10 and 80, 20 and 70, 30 and 60, or 40 and 50% of the target temperature.

In another example, a fuel cell target temperature comprises about an ambient temperature to about 100° C., about 100° C. to about 150° C., or about 120° C. to about 200° C. For example, based on the target fuel cell temperature being about 120° C. to about 200° C., the temperature offset fault may be detected after a temperature sensor T1-T11 measures a fuel cell temperature of less than about 108° C. or greater than about 220° C.

An example of a fault may comprise a pressure offset (e.g., by a tolerance about 10% or more) from a target pressure range. For example, a target pressure range in the reformers 108-110 may comprise about 1 to about 5 bar-absolute (bara), about 3 to about 8 bara, about 5 to about 10 bara, or about 10 to about 20 bara. For example, if the target pressure range in the reformer is about 10 to about 20 bara a pressure sensor P1-P10 may measure a pressure of less than about 9 bara or greater than about 22 bara, indicating a pressure offset fault.

In some cases, a pressure offset is defined by a selected tolerance of a target pressure (or a tolerance of a lower limit of a target pressure range, or an upper limit of a target pressure range). The selected tolerance may be at least about 1, 5, 10, 20, 30, 40, 50, 60, 70, 80, 90, or 100% of the target pressure. The selected tolerance may be at most about 1, 5, 10, 20, 30, 40, 50, 60, 70, 80, 90, or 100% of the target pressure. In some cases, the selected tolerance may be between about 1 and 100, 5 and 90, 10 and 80, 20 and 70, 30 and 60, or 40 and 50% of the target pressure. The target pressure (or target pressure range) may be a pressure (or a pressure range) at an outlet or inside of the $NH_3$ storage tank 102, an inlet, an outlet, or inside of the combustion-heated reformer 108, an inlet, an outlet, or inside of the combustion heater 109, an inlet, an outlet, or inside of the electrically heated reformer 110, an inlet, an outlet, or inside of the heat exchanger 106, an inlet, an outlet, or inside of the ammonia filter 122, or an inlet, an outlet, or inside of the fuel cell 124.

An example of a fault may comprise a concentration offset (e.g., by a tolerance about 10% or more) from a target concentration range (or a tolerance of a lower limit of a target concentration range, or an upper limit of a target concentration range). A target ammonia concentration range in the filtered reformate stream 123 may comprise about 0.001 to about 0.01 ppm, about 0.01 to about 0.1 ppm, about 0.1 to about 1 ppm, about 0.1 ppm to about 100 ppm. For example, if the target ammonia concentration range is about 0.1 ppm to about 100 ppm, an ammonia concentration sensor AC1-AC10 may measure a concentration of greater than about 110 ppm, indicating a concentration offset fault.

In some cases, a concentration offset is defined by a selected tolerance of a target concentration. The selected tolerance may be at least about 1, 5, 10, 20, 30, 40, 50, 60, 70, 80, 90, or 100% of the target concentration. The selected tolerance may be at most about 1, 5, 10, 20, 30, 40, 50, 60, 70, 80, 90, or 100% of the target concentration. In some cases, the selected tolerance may be between about 1 and 100, 5 and 90, 10 and 80, 20 and 70, 30 and 60, or 40 and 50% of the target concentration.

After a fault is detected using the fault detection module 214, in some instances, the controller 200 may execute or perform a corrective action. For example, after a fault is detected, the controller may execute or perform a complete shutdown of the ammonia reforming system 100 by stopping a flow rate of the incoming $NH_3$ stream 104, power provided the heaters 109-111, and/or the fuel cell 124. In another example, after a fault is detected, the controller may execute or perform a partial shutdown of the ammonia reforming system 100 by reducing power provided to the heater 109-111 and/or the fuel cell 124.

In some cases, after a fault is detected by the fault detection module 214, the combustion-heated reformer 108 may operate in a hot-standby mode to maintain the temperature in the combustion-heated reformer 108 within a target temperature range (the hot-standby mode is described in further detail with respect to FIG. 6L). In some cases, the hot standby mode (e.g., without the fuel cell outputting power) may be maintained until the shutdown process is executed. In some cases, the hot standby mode (e.g., without the fuel cell outputting power) may be maintained until fuel cell power output resumes.

Anode Off-Gas and Cathode Off-Gas as Reactants in Combustion Heater

Figure 6A:
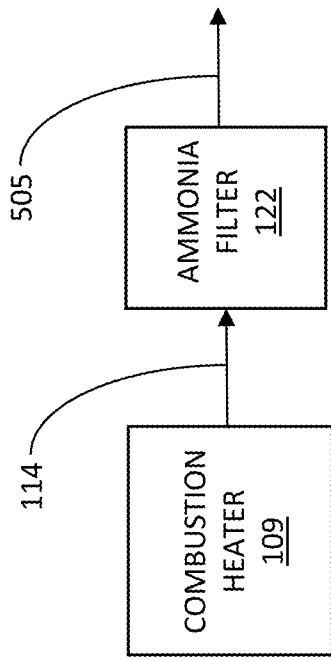
FIGS. 6A-6T are block diagrams illustrating additional or alternative components and processes of the ammonia reforming system shown in FIGS. 1A-4B, in accordance with one or more embodiments of the present disclosure.

FIG. 6A is a block diagram illustrating the utilization of an anode off-gas 503 and a cathode off-gas 504 directed from the fuel cell 124 (for example, via one or more outlet ports in the fuel cell 124) as reactants for combustion in the combustion heater 109. The anode off-gas 503 may be substantially similar or substantially identical to the off-gas 128 described with respect to FIGS. 1A-4B.

The fuel cell may receive an anode input 501 (at least hydrogen, for example, in the reformate stream 120) and a cathode input 502 (at least oxygen, for example, in the air stream 118), for example, via one or more inlet ports in the fuel cell.

Unconsumed hydrogen (e.g., that is not consumed by the fuel cell 124) may be supplied as the anode off-gas 503, and unconsumed oxygen (e.g., that is not consumed by the fuel cell 124) may be supplied as a cathode off-gas 504 (as reactants for the combustion reaction in the combustion heater 109). In some cases, water may be removed from the anode off-gas 503 and/or the cathode off-gas 504 before the anode off-gas 503 and/or the cathode off-gas 504 are provided to the combustion heater 109 (e.g., using a condenser or a filter).

Combustion Exhaust to Regenerate Adsorbents

Figure 6B:
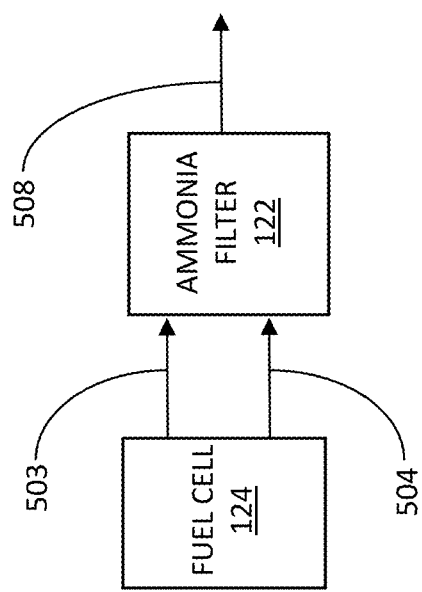

FIG. 6B is a block diagram illustrating the utilization of heat from the combustion exhaust 114 (emitted by combustion heater 109) to regenerate the ammonia filter 122 (e.g., via temperature swing adsorption). The desorbed ammonia 505 may be vented to the atmosphere, combusted in the combustion heater 109, or mixed with water and discharged externally.

In some cases, the combustion exhaust stream 114 is used to regenerate the ammonia filter 122 by directly contacting the combustion exhaust stream 114 with the ammonia filter 122 (i.e., a direct purge of the filter material). In some cases, the combustion exhaust stream 114 is used to regenerate the ammonia filter 122 by transferring heat to the ammonia filter 122 via a heat exchanger (and/or an intermediate fluid, such as a glycol and/or water).

Reduction of NOx in Combustion Exhaust

Figure 6C:
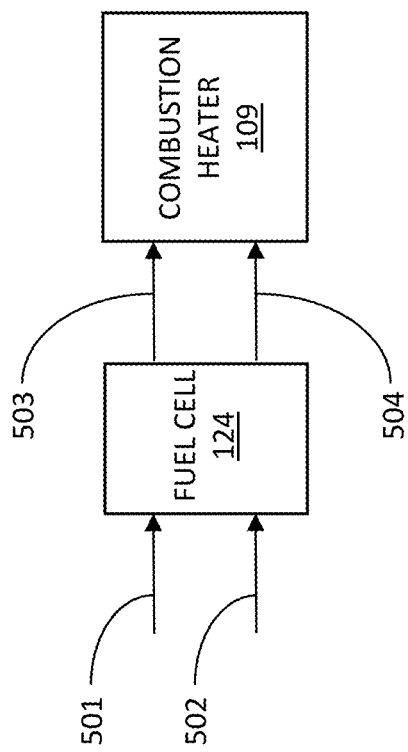

FIG. 6C is a block diagram illustrating the reduction of nitrogen oxides (NOR, e.g., NO, $NO_2$, $N_2O$, etc.) in the combustion exhaust 114 emitted by the combustion heater 109. A selective catalytic reduction (SCR) catalyst 506, such as platinum or palladium, may be used to convert NOR into $H_2O$ and $N_2$. A reductant such as anhydrous ammonia ($NH_3$), aqueous ammonia ($NH_4OH$), or urea ($CO(NH_2)_2$) solution may be added to the exhaust 114 to react with NOR. The purified exhaust 507 may then be vented to the atmosphere. This removal of harmful NOR emissions advantageously reduces harm to the environment and living organisms.

Anode Off-Gas and Cathode Off-Gas to Regenerate Adsorbents

Figure 6D:
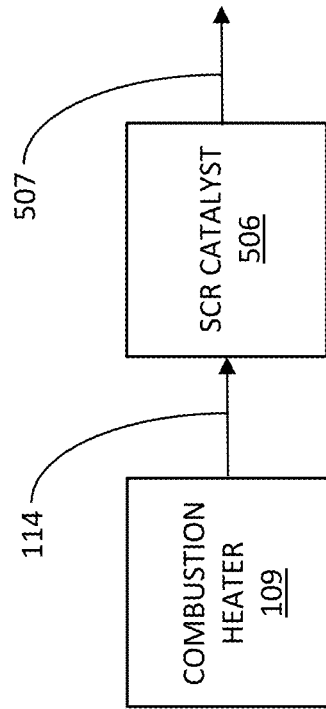

FIG. 6D is a block diagram illustrating the utilization of the anode off-gas 503 and/or the cathode off-gas 504 to regenerate the ammonia filter 122 (e.g., via temperature swing adsorption). The desorbed ammonia 508 may be vented to the atmosphere, or mixed with water and discharged externally. In some cases, combustion of the hydrogen in the anode off-gas 503 may provide heat to regenerate the ammonia filter 122. In some cases, lower temperature catalytic combustion of the hydrogen in the anode off-gas 503 may provide heat to regenerate the ammonia filter 122.

Oxidation of $NH_3$ in Reformate Stream

Figure 6E:
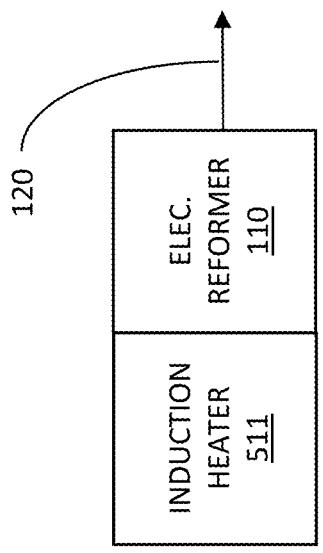

FIG. 6E is a block diagram illustrating the oxidation of trace or residual $NH_3$ in the reformate stream 120 output by the combustion-heated reformer 108 and/or the electrically-heated reformer 110. A selective ammonia oxidation (SAO) catalyst 509, such as tungsten, may be used to convert the trace or residual $NH_3$ into $N_2$ and $H_2O$. Air (including at least oxygen, e.g., the air stream 118) may be provided to the SAO catalyst 509 to react with the $NH_3$. The purified reformate stream 510 may be provided to the fuel cell 124 (to generate electricity) or to the combustion heater 109 (to be combusted for self-heating the reformer 108). The SAO catalyst 509, when combined with the ammonia filter 122, may advantageously reduce the size (e.g., volume and weight) of the ammonia filter 122, and may reduce the need to periodically replace cartridges in (or periodically regenerate) the ammonia filter 122. In some cases, introducing air (including at least oxygen) may combust and remove at least part of the residual $NH_3$ and $H_2$ (by converting into $N_2$ and $H_2O$) without the SAO catalyst 509.

Induction Heater

Figure 6F:
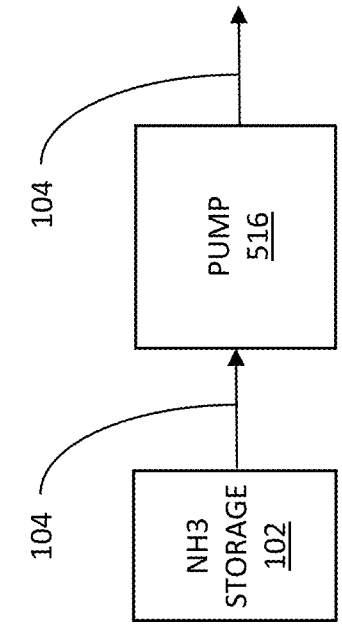

FIG. 6F is a block diagram illustrating the heating of the electrically-heated reformer 110 using an induction heater 511. The induction heater 511 may comprise a magnetically-sensitive material in contact with the $NH_3$ reforming catalyst in the electrically-heated reformer 110, in addition to a magnetic device (e.g., an electrical coil or other magnet) that generates a magnetic field to heat the magnetically-sensitive material (e.g., via an electromagnetic interaction).

Heat Pump

Figure 6G:
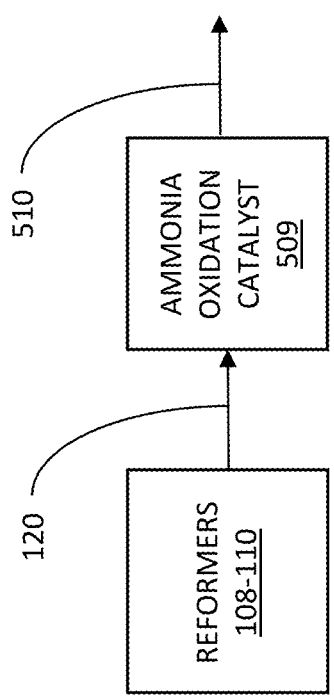

FIG. 6G is a block diagram illustrating the utilization of a heat pump 514 to transfer heat 513 from a relatively cold component 512 to a relatively hot component 515. The heat pump 514 may be driven by electricity (for example, vapor compression cycle), or driven by heat (for example, adsorption refrigeration), or a combination of both.

The components 512 and 514 may be any component of the ammonia reforming system 100 described in the present disclosure. For example, the heat pump 514 may transfer heat from the ammonia filter 122 to the reformate stream 120. Other examples include, but are not limited to, liquefying ammonia gas, condensing water from a cathode off-gas or combustion exhaust, removing heat from one or more heat exchangers, or removing heat from one or more fuel cells. In some cases, the refrigerants of the heat pump 514 may comprise ammonia, water, or mixture of both.

Fluid Pump

Figure 6H:
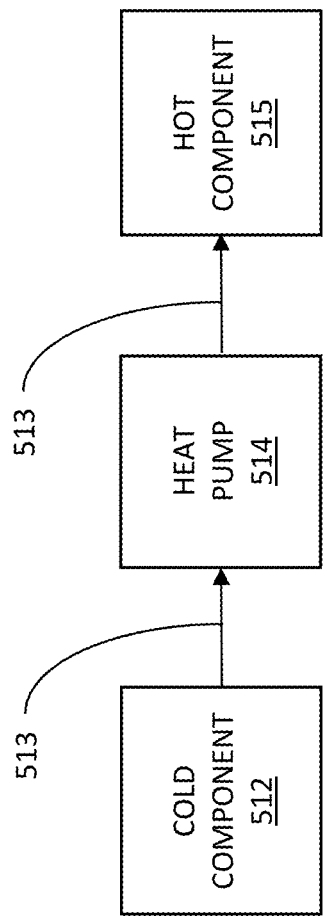

FIG. 6H is a block diagram illustrating the utilization of a fluid pump 516 to pressurize the incoming ammonia stream 104 provided by the storage tank 102. The storage tank 102 and/or the pump 516 may use the heat provided by one or more electrical heaters, the combustion-heated reformer 108, the combustion heater 109, and/or the electrically-heated reformer 110 to pressurize or vaporize the incoming ammonia stream 104. In some embodiments, the pump 516 may be electrically powered and/or controlled.

Control of Pressure, Flow Rate, and Gas Velocity at Fuel Cell

FIG. 6I is a block diagram illustrating the utilization of flow control units 517 to control the pressure, flow rate, and/or gas velocity of fluid streams in the ammonia reforming system 100. The flow control units 517 may be substantially similar or substantially identical to the flow control units FCU1-10 described with respect to FIG. 5G. The flow control units 517 may comprise one or more pressure drop elements, one or more pumps, one or more check valves, one or more one-way valves, one or more three-way valves, one or more restrictive orifices, one or more valves, one or more flow regulators, one or more pressure regulators, one or more back pressure regulators, one or more pressure reducing regulators, one or more back flow regulators, one or more flow meters, one or more flow controllers, or any combination thereof. The flow control units 517 may be controlled manually, automatically, or electronically.

For example, the fuel cell 124 may draw the reformate stream 120 at a pressure that is maintained within a selected tolerance (e.g., a tolerance of about 1%, about 5%, or about 10%) at the inlet of the fuel cell 124. The target pressure may be at least about 1, 2, 3, 4, 5, 6, 7, 8, 9, 10, 15, 20, 25, 30, 35, or 40 bar absolute (bara) at the inlet of the fuel cell 124. The target pressure may be at most about 1, 2, 3, 4, 5, 6, 7, 8, 9, 10, 15, 20, 25, 30, 35, or 40 bara at the inlet of the fuel cell 124. In some cases, the target pressure may be between about 1 and 40, 2 and 35, 3 and 30, 4 and 25, 5 and 20, or 10 and 15 bara at the inlet of the fuel cell 124. In some cases, the target pressure range is about 2 to about 5 bara at the inlet of the fuel cell 124.

In some cases, the selected tolerance may be at least about 1, 5, 10, 20, 30, 40, 50, 60, 70, 80, 90, or 100% of a target pressure at the inlet of the fuel cell 124. In some cases, the selected tolerance may be at most about 1, 5, 10, 20, 30, 40, 50, 60, 70, 80, 90, or 100% of a target pressure at the inlet of the fuel cell 124. In some cases, the selected tolerance may be between about 1 and 100, 5 and 90, 10 and 80, 20 and 70, 30 and 60, or 40 and 50% of the target pressure at the inlet of the fuel cell 124.

To maintain this pressure of the reformate stream 120 at the inlet of the fuel cell 124 (within the selected tolerance), the flow control units 517 may be controlled to modulate the pressure of the ammonia stream 104 (before the stream 104 enters the reformers 108-110), or the flow control units 517 may be controlled to modulate the pressure of the reformate stream 120 (before the stream 120 enters the fuel cell 124). As the fuel cell 124 consumes more of the reformate stream 120 and increases output power, the pressure of the reformate stream 120 may be measured at the fuel cell inlet (using a pressure sensor P1-P10), and the flow control units 517 may be modulated (e.g., based on the pressure measured by the pressure sensor P1-P10) to increase the flow rate of the ammonia stream 104 or the reformate stream 120 (to maintain the pressure of the reformate stream 120 at the selected tolerance at the fuel cell inlet).

In some embodiments, one or more pressure regulators (e.g., the back pressure regulators BPR1 or BPR2, or the pressure reducing regulator PRR1 or PRR2, as described with respect to FIG. 5H) may be configured to maintain the pressure of the reformate stream 120 at the inlet of the fuel cell 124 within the selected tolerance.

In some embodiments, the fuel cell 124 may draw the reformate stream 120 at a flow rate that is maintained within a selected tolerance (e.g., a tolerance of about 1%, about 5%, or about 10%) at the inlet of the fuel cell 124. In some cases, the selected tolerance may be at least about 1, 5, 10, 20, 30, 40, 50, 60, 70, 80, 90, or 100% of a target flow rate at the inlet of the fuel cell 124. In some cases, the selected tolerance may be at most about 1, 5, 10, 20, 30, 40, 50, 60, 70, 80, 90, or 100% of a target flow rate at the inlet of the fuel cell 124. In some cases, the selected tolerance may be between about 1 and 100, 5 and 90, 10 and 80, 20 and 70, 30 and 60, or 40 and 50% of the target flow rate at the inlet of the fuel cell 124.

To maintain this flow rate of the reformate stream 120 at the inlet of the fuel cell 124 (within the selected tolerance), a flow rate of the reformate stream 120 may be measured at the fuel cell inlet (using a flow rate sensor FM1-FM11), and the flow control units 517 may be controlled (based on the flow rate measured by the flow rate sensor FM1-FM11) to modulate the flow rate of the ammonia stream 104 (before the stream 104 enters the reformers 108-110), or the flow control units 517 may be controlled (based on the flow rate measured by the flow rate sensor FM1-FM11) to modulate the flow rate of the reformate stream 120 (before the stream 120 enters the fuel cell 124).

In some embodiments, the flow control units 517 may be configured to modulate a gas velocity of the reformate stream 120 at the inlet of the fuel cell 124. In some cases, the hydrogen and/or nitrogen in the reformate stream 120 may purge liquid water in the fuel cell 124 by directing the liquid water out of the fuel cell 124. The gas velocity of the reformate stream 120 may be modulated based on a concentration or volume of the liquid water in the fuel cell 124 (which may be measured using, e.g., one or more humidity sensors in the fuel cell 124 in communication with the controller 200 described with respect to FIG. 5A). For example, in response to the measured concentration or volume of water in the fuel cell 124 being greater than a threshold concentration or volume, the gas velocity of the reformate stream 120 may be increased to facilitate the purging of water in the fuel cell 124 (and vice versa).

In some embodiments, at least a portion of the reformate stream 120 is recirculated in the fuel cell 124, and the recirculated portion may be adjusted based on a concentration or volume of the liquid water in the fuel cell 124, an $H_2$ consumption rate of the fuel cell 124, an $N_2$ concentration in the fuel cell 124, humidity in the fuel cell 124, the flow rate of the reformate stream 120 at the inlet of the fuel cell 124, or a power output of the fuel cell 124.

Non-Linear Start-Up Sequence

FIG. 6J is a block diagram illustrating a non-linear start-up sequence for the ammonia reforming system 100. A first set of reformers 520 may comprise a plurality of electrically-heated reformers (e.g., each one being substantially similar or substantially identical to the electrically-heated reformer 110 described with respect to FIGS. 1A-4B). A second set of reformers 521 and a third set of reformers 522 may comprise a plurality of combustion-heated reformers (e.g., each one being substantially similar or substantially identical to the combustion-heated reformer 108 described with respect to FIGS. 1A-4B). It is contemplated that the number of reformers in the second set 521 may be greater than the number of reformers in the first set 520, and likewise, it is contemplated that the number of reformers in the third set 522 may be greater than the number of reformers in the second set 521. In this way, a progressively larger number of reformers may be heated at each step of the non-linear startup sequence. For example, the first set of reformers 520 may comprise two reformers, the second set of reformers 521 may comprise four reformers, the third set of reformers 522 may comprise eight reformers, and so on.

The non-linear start-up sequence may be performed by decomposing ammonia (e.g., the ammonia stream 104) using the first set of reformers 520 to generate a first reformate stream (e.g., the reformate stream 120). Subsequently, the reformate stream produced by the first set of reformers 520 may be combusted to heat the second set of reformers 521 to generate a second reformate stream. Subsequently, the second reformate stream produced by the second set of reformers 521 may be combusted to heat the third set of reformers 522 to generate a third reformate stream.

It is noted that the presently described non-linear start-up sequence may involve any number of sets of reformers (e.g., at least two sets of reformers), and each set of reformers may comprise any number of reformers (e.g., at least one reformer). It is also noted that the non-linear startup sequence may be initiated using the controller 200 (for example, by initiating the heating of the electrically-heated reformers of the first set of reformers 520).

Purging

FIG. 6K is a block diagram illustrating purging of the ammonia reforming system 100. A purging gas 523 may purge the ammonia reforming system 100 of residual gases (for example, before starting the ammonia reforming system 100 or after shutting down the ammonia reforming system 100). The purging gas 523 may direct residual ammonia in the ammonia reforming system 100 (for example, residual ammonia in the reformers 108-110) into water or a scrubber.

The purging gas 523 may comprise an inert or noble gas (for example, nitrogen or argon). In some cases, the purging gas 523 comprises hydrogen and may be flared or vented into the atmosphere. The purging gas 523 may be stored in a dedicated tank, or may be generated by reforming ammonia. The purging of the ammonia reforming system may be initiated using the controller 200 (for example, by modulating a valve to direct the purging gas 523 into the reformers 108-110).

Hot Standby Mode

FIG. 6L is a block diagram illustrating the initiation of a hot standby mode for the ammonia reforming system 100. The hot standby mode may advantageously reduce the time required to return to an operation mode, for example, by avoiding a shut-down (or reduction in temperature) of the combustion reformer 108 and/or the combustion heater 109. Additionally, the hot standby mode may advantageously enable the system 100 to adjust and respond to power demand at the fuel cell and/or hydrogen demand at a hydrogen processing module. Additionally, the hot standby mode may advantageously enable the maintenance of the fuel cell and/or the hydrogen processing module (e.g., due to a fault at the fuel cell and/or the hydrogen processing module) without shutting down (or reducing the temperature of) the combustion reformer 108 and/or the combustion heater 109. In some cases, the hot standby mode enables the system 100 to operate for stationary or mobile hydrogen and/or power generation applications.

In an operation mode of the ammonia reforming system 100, a flow control unit 524 may direct the reformate stream 120 (e.g., as an $H_2$ processing flow 119) to an $H_2$ processing module 535. The $H_2$ processing module 535 may be configured to generate electrical power and/or to supply $H_2$ to various chemical or industrial processes, including, but not limited to, steel or iron processing, combustion engines, combustion turbines, hydrogen storage, hydrogen for chemical processes, hydrogen fueling stations, and the like. The $H_2$ processing module 535 may comprise one or more fuel cells 124, one or more PSAs 127, one or more flow distributors 115, or one or more membrane hydrogen separation devices 527 (described with respect to FIGS. 1A-4B and FIG. 6S). A leftover reformate stream 536 (e.g., unconsumed $H_2$ from fuel cell 124, or $H_2$ that is not supplied to chemical or industrial processes) may then be supplied to the combustion heater 109 as a reactant for the combustion reaction. The leftover reformate stream 536 may comprise the filtered reformate stream 123, the anode off-gas 128, the anode off-gas 503, the PSA exhaust stream 128b, the hydrogen separation device retentate stream 532, or the portion 128c of the reformate stream 120 distributed by the flow distributor 115.

In some instances, the flow control unit 524 may configured to monitor and/or modulate one or more flow rates and/or one or more pressures. In some instances, the flow control unit 524 may comprise one or more pressure drop elements configured to reduce pressure, one or more pumps, one or more valves, one or more check valves, one or more one-way valves, one or more three-way valves, one or more restrictive orifices, one or more flow regulators, one or more pressure regulators, one or more back pressure regulators, one or more pressure reducing regulators, one or more back flow regulators, one or more flow meters, one or more flow controllers, or any combination thereof. In some instances, the flow control unit 524 may be controlled manually, automatically, or electronically.

After initiating the hot standby operation, the power output by the one or more fuel cells 124, or the supply of $H_2$ to the various chemical or industrial processes, may be reduced or shut off entirely (by modulating the flow control unit 524 to direct at least part of the reformate stream 120 to the combustion heater 109 for combustion in the combustion heater 109), thereby maintaining the combustion-heated reformer 108 in a target temperature range. Excess hydrogen may be vented or flared after passing the combustion heater 109 (due to fuel-rich conditions in the combustion-heater 109).

The hot standby mode may be terminated by modulating the flow control unit 524 to redirect the reformate stream 120 to the $H_2$ processing module 535 (e.g., by increasing a flow rate or pressure of the $H_2$ processing inlet flow 119, for example, at an inlet of the fuel cell 124), thereby starting or increasing the power output by and/or the $H_2$ supplied to the $H_2$ processing module 535.

The hot standby mode may advantageously maintain the target temperature range in the combustion-heated reformer 108 even while the $H_2$ processing module 535 reduces or shuts off the electrical power output or the supply of $H_2$ to the chemical or industrial processes (in other words, turning off the combustion-heated reformer 108 may be avoided). Therefore, during a fault situation (e.g., a fault associated with the fuel cell 124), completely shutting down the ammonia reforming system 100 may be prevented, and the time required to start-up the ammonia reforming system 100 (and increase power output by the $H_2$ processing module 535, and/or increase the $H_2$ supplied to the $H_2$ processing module 535) may be reduced.

In some instances, the flow rate of the incoming $NH_3$ stream 104 may (or may not be) configured to be the same during the operation mode and hot standby mode. In some instances, the flow rate of the incoming $NH_3$ stream 104 during the hot standby mode may be configured to be within a selected tolerance of the flow rate of the incoming $NH_3$ stream 104 during the operation mode. The selected tolerance may be at least about 1, 5, 10, 20, 30, 40, 50, 60, 70, 80, or 90%. The selected tolerance may be at most about 1, 5, 10, 20, 30, 40, 50, 60, 70, 80, or 90%. In some cases, the selected tolerance may be between about 1 and 90, 5 and 80, 10 and 70, 20 and 60, 30 and 50, or 40 and 90%. In some instances, the selected tolerance is about 5 to about 20%.

In some instances, the hot standby mode may be maintained without substantially reducing or increasing the flow rate of the incoming $NH_3$ stream 104 (or the flow rate of the reformate stream 120). In some instances, during the hot standby mode, the flow rate of the incoming $NH_3$ stream 104 (or the flow rate of the reformate stream 120) may be maintained within a selected tolerance of a target flow rate. The selected tolerance may be at most about 1, 5, 10, 20, 30, 40, 50, 60, 70, 80, or 90%. The selected tolerance may be at least about 1, 5, 10, 20, 30, 40, 50, 60, 70, 80, or 90%. In some cases, the selected tolerance may be between about 1 and 90, 5 and 80, 10 and 70, 20 and 60, 30 and 50, or 40 and 90%. In some instances, the selected tolerance may be about 5 to about 20%.

In some cases, during the hot standby mode, combustion characteristics in the combustion heater 109 may be fuel-rich, and flare may be observed in the combustion exhaust 114. In some cases, the hot standby mode is maintained by modulating a flow rate of the air stream 118 (e.g., using the air supply unit 116), so that the amount of $H_2$ combusted in the combustion heater 109 is modulated or controlled (which may prevent the excessive $H_2$ combustion and overheating of the combustion heater 109 and/or combustion-heated reformer 108).

Figure 6M:
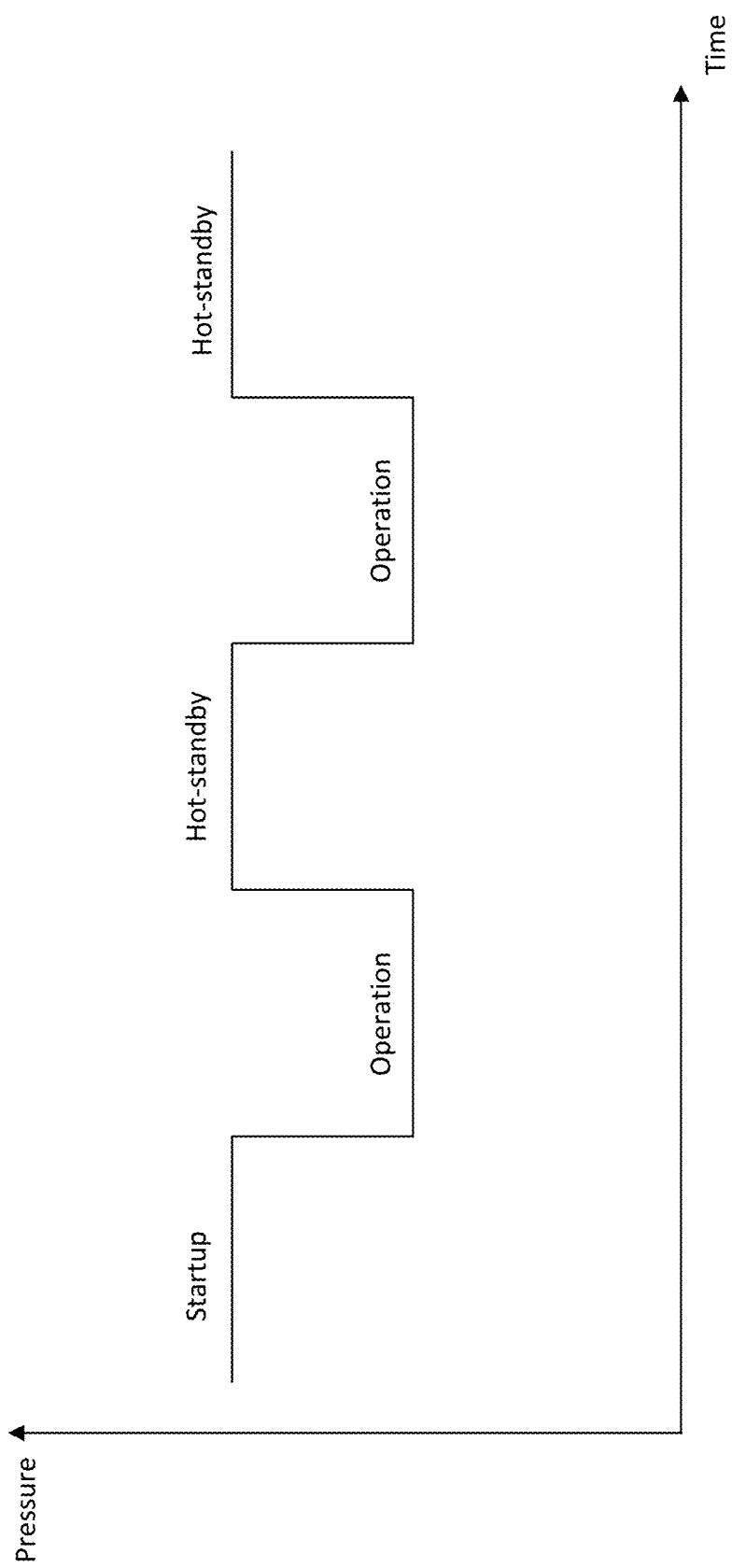

FIG. 6M is a plot illustrating a system pressure (e.g., pressure in the incoming ammonia stream 104, reformate stream 120, reformer 108-110, heat exchanger 106, or ammonia filter 122) over time during the startup mode, during the operation mode, and during the hot-standby mode for the ammonia reforming system 100. The system pressure (e.g., pressure in the incoming ammonia stream 104, reformate stream 120, reformer 108-110, heat exchanger 106, or ammonia filter 122) during the hot standby mode may be higher than the system pressure during the operation mode. The system pressure may be measured, for example, using at least one of the pressure sensors P1-P10.

In some embodiments, the flow control unit 524 may configured to initiate the hot standby mode by increasing the system pressure. The flow control unit 524 may initiate the flow of the reformate stream 120 to the combustion heater 109 when the pressure of the reformate stream 120 (before reaching the flow control unit 524) is equal to or greater than a threshold pressure.

In one example, if the $H_2$ processing inlet flow 119 is at least partially blocked or closed (while maintaining the flow rate of the incoming ammonia stream 104 within a selected tolerance), the system pressure may increase. The flow rate of the incoming ammonia stream 104 may be maintained within a selected tolerance of at least about 1, 5, 10, 20, 30, 40, 50, 60, 70, 80, or 90%. The flow rate of the incoming ammonia stream 104 may be maintained within a selected tolerance of at most about 1, 5, 10, 20, 30, 40, 50, 60, 70, 80, or 90%. In some cases, the flow rate of the incoming ammonia stream 104 may be maintained within a selected tolerance between about 1 and 90, 5 and 80, 10 and 70, 20 and 60, 30 and 50, or 40 and 90%. In some instances, the flow rate of the incoming ammonia stream 104 may be maintained within a selected tolerance of about 5 to about 20%.

If the pressure of the reformate stream 120 before the flow control unit 524 is equal to or greater than the threshold pressure (within a selected tolerance), the flow control unit 524 may direct a portion or all of the reformate stream 120 to the combustion heater 109 (thereby transitioning to the hot standby mode). The selected tolerance of the threshold pressure may be at least about 1, 5, 10, 20, 30, 40, 50, 60, 70, 80, or 90%. The selected tolerance of the threshold pressure may be at most about 1, 5, 10, 20, 30, 40, 50, 60, 70, 80, or 90%. In some cases, the selected tolerance of the threshold pressure may be between about 1 and 90, 5 and 80, 10 and 70, 20 and 60, 30 and 50, or 40 and 90%. In some instances, the selected tolerance is about 5 to about 20%.

In some embodiments, the hot standby mode may be terminated, and the operation mode may be initiated by reducing the system pressure (e.g., pressure in the incoming ammonia stream 104, reformate stream 120, reformer 108-110, heat exchanger 106, or ammonia filter 122).

In one example, the system pressure may be reduced by increasing or initiating the $H_2$ processing inlet flow 119 to the $H_2$ processing module 535 (while maintaining the flow rate of the incoming ammonia stream 104 within a selected tolerance). The flow rate of the incoming ammonia stream 104 may be maintained within a selected tolerance of at least about 1, 5, 10, 20, 30, 40, 50, 60, 70, 80, or 90%. The flow rate of the incoming ammonia stream 104 may be maintained within a selected tolerance of at most about 1, 5, 10, 20, 30, 40, 50, 60, 70, 80, or 90%. In some cases, the flow rate of the incoming ammonia stream 104 may be maintained within a selected tolerance of between about 1 and 90, 5 and 80, 10 and 70, 20 and 60, 30 and 50, or 40 and 90%. In some instances, the flow rate of the incoming ammonia stream 104 may be maintained within a selected tolerance of about 5 to about 20%.

If the pressure of the reformate stream 120 before the flow control unit 524 is equal to or less than the threshold pressure (within a selected tolerance), the flow control unit 524 may redirect a portion or all of the reformate stream 120 supplied to the combustion heater 109 back to the $H_2$ processing module 535. The selected tolerance of the threshold pressure may be at least about 1, 5, 10, 20, 30, 40, 50, 60, 70, 80, or 90%. The selected tolerance of the threshold pressure may be at most about 1, 5, 10, 20, 30, 40, 50, 60, 70, 80, or 90%. In some cases, the selected tolerance of the threshold pressure may be between about 1 and 90, 5 and 80, 10 and 70, 20 and 60, 30 and 50, or 40 and 90%. In some instances, the selected tolerance of the threshold pressure is about 5 to about 20%.

In some cases, the leftover reformate stream 536 may be supplied to the combustion heater 109 (to transition to the operation mode).

In some embodiments, the flow rate of the incoming $NH_3$ stream 104 may increase while transitioning from the hot standby mode to the operation mode. In some embodiments, the flow rate of the incoming $NH_3$ stream 104 may increase after transitioning from the hot standby mode to the operation mode (to increase the electrical power output by the $H_2$ processing module 535, and/or to supply more $H_2$ to the industrial or chemical processes of the $H_2$ processing module 535).

In some embodiments, the ammonia reforming system 100 comprises two or more ammonia reformers 108-110, and the hot standby mode may be initiated using at least one ammonia reformer 108-110, and the remaining ammonia reformers 108-110 may be maintained in the operation mode.

In some embodiments, combustion of the reformate stream 120 maintains a temperature in the combustion-heated reformer 108 within a target temperature range (for example, during the hot standby mode).

In some embodiments, the reformate stream 120 is directed to the combustion heater 109 in thermal communication with the combustion-heated reformer 108, so that the combustion heater 109 receives substantially all of the reformate stream 120.

In some embodiments, an amount (e.g., flow rate) of the ammonia stream 104 directed to the combustion-heated reformer 108 is controlled so that a first portion of the reformate stream 120 (combusted in the combustion heater 109) includes substantially all of the reformate stream 120 (for example, during the hot standby mode).

In some embodiments, an amount (e.g., flow rate) of a second portion of the reformate stream 120 (e.g., the $H_2$ processing flow 119 that is processed in the hydrogen processing module 535) is increased (e.g., when transitioning from the hot standby mode to the operation mode).

In some embodiments, the amount (e.g., flow rate) of the ammonia stream 104 directed to the combustion-heated reformer 108 may be increased to a first target ammonia flow rate range (for example, during the hot standby mode).

In some embodiments, a second portion of the reformate stream 120 is vented or flared (for example, during the hot standby mode). In some cases, at least about 30, 40, 50, 60, 70, 80, or 90% of the reformate stream 120 may be vented or flared out of the combustion heater 109 during the hot standby mode. In some cases, at most about 30, 40, 50, 60, 70, 80, or 90% of the reformate stream 120 may be vented or flared out of the combustion heater 109 during the hot standby mode. In some cases, of from about 30 to about 60%, of from about 40 to about 70%, of from about 50 to about 80%, or of from about 60 to about 90% of the reformate stream 120 is vented or flared out of the combustion heater 109 during the hot standby mode.

Startup Mode

As shown in FIG. 6M, the system pressure (e.g., pressure in the incoming ammonia stream 104, reformate stream 120, reformer 108-110, heat exchanger 106, or ammonia filter 122) during the startup mode and hot standby mode may be higher than the system pressure during the operation mode. In some cases, the system pressure during the startup mode may be the same as (or different from) the system pressure during the hot standby mode. In some cases, the system pressure during the startup mode and hot standby mode may be higher than the system pressure during the operation mode. In some cases, the system pressure during the startup mode may be the same as the system pressure during the hot standby mode within a selected tolerance. The selected tolerance may be at least about 1, 5, 10, 20, 30, 40, 50, 60, 70, 80, or 90%. The selected tolerance may be at most about 1, 5, 10, 20, 30, 40, 50, 60, 70, 80, or 90%. In some cases, the selected tolerance may be between about 1 and 90, 5 and 80, 10 and 70, 20 and 60, 30 and 50, or 40 and 90%. In some instances, the selected tolerance is about 5% to about 20%.

In some cases, the startup mode may comprise a system configuration similar or at least partially identical to the hot standby mode described with respect to FIG. 6L, for example, a portion or all of the reformate stream 120 may be supplied to the combustion heater 109 using one or more flow control units (e.g., flow control unit 524). In some cases, the startup mode may be transitioned to the operation mode by reducing the system pressure (e.g., pressure in the incoming ammonia stream 104, reformate stream 120, reformer 108-110, heat exchanger 106, or ammonia filter 122). In some cases, the system pressure may be reduced by increasing or initiating the $H_2$ processing inlet flow 119 to the $H_2$ processing module 535 using one or more flow control units (e.g., flow control unit 524). In some cases, the system pressure may be reduced by increasing or initiating the $H_2$ processing inlet flow 119 to the $H_2$ processing module 535 using one or more flow control units while maintaining the flow rate of the incoming ammonia stream 104 within a selected tolerance. In some cases, the leftover reformate stream 536 may be supplied to the combustion heater 109 to transition to the operation mode using one or more flow control units. In some cases, the flow control unit 524 may be used to transition the startup mode to the operation mode by directing the $H_2$ processing inlet flow 119 to the $H_2$ processing module 535. The selected tolerance may be at least about 1, 5, 10, 20, 30, 40, 50, 60, 70, 80, or 90%. The selected tolerance may be at most about 1, 5, 10, 20, 30, 40, 50, 60, 70, 80, or 90%. In some cases, the selected tolerance may be between about 1 and 90, 5 and 80, 10 and 70, 20 and 60, 30 and 50, or 40 and about 90%. In some instances, the selected tolerance is about 5% to about 20%.

In some instances, the flow rate of the incoming $NH_3$ stream 104 may be (or may not be) configured to be the same during the startup mode and the operation mode. In some instances, the flow rate of the incoming $NH_3$ stream 104 during the startup mode may be configured to be within a selected tolerance of the flow rate of the incoming $NH_3$ stream 104 during the operation mode. The selected tolerance may be at least about 1, 5, 10, 20, 30, 40, 50, 60, 70, 80, or 90%. The selected tolerance may be at most about 1, 5, 10, 20, 30, 40, 50, 60, 70, 80, or 90%. In some cases, the selected tolerance may be between about 1 and 90, 5 and 80, 10 and 70, 20 and 60, 30 and 50, or 40 and 90%. In some instances, the selected tolerance is about 5% to about 20%.

In some embodiments, the flow rate of the incoming $NH_3$ stream 104 may increase while transitioning from the startup mode to the operation mode. In some embodiments, the flow rate of the incoming $NH_3$ stream 104 may increase after transitioning from the startup mode to the operation mode to produce higher electrical power from and/or to supply more $H_2$ to the industrial or chemical processes in the $H_2$ processing module 535.

In some embodiments, a pressure of the reformate stream 120 is reduced when the reformate stream 120 is directed through the hydrogen processing module 535 (e.g., during the operation mode) compared to when the reformate stream is not directed through the hydrogen processing module 535 (e.g., during the startup mode or the hot standby mode).

In some embodiments, when a threshold amount of the reformate stream 120 is directed to the hydrogen processing module 535, substantially all of the reformate stream 120 passes through the hydrogen processing module 535 (e.g., during the operation mode).

In some embodiments, an amount (e.g., flow rate) of the ammonia stream 104 directed to the combustion-heated reformer 108 is increased over a time period (beginning when the combustion-heated reformer 108 is heated to a target temperature range).

In some embodiments, the amount of the ammonia stream 104 directed to the combustion-heated reformer 108 is increased to a first target ammonia flow rate range. In some embodiments, the reformate stream 120 is directed to a hydrogen processing module 535 when the first target ammonia flow rate range is reached. In some embodiments, the flow rate of the ammonia stream 104 is subsequently increased to a second target ammonia flow rate.

In some embodiments, a first portion of the reformate stream 120 is combusted with oxygen, and the oxygen is provided in a substantially constant proportion relative to the hydrogen in the first portion of the reformate steam 120. In some cases, the substantially constant proportion may comprise a constant mass ratio within a selected tolerance (e.g., mass of hydrogen to mass of oxygen), a constant volume ratio within a selected tolerance (e.g., volume of hydrogen to volume of oxygen), or a constant molar ratio within a selected tolerance (e.g., moles of hydrogen to moles of oxygen). In some cases, the selected tolerance may comprise at most about 1, 5, 10, 20, 30, 40, or 50% of a target proportion. In some cases, the selected tolerance may comprise of from about 1 to 10%, of from about 5 to 10%, or of from about 5 to 15% of a target proportion.

Control of Temperature in Combustion-Heated Reformer

Figure 6N:
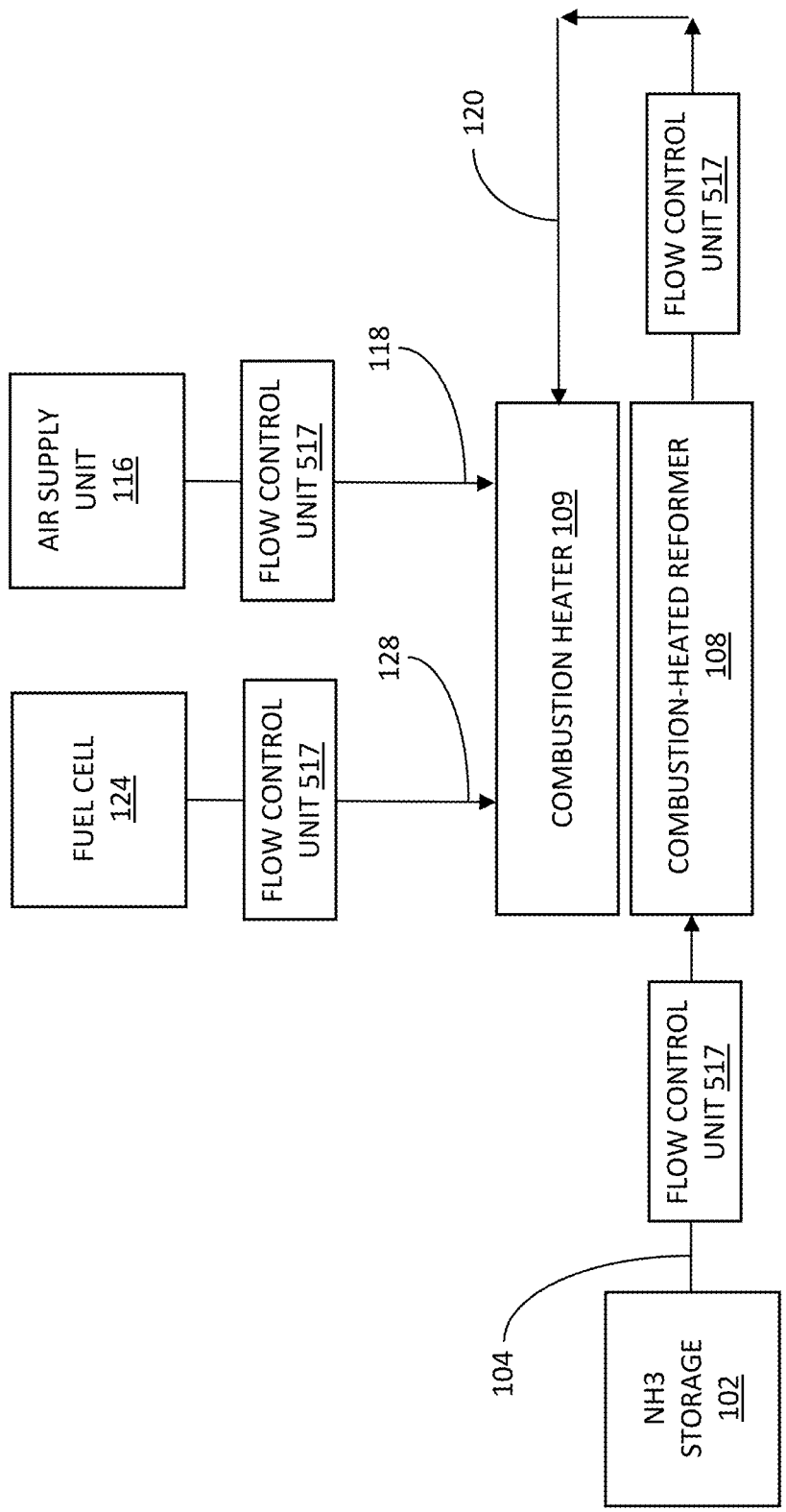
Figure 60:
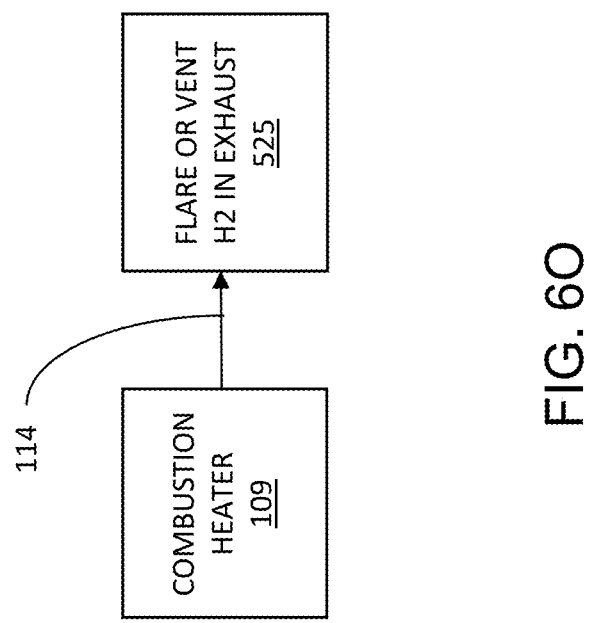

FIG. 6N is a block diagram illustrating the control of temperature inside the combustion-heated reformer 108 and/or the combustion heater 109. The combustion-heated reformer 108 and/or the combustion heater 109 may be maintained at a target temperature range, for example, of from about 300° C. to about 700° C. In some instances, the combustion-heated reformer 108 and/or the combustion heater 109 may be maintained at a target temperature range of from about 400° C. to about 600° C. In some instances, the combustion-heated reformer 108 and/or the combustion heater 109 may be maintained at a target temperature range of at least about 300, 350, 400, 450, 500, 550, 600, 650, 700, 750, or 800° C., and at most about 400, 450, 500, 550, 600, 650, 700, 750, 800, or 900° C. In some cases, the target temperature ranges between about 300 and 900, 350 and 800, 400 and 750, 450 and 700, 500 and 650, or 550 and 600° C. It is noted that the electrically-heated reformer 110 and/or the electrical heater 111 may be maintained at the same target temperature range (or a different target temperature range) as the combustion-heated reformer 108 and/or the combustion heater 109.

In response to the temperature of the combustion-heated reformer 109 being outside or deviating from the target temperature range (in other words, being less than the lower limit of the temperature range, or being greater than the upper limit of the temperature range), the flow rate and/or pressure of the ammonia stream 104, the air stream 118 (comprising oxygen), the reformate stream 120, and/or the anode off-gas 128 may be modulated (e.g., using flow control units 517 and/or the flow control units FCU1-FCU10) to maintain the temperature of the combustion-heated reformer 108 and/or the combustion heater 109 within the temperature range.

For example, to decrease the temperature of the combustion-heated reformer 108 and/or the combustion heater 109, the flow rate and/or pressure of the ammonia stream 104 may be increased (thereby providing more reactant for the endothermic ammonia reforming reaction which absorbs heat). In some embodiments, to decrease the temperature of the combustion-heated reformer 108 and/or the combustion heater 109, the flow rate and/or pressure of the air stream 118 may be decreased (thereby providing less oxygen for the combustion reaction). In some embodiments, to decrease the temperature of the combustion-heated reformer 108 and/or the combustion heater 109, the flow rate and/or pressure of the reformate stream 120 may be decreased (thereby providing less hydrogen for the combustion reaction). In some embodiments, to decrease the temperature of the combustion-heated reformer 108 and/or the combustion heater 109, the flow rate and/or pressure of the anode off-gas 128 may be decreased (thereby providing less hydrogen for the combustion reaction).

For example, to increase the temperature of the combustion-heated reformer 108 and/or the combustion heater 109, the flow rate and/or pressure of the ammonia stream 104 may be decreased (thereby providing less reactant for the endothermic ammonia reforming reaction, which absorbs heat). In some embodiments, to increase the temperature the combustion-heated reformer 108 and/or the combustion heater 109, the flow rate and/or pressure of the air stream 118 may be increased (thereby providing more oxygen and more combustion of $H_2$ for the combustion reaction).

In some embodiments, to increase the temperature of the combustion-heated reformer 108 and/or the combustion heater 109, the flow rate and/or pressure of the reformate stream 120 may be increased (thereby generating more hydrogen from the ammonia reforming process and providing more hydrogen for the combustion reaction). In some embodiments, to increase the temperature of the combustion-heated reformer 108 and/or the combustion heater 109, the flow rate and/or pressure of the anode off-gas 128 may be increased (thereby providing more hydrogen for the combustion reaction).

In some cases, to increase the temperature of the combustion-heated reformer 108 and/or the combustion heater 109, the hydrogen consumption rate from the fuel cell 124 may be reduced (thereby providing more hydrogen to the anode off-gas 128 and to the combustion heater 109 for the combustion reaction). In some cases, to decrease the temperature of the combustion-heated reformer 108 and/or the combustion heater 109, the hydrogen consumption rate from the fuel cell 124 may be increased (thereby providing less hydrogen to the anode off-gas 128 and to the combustion heater 109 for the combustion reaction).

In some instances, to decrease the temperature of the combustion-heated reformer 108 and/or the combustion heater 109, the flow rate and/or pressure of the air stream 118 may be increased (thereby providing a fuel-lean or air-rich condition, where $N_2$ absorbs at least part of the combustion heat and lowers the flame or combustion temperature at the combustion heater 109). In some cases, the fuel-lean or air-rich condition is maintained during at least about 10, 20, 30, 40, 50, 60, 70, 80, or 90% of the operational time period of the operation mode. In some cases, the fuel-lean or air-rich condition is maintained during at most about 10, 20, 30, 40, 50, 60, 70, 80, or 90% of the operational time period of the operation mode. In some cases, the fuel-lean or air-rich condition is maintained of from about 30% to about 50%, of from about 40% to about 60%, of from about 50% to about 70%, of from about 60% to about 80%, or of from about 70% to about 90% of the operational time period of the operation mode.

Dynamic Control

The systems and methods described herein can be dynamically controlled to achieve certain objectives. For example, an amount of ammonia that is reformed can be adjusted in response to a variable need for hydrogen. In a maritime deployment, for example, at a constant speed, a ship moving into a head-wind can require more hydrogen (e.g., to generate more power from fuel cell(s)) compared to when the ship moves with the wind.

In some embodiments, a dynamic control method may comprise directing the ammonia stream to a reformer at an ammonia flow rate to produce a reformate stream comprising hydrogen and nitrogen. The method can further comprise combusting a first portion of the reformate stream with oxygen to heat the reformer. A second portion of the reformate stream can be processed in a hydrogen processing module (e.g., in a fuel cell). One or more adjustments can be made based at least in part on a stimulus (e.g., the stimulus can be a user input or an automated input based on a measurement). For example, the adjustment(s) can include changing the ammonia flow rate (i.e., increasing or decreasing an amount of ammonia reformed). The adjustment(s) can also include changing a percentage of the reformate stream that is the first portion of the reformate stream (i.e., increasing or decreasing the percentage combusted to heat the reformer). The adjustment(s) can also include changing a percentage of the reformate stream that is the second portion of the reformate stream (i.e., increasing or decreasing the percentage that is sent to the hydrogen processing module). The adjustment(s) can also include changing a percentage of the reformate stream that is vented or flared (e.g., increasing or decreasing the percentage that is vented or flared at a combustion exhaust of the combustion heater).

In some cases, at least two of the adjustments are performed. In some cases, at least three of the adjustments are performed. In some cases, all of the adjustments are performed. In some cases, the dynamic control method further comprises changing an oxygen flow rate (i.e., increasing or decreasing the oxygen flow rate) used for combustion to heat the reformer.

In some cases, the stimulus comprises a change in an amount of the hydrogen used by the hydrogen processing module (i.e., an increase or a decrease in an amount of hydrogen used by the hydrogen processing module). In some cases, the stimulus comprises a temperature of the reformer being outside of a target temperature range. In some cases, the stimulus comprises a change in an amount or concentration of ammonia in the reformate stream (i.e., an increase or a decrease in an amount or concentration of ammonia in the reformate stream).

In some cases, to decrease the amount or concentration of ammonia in the reformate stream 120, the temperature of the combustion heater 109 and/or the reformers 108 and/or 110 may be increased (to increase ammonia conversion efficiency). In some cases, to increase the amount or concentration of ammonia in the reformate stream 120, the temperature of the combustion heater 109 and/or the reformers 108 and/or 110 may be decreased (to lower the ammonia conversion efficiency).

In some cases, the ammonia conversion efficiency is maintained to be at least about 80, 85, 90, 93, 95, 97, 98, 99, or 99.9%. In some cases, the ammonia conversion efficiency is maintained to be at most about 80, 85, 90, 93, 95, 97, 98, 99, or 99.9%. In some cases, the ammonia conversion efficiency is maintained to be of from about 80 to about 90%, of from about 97 to about 99.9%, of from about 95 to about 99%, of from about 90 to about 95%, of from about 97 to about 99%, or of from about 85 to about 90%.

In some cases, the amount or concentration of ammonia in the reformate stream 120 is maintained to be at least about 100, 500, 1000, 2000, 3000, 4000, 5000, 6000, 7000, 8000, 9000, 10000, 20000, 30000, 40000, or 50000 ppm. In some cases, the amount or concentration of ammonia in the reformate stream 120 is maintained to be at most about 100, 500, 1000, 2000, 3000, 4000, 5000, 6000, 7000, 8000, 9000, 10000, 20000, 30000, 40000, or 50000 ppm. In some cases, a target amount or concentration of ammonia in the reformate stream 120 is of from about 500 to about 2500 ppm, of from about 1000 to about 3000 ppm, of from about 2000 to about 4000 ppm, of from about 3000 to about 5000 ppm, of from about 4000 to about 6000 ppm, of from about 5000 to about 7000 ppm, of from about 6000 to about 8000 ppm, of from about 7000 to about 9000 ppm, of from about 8000 to about 10000 ppm, of from about 5000 to about 15000 ppm, or of from about 5000 to about 20000 ppm. In some cases, the ammonia filter 122 is used to filter residual or trace ammonia in the reformate stream 120 and produce a filtered reformate stream 123.

In some cases, the amount of ammonia reformed, the amount of reformate directed to the hydrogen processing unit, the amount of reformate directed to the combustion heater to heat the reformer, and/or the amount of reformate that is vented or flared can be changed so that: a temperature of the reformer is within a target temperature range; and/or at most about 10% of the reformate stream is vented or flared.

In some cases, the adjustment(s) are performed or achieved for at least 95% of an operational time period (e.g., of the ammonia reforming system 100). An operational time period may begin when initiating the heating of a start-up reformer (such as electrically-heated reformer 110), when initiating the flow of the ammonia stream 104 from the storage tank 102, or when initiating the flow of the reformate stream 120 to a hydrogen processing module, and may end after the reformer 108-110, the heaters 109-111, and/or fuel cell 124 are shut down. In some cases, the operational time period is at least about 8 consecutive hours. In some cases, the operational time period is at least about 4, 8, 12, 16, 20, 24, 28, or 32 consecutive hours. In some cases, the operational time period is at most about 4, 8, 12, 16, 20, 24, 28, or 32 consecutive hours.

Any suitable amount of the reformate stream can be vented or flared. In some cases, the amount of ammonia reformed to produce the reformate stream is in excess of an amount of ammonia reformed that is used by the hydrogen processing module(s) and used to heat the reformer(s). This excess amount can represent a waste of ammonia fuel when reformate is vented or flared. However, operating without excess ammonia reformation results in a lack of a buffer for the reformate required for processing in the hydrogen processing module(s) and heating the reformer(s). In some cases, about 20%, 15%, 10%, 5%, 3%, or 1% of the reformate stream is vented or flared. In some cases, less than about 20%, 15%, 10%, 5%, 3%, or 1% of the reformate stream is vented or flared.

In some cases, the vented reformate may be stored in a tank (e.g., to store buffer hydrogen) for later use. In some cases, the vented reformate stored in the tank may be combusted to heat one or more reformers or may be provided to a hydrogen processing module.

The systems and methods described herein can be efficiently and reliably operated. Efficient and reliable operation can include meeting an efficiency target for a suitably long period of time or suitably large fraction of a time period. For example, the adjustment(s) may be performed or achieved for at least about 5, 10, 15, 20, 25, 30, 35, 40, 45, 50, 55, 60, 65, 70, 75, 80, 85, 90, 95, or 100% of an operational time period. In some cases, the adjustment(s) may be performed or achieved for at most about 5, 10, 15, 20, 25, 30, 35, 40, 45, 50, 55, 60, 65, 70, 75, 80, 85, 90, 95, or 100% of an operational time period. In some cases, the operational time period is at least about 1, 2, 3, 4, 5, 6, 7, 8, 9, 10, 15, 20, 25, 50, 100, 500, 1000, or 2000 hours. In some cases, the operational time period is at most about 1, 2, 3, 4, 5, 6, 7, 8, 9, 10, 15, 20, 25, 50, 100, 500, 1000, or 2000 hours.

In some cases, the stimulus is based at least in part on an increase in an amount of the hydrogen used by the hydrogen processing module. In some cases, the increase in an amount of hydrogen is a projected increase in an amount of hydrogen used (in other words, a predicted increase in demand of hydrogen by the hydrogen processing module at a subsequent time) or a target increase in an amount of hydrogen. In some cases, based on the increase in an amount of hydrogen used by the hydrogen processing module, one or more of (i) the ammonia flow rate is increased, (ii) the percentage of the reformate stream that is the first portion of the reformate stream is decreased, (iii) the percentage of the reformate stream that is the second portion of the reformate stream is increased, or (iv) the percentage of the reformate stream that is vented or flared is decreased.

In some cases, the stimulus is based at least in part on a decrease in an amount of the hydrogen used by the hydrogen processing module. In some cases, the decrease in an amount of hydrogen is a projected decrease in an amount of hydrogen used (in other words, a predicted decrease in demand of hydrogen by the hydrogen processing module at a subsequent time) or a target decrease in an amount of hydrogen. In some cases, based on the decrease in an amount of hydrogen used by the hydrogen processing module, one or more of: (i) the ammonia flow rate is decreased, (ii) the percentage of the reformate stream that is the first portion of the reformate stream is increased, (iii) the percentage of the reformate stream that is the second portion of the reformate stream is decreased, or (iv) the percentage of the reformate stream that is vented or flared is increased.

In some cases, the stimulus comprises (a) a discontinued processing of hydrogen using the hydrogen processing module or (b) a fault or malfunction of the hydrogen processing module.

In some cases, a plurality of hydrogen processing modules each comprise the hydrogen processing module, and the stimulus comprises at least one of (a) a discontinued processing of the hydrogen using one of the plurality of hydrogen processing modules and/or (b) a fault or malfunction in one of the plurality of hydrogen processing modules.

In some cases, the percentage of the reformate stream that is the second portion of the reformate stream (processed by the hydrogen processing module) is changed to about zero percent in response to the stimulus.

In some cases, substantially none of the reformate stream is directed to the hydrogen processing module in response to the stimulus.

In some cases, substantially all of the reformate stream is directed to at least one of the combustion-heated reformer and/or a combustion heater in thermal communication with the combustion-heated reformer in response to the stimulus.

In some cases, a portion of the reformate stream is vented or flared in response to the stimulus.

In some cases, the stimulus is detected using a sensor. In some cases, the stimulus is communicated to a controller. In some cases, the adjustment(s) are performed with the aid of a programmable computer or controller. In some cases, the adjustment(s) are performed using a flow control unit.

In some cases, the stimulus is a pressure. In some cases, the pressure is increased in response to decreasing a flow rate to the hydrogen processing module. In some cases, the pressure is a pressure of the reformate stream.

Proportional Integral Derivative (PID) Control

In some embodiments, the temperature inside the combustion-heated reformer 108 and/or the combustion heater 109 may be controlled using PID control, which entails a control loop mechanism employing feedback. A PID controller may automatically apply an accurate and responsive correction to a control function. The PID controller (e.g., controller 200) in conjunction with one or more sensors (e.g., temperature sensors T1-T10) may be employed to perform the PID control.

In some embodiments, the temperature inside the combustion-heated reformer 108 and/or the combustion heater 109 may be controlled using Proportional (P), Proportional Integral (PI), or Proportional Derivative (PD) control, which entails a control loop mechanism employing feedback. A P, PI, or PD controller may automatically apply an accurate and responsive correction to a control function. The P, PI, or PD controller (e.g., controller 200) in conjunction with one or more sensors (e.g., temperature sensors T1-T10 and/or time sensors) may be employed to perform the control.

The PID controller may continuously calculate an error value (e(t)) as the difference between a desired setpoint (SP) and a measured process variable (PV), and may apply a correction based on proportional, integral, and derivative terms (denoted P, I, and D respectively). The P, PI, or PD controller may apply a correction based on one or two of proportional, integral, and derivative terms (denoted P, I, and D respectively), accordingly.

In one example, proportional control may be performed by (a) calculating a temperature difference between a temperature measured in the combustion-heated reformer 108 or the combustion heater 109 and a set-point temperature within a target temperature range, and (b) (i) changing the ammonia flow rate (e.g., the flow rate of the ammonia stream 104) by an amount that is based at least in part on the temperature difference, (ii) changing the oxygen flow rate (e.g., increasing or decreasing the flow rate of the air stream 118) by an amount that is based at least in part on the temperature difference, (iii) changing a percentage of the reformate stream 120 that is processed by the $H_2$ processing module 535 by an amount that is based at least in part on the temperature difference, (iv) changing a percentage of the reformate stream 120 that is combusted in the combustion heater by an amount that is based at least in part on the temperature difference, or (v) changing a percentage of the reformate stream 120 that is vented or flared out of the combustion heater by an amount that is based at least in part on the temperature difference.

For example, the ammonia flow rate, the oxygen flow rate, the percentage of the reformate stream that is processed by the $H_2$ processing module, the percentage of the reformate stream that is combusted in the combustion heater, and/or the percentage of the reformate stream that is vented or flared out of the combustion heater may be changed by a proportional factor that is proportional to the temperature difference. The value of the proportional factor may be greater when the temperature difference is greater. For example, for a set point temperature of 450° C., the proportional factor may be greater for a measured temperature of 350° C. (a temperature difference of 100° C.) compared to a measured temperature of 400° C. (a temperature difference of 50° C.).

In some embodiments, the proportional factor is different for each of changing the ammonia flow rate, the oxygen flow rate, the percentage of the reformate stream that is processed by the $H_2$ processing module, the percentage of the reformate stream that is combusted in the combustion heater, and/or the percentage of the reformate stream that is vented or flared out of the combustion heater.

In some embodiments, calculating the temperature difference may be repeated at a subsequent time point to obtain a subsequent temperature difference, and changing the ammonia flow rate, the oxygen flow rate, the percentage of the reformate stream that is processed by the $H_2$ processing module, the percentage of the reformate stream that is combusted in the combustion heater, and/or the percentage of the reformate stream that is vented or flared out of the combustion heater may be repeated to further change the ammonia flow rate, the oxygen flow rate, the percentage of the reformate stream that is processed by the $H_2$ processing module, the percentage of the reformate stream that is combusted in the combustion heater, and/or the percentage of the reformate stream that is vented or flared out of the combustion heater (by an amount that is proportional to the subsequent temperature difference). The aforementioned steps may be repeated until the measured temperature is within the target temperature range.

In some embodiments, integral control may be performed. For example, the temperature measured in the reformer 108 or combustion heater 109 may be a first temperature that is measured at a first time point, and the integral control may be performed by (a) measuring a second temperature of the reformer 108 or the combustion heater 109 at second time point subsequent to the first time point, (b) calculating a time period between the first time point and the second time point, (c) calculating a temperature difference between first temperature and the second temperature, and (d) changing one or more of the ammonia flow rate, the oxygen flow rate, the percentage of the reformate stream that is processed by the $H_2$ processing module, the percentage of the reformate stream that is combusted in the combustion heater, and/or the percentage of the reformate stream that is vented or flared out of the combustion heater (by an amount that is based at least in part on the time period and the temperature difference). In some embodiments, the aforementioned steps are repeated until the measured temperature is within the target temperature range.

Flaring or Venting Hydrogen in Combustion Heater Exhaust

FIG. 6O is a block diagram illustrating the flaring or venting 525 of hydrogen in the combustion exhaust 114 of the combustion heater 109 to depressurize the reformers 108-110.

In some embodiments, the hydrogen may be flared in the combustion exhaust 114 of the combustion heater 109 by modulating a stochiometric ratio of (1) the hydrogen in the reformate stream 120 supplied to the combustion heater 109 to (2) the oxygen in the air stream 118 supplied to the combustion heater 109. Modulating the stochiometric ratio may comprise modulating the flow rate and/or pressure of the air stream 118 supplied to the combustion heater 109 to maintain a fuel rich condition of the combustion reaction (in other words, the hydrogen may be in stoichiometric excess). In some cases, modulating the stoichiometric ratio may comprise modulating the flow rate and/or pressure of the reformate stream 120 supplied to the combustion heater 109 to maintain the fuel rich condition of the combustion reaction.

In some embodiments, a temperature of the combustion heater 109 may be maintained to be less than a threshold temperature by modulating the flow rate and/or pressure of the air stream 118 supplied to the combustion heater 109 (e.g., to enable a lower temperature catalytic combustion of the hydrogen).

In some embodiments, the flow of the air stream 118 to the combustion heater 109 may be reduced or shut off completely, which may decrease the temperature of the combustion heater 109 to be less than a combustion temperature, and therefore the hydrogen may be vented (instead of combusted).

Air-Rich or Fuel-Lean Combustion

In some cases, the combustion reaction in the combustion heater 109 may comprise an air-rich or fuel-lean condition (i.e., so that oxygen is in stoichiometric excess). In some cases, the fuel-lean combustion may increase thermal or energy efficiency of the reforming system 100, since a substantial majority, or all, of the combustion fuel (e.g., the reformate stream 120) is consumed. The fuel-lean combustion may enable a small amount (or none) of the $H_2$ at the combustion exhaust 114 to be flared or vented, which may reduce waste $H_2$ since flared or vented $H_2$ may not be used for power generation, or for chemical or industrial processes. In some cases, the fuel-lean combustion may prevent flammability of the combustion exhaust 114, and therefore may enable a safe operation of the ammonia reforming system 100.

In some cases, the air-rich or fuel-lean combustion in the combustion heater 109 is maintained during at least about 10, 20, 30, 40, 50, 60, 70, 80, or 90% of the operational time period of the operation mode. In some cases, the air-rich or fuel-lean combustion in the combustion heater 109 is maintained during at most about 10, 20, 30, 40, 50, 60, 70, 80, or 90% of the operational time period of the operation mode. In some cases, the air-rich or fuel-lean combustion in the combustion heater 109 is maintained during of from about 10% to about 30%, of from about 20% to about 40%, of from about 30% to about 50%, of from about 40% to about 60%, of from about 50% to about 70%, of from about 60% to about 80%, or of from about 70% to about 90% of the operational time period of the operation mode.

Ammonia as Combustion Fuel

In some cases, instead of combusting the reformate stream 120, the combustion heater 109 may combust ammonia to heat the combustion-heated reformer 108. In some cases, at least part of the ammonia stream 104 may be directed from the storage tank 102 to the combustion heater 109 to combust the ammonia stream 104 to heat the reformer 108. In some cases, an additional ammonia stream (separate from the ammonia stream 104) may be directed from an additional storage tank (separate from the storage tank 102) to the combustion heater 109 to combust the additional ammonia stream to heat the reformer 108.

In some cases, a pure ammonia stream (i.e., comprising only ammonia) may be directed to the combustion heater 109 for combusting. In some cases, an ammonia stream mixed with a pilot fuel (i.e., a promoter fuel to facilitate combustion) is directed to the combustion heater 109 for combusting. The pilot fuel may comprise a lower flash point compared to ammonia and may comprise a higher flame speed when combusted compared to ammonia. The pilot fuel may comprise hydrogen (for example, the hydrogen in the reformate stream 120). In some cases, the pilot fuel is a hydrocarbon (that may be, for example, generated using renewable energy).

It is contemplated that for any embodiment of the present disclosure where the reformate stream 120 is directed for combustion in the combustion heater 109, the reformate stream 120 may instead comprise ammonia for combustion in the combustion heater 109. Therefore, is also contemplated that the amount of ammonia for combustion may be controlled (e.g., the flow rate of the ammonia may be increased or decreased) based on a stimulus (for example, the temperature of the reformer 108 and/or the combustion heater 109).

Pressure Drop Elements

Figure 6P:
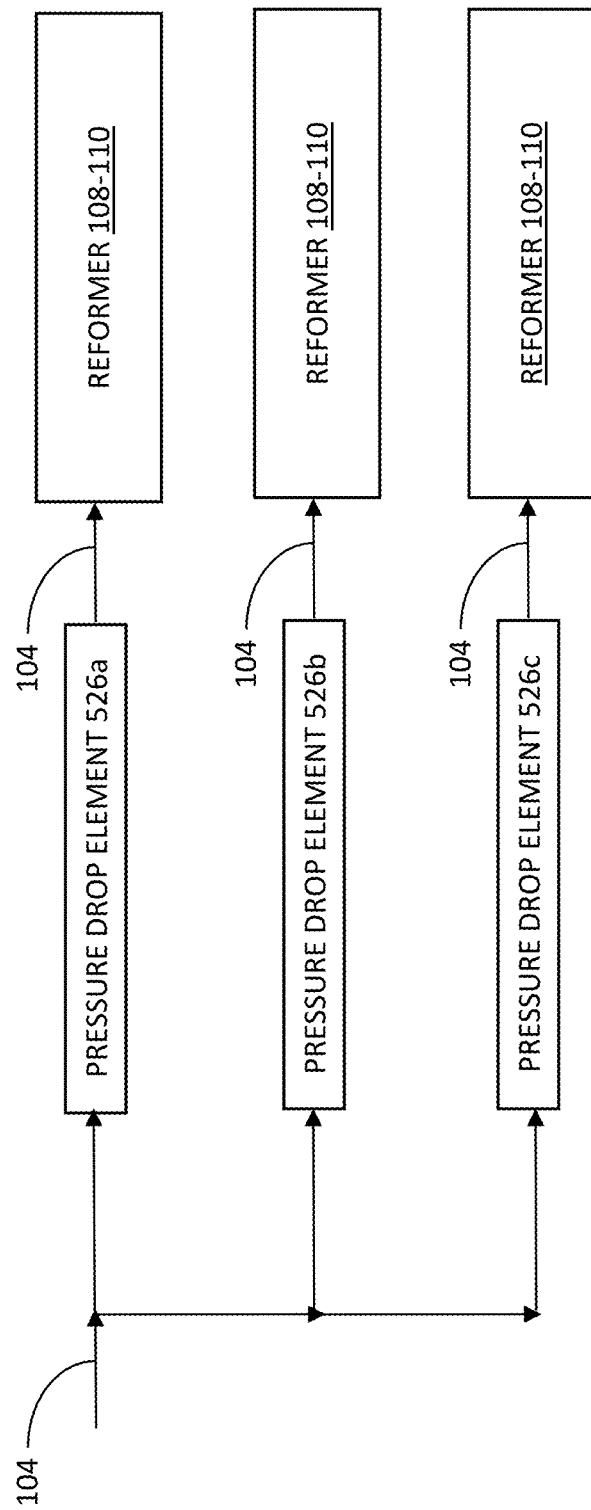
Figure 6Q:
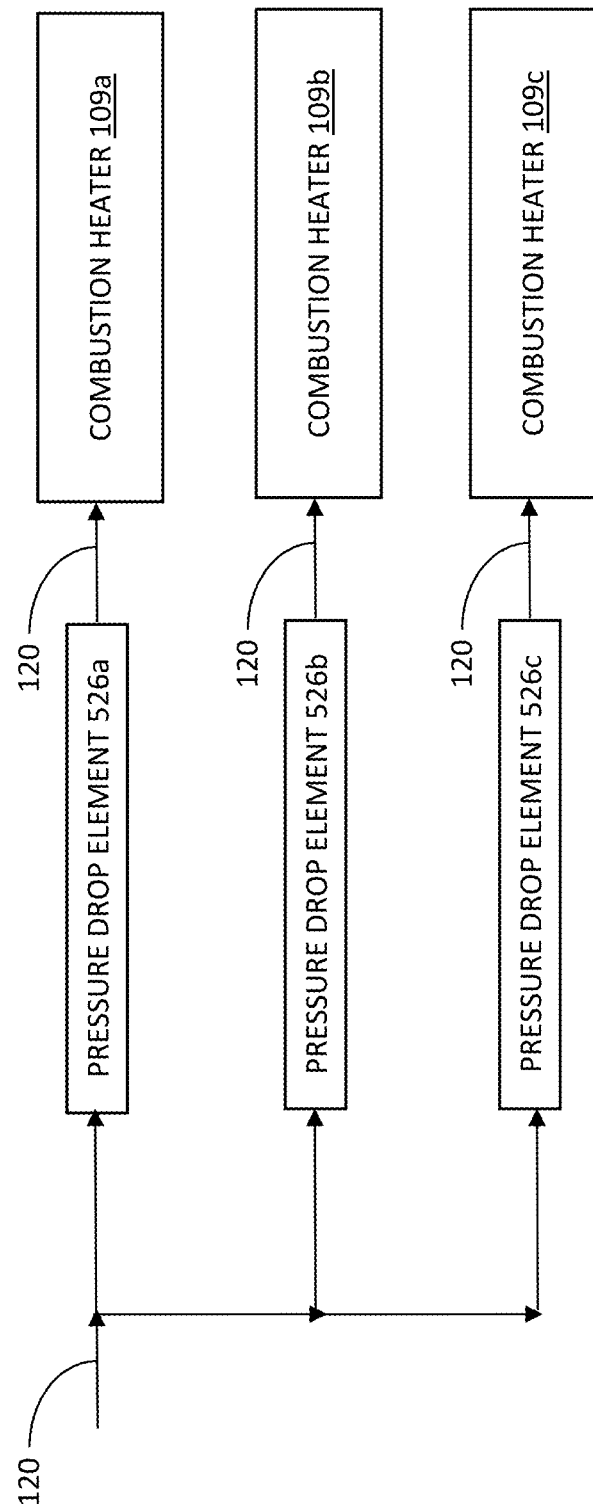
Figure 6R:
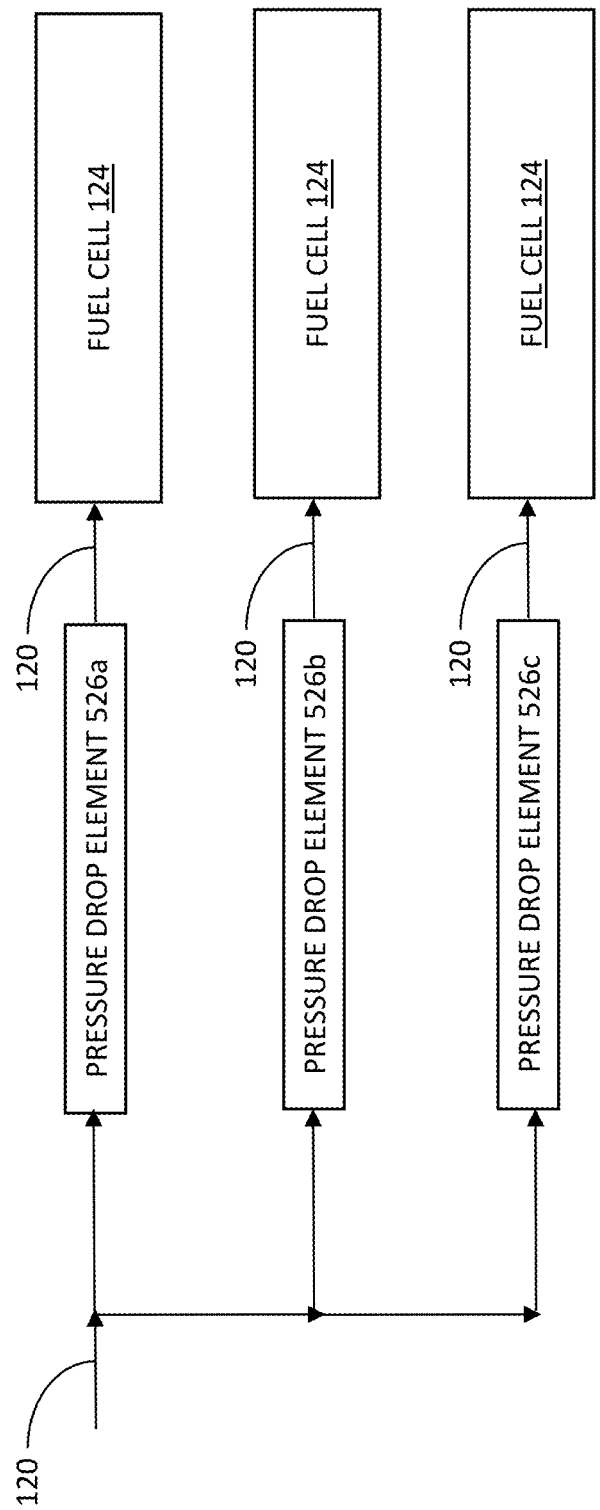

FIGS. 6P-6R are block diagrams illustrating pressure drop elements 526a-c configured to maintain an even distribution of fluid pressure to a plurality of components of the ammonia reforming system 100. The pressure drop elements 526a-c may comprise, for example, restricted orifices or apertures positioned in fluid lines and/or manifolds of the ammonia reforming system 100. In some instances, the pressure drop element 526a may be smaller in size (e.g., the radius of an orifice or aperture) than the pressure drop element 526b, and in turn, the pressure drop element 526b may be smaller in size than the pressure drop element 526c. By homogenizing or equalizing the pressure of fluid provided to each of the components, the potential output of each respective component may be maximized.

In some instances, a pressure drop of the pressure drop element 526a may be different from a pressure drop of the pressure drop elements 526b and/or 526c. In some instances, a pressure drop of the pressure drop element 526a may be same as a pressure drop of the pressure drop elements 526b and/or 526c within a selected tolerance. The selected tolerance may be less than 20%.

For example, as shown in FIG. 6P, pressure drop elements 526a-c may be configured to distribute the ammonia stream 104 evenly to multiple reformers 108-110 (or sets of reformers 108-110). As shown in FIG. 6Q, pressure drop elements 526a-c may be configured to distribute the reformate stream 120 evenly to multiple combustion heaters 109. As shown in FIG. 6R, pressure drop elements 526a-c may be configured to distribute the reformate stream 120 evenly to multiple fuel cells 124.

In some cases, the one or more pressure drop elements illustrated in the FIGS. 6P-R may distribute a flow rate of fluid to each of the reformers 108-110, combustion heaters 109, or fuel cells 124 within a selected tolerance of a target flow rate. In some cases, the selected tolerance is at least about 1, 5, 10, 20, 30, 40, 50, 60, 70, 80, 90, or 100%, and at most about 1, 5, 10, 20, 30, 40, 50, 60, 70, 80, 90, or 100% of the target flow rate. In some cases, the selected tolerance may be between about 1 and 100, 5 and 90, 10 and 80, 20 and 70, 30 and 60, or 40 and 50%. For example, if the target flow rate to a reformer of a set of three reformers is about 100 slpm (standard liters per minute) within a selected tolerance of about 10%, each of the three reformers receives flow rate of about 90 to about 110 slpm.

In some cases, pressure drops across the one or more pressure drop elements may be changed or adjusted manually or electronically (e.g., with voltage and/or current signals). In some cases, one or more pressure drop elements, one or more valves, one or more pumps, one or more regulators, or any combination of thereof, may adjust or maintain a flow rates to the one or more fuel cells 124 within a selected tolerance of a target flow rate. In some cases, the selected tolerance is at least about 1, 5, 10, 20, 30, 40, 50, 60, 70, 80, 90, or 100%, and at most about 1, 5, 10, 20, 30, 40, 50, 60, 70, 80, 90, or 100%. In some cases, the selected tolerance may be between about 1 and 100, 5 and 90, 10 and 80, 20 and 70, 30 and 60, or 40 and 50%. In some cases, the selected tolerance is less than about 20%.

In some cases, the one or more pressure drop elements illustrated in FIGS. 6P-R may be at least partly replaced by (or may comprise additional) one or more flow control units comprising one or more pumps, one or more check valves, one or more one-way valves, one or more three-way valves, one or more restrictive orifices, one or more valves, one or more flow regulators, one or more pressure regulators, one or more back pressure regulators, one or more pressure reducing regulators, one or more back flow regulators, one or more flow meters, one or more flow controllers, or any combination thereof. In some cases, the one or more flow control units may be controlled manually, automatically, or electronically. The one or more flow control units may maintain the desired flow rate distribution to the one or more reformers, one or more combustion heaters, or one or more fuel cells. The flow rate distribution may be even (or uneven) depending on predetermined flow processing capabilities of the one or more reformers, one or more combustion heaters, or one or more fuel cells.

In some cases, the one or more flow control units may distribute the flow to the reformers 108-110, combustion heaters 109, or fuel cells 124 within a selected tolerance of a target flow rate. In some cases, the selected tolerance is at least about 1, 5, 10, 20, 30, 40, 50, 60, 70, 80, 90, or 100%, and at most about 1, 5, 10, 20, 30, 40, 50, 60, 70, 80, 90, or 100%. In some cases, the selected tolerance may be between about 1 and 100, 5 and 90, 10 and 80, 20 and 70, 30 and 60, or 40 and 50%. For example, if the target flow rate to one reformer of a set of three reformers is about 100 slpm (standard liters per minute) with a selected tolerance of about 10%, each of the three reformers receives a flow rate of about 90 to about 110 slpm. In some cases, the selected tolerance is less than about 20%.

Hydrogen Separation Membrane

Figure 6S:
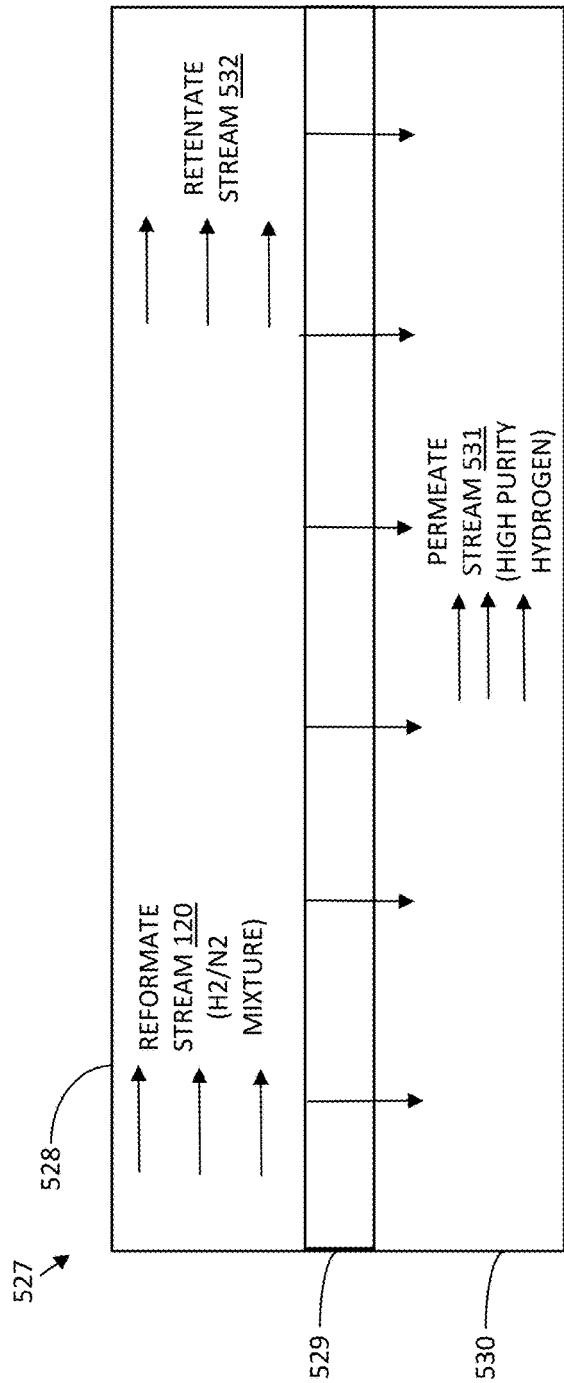

FIG. 6S is a block diagram illustrating a hydrogen separation device 527 configured to separate hydrogen from the reformate stream 120. The hydrogen separation device 527 may comprise a retentate chamber 528, a membrane 529, and a permeate chamber 530. The hydrogen separation device 527 may increase the hydrogen purity of the reformate stream 120, which may increase the hydrogen consumption rate or output voltage of the fuel cell 124 when the high hydrogen purity reformate stream 120 is provided to the fuel cell 124.

As the reformate stream 120 passes the retentate chamber 528, hydrogen may diffuse across the membrane 529 into the permeate chamber 530. The membrane 529 may comprise platinum (Pt), palladium (Pd), vanadium (V), niobium (Nb), tantalum (Ta), an alloy thereof, or any combination thereof, although the present disclosure is not limited thereto. The permeate stream 531 (comprising the separated hydrogen, e.g., 99% or more hydrogen) may then exit the hydrogen separation device 527 (via an outlet in the permeate chamber 530) and be provided to the fuel cell 124 for electricity generation. In some cases, the retentate stream 532 comprising at least portion of the hydrogen from the reformate stream 120 may be supplied to the combustion heater 109 as a combustion fuel.

Reforming Ammonia to Provide Hydrogen for Internal Combustion Engine

Figure 6T:
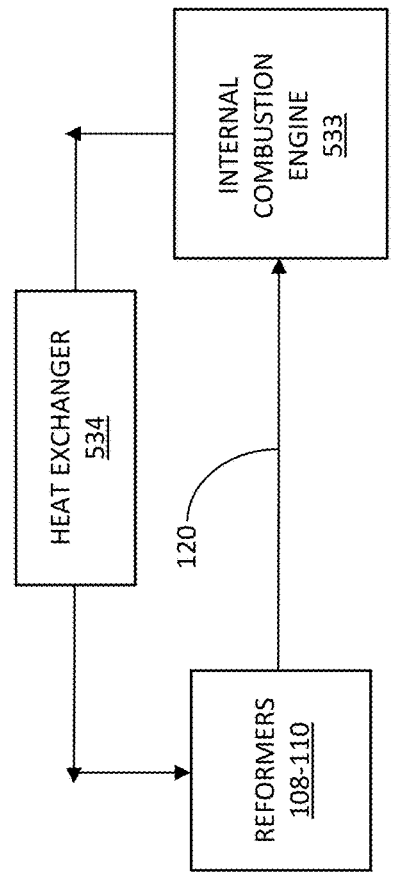

FIG. 6T is a block diagram illustrating an internal combustion engine (ICE) 533 configured to combust the reformate stream 120 (i.e., combust the hydrogen therein) to generate mechanical power (or electrical power). The ICE 533 may comprise a reciprocating piston engine or a gas turbine.

In some embodiments, the ICE 533 may be configured to combust the reformate stream 120 (e.g., such that hydrogen is the sole or primary fuel). In some cases, the reformate stream 120 may be co-combusted or co-fired with an additional fuel (e.g., auxiliary or secondary fuel), such that the hydrogen in the reformate stream 120 is advantageously provided as a pilot fuel (promoter fuel) that facilitates combustion of the additional fuel in the ICE 533.

The additional fuel may comprise ammonia (which, due to its low flame speed and high ignition chamber, is difficult to burn without a promoter fuel). The additional fuel comprising the ammonia may be provided from the storage tank 102 (described with respect to FIGS. 1A-4B) to be co-combusted with the reformate stream 120 in the ICE 533. In some instances, the additional ammonia may be provided from a dedicated secondary storage tank that is separate from the storage tank 102.

In some embodiments, the additional fuel comprises a hydrocarbon fuel, for example, gasoline, diesel, biodiesel, methane. biomethane, methanol, biomethanol, fatty-acid methyl ester (FAME), hydro-treated renewable diesel (HVO), Fischer-Tropsch (FT) diesel, marine oil, heavy fuel oil (HFO), marine diesel oil (MDO), and/or dimethyl ether (DME).

In some embodiments, the additional fuel comprises a synthetic renewable fuel (e.g., scalable zero emissions fuel (SZEF)) produced using at least one of carbon capture, renewable electricity, or renewable hydrogen.

In some embodiments, a heat exchanger 534 may be utilized to transfer heat from an exhaust of the ICE 533 to the combustion heated reformer 108 and/or the electrically-heated reformer 110. This heat transfer may increase the overall energy efficiency of the ammonia reforming system 100.

Methods of Initiating Ammonia Reforming

FIGS. 7-11C are a flow charts illustrating various methods of initiating ammonia reforming (e.g., startup processes for the ammonia reforming system 100). It is noted that the method steps described with respect to FIGS. 7-11C may be performed using a controller (for example, by executing program instructions using the controller 200) in response to a stimulus. The stimulus may comprise a manual input (e.g., user input), and/or an automated input. The automated input may comprise a sensor measurement (e.g., measured by sensors P1-P10, T1-T11, FM1-FM11, and AC1-AC10) being greater than or less than a threshold (e.g., threshold temperature, threshold pressure, threshold flow rate, and so on).

For example, the controller may actuate a flow control unit (e.g., open or close a valve), and direct a fluid (e.g., ammonia stream 104, reformate stream 120, air stream 118, anode off-gas 128) by increasing or decreasing a flow rate of the fluid (in response or based on the manual input or the automated input). In another example, the controller may increase or decrease heating power to the electrical heater (e.g., electrical heater 111) (in response or based on the manual input or the automated input). In another example, the controller may increase or decrease the load at the fuel cell (e.g., fuel cell 124) (in response or based on the manual input or the automated input).

First Example Method of Initiating Ammonia Reforming

Figure 7:
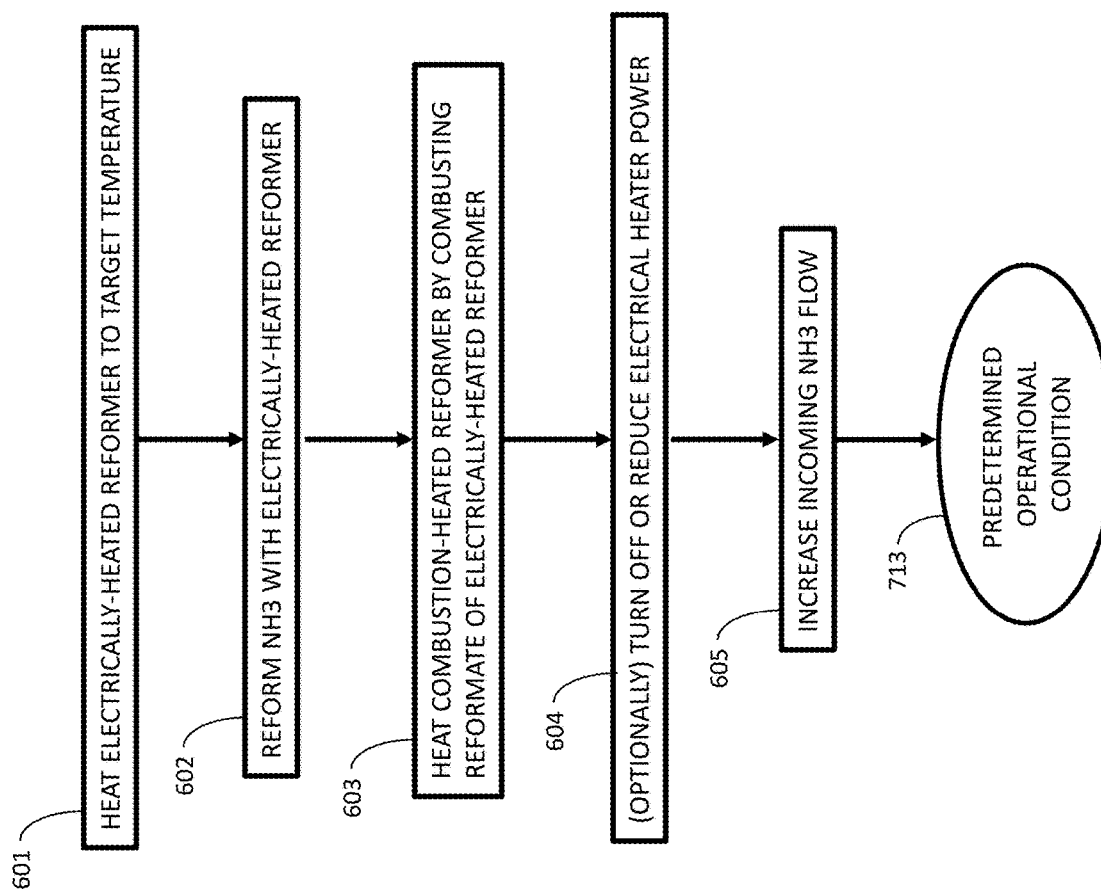
FIG. 7-11C are flow charts illustrating startup processes for an ammonia reforming method, in accordance with one or more embodiments of the present disclosure.

FIG. 7 is a flow chart illustrating a method of initiating ammonia reforming 600.

At step 601, an electrically-heated reformer (e.g., electrically-heated reformer 110) may be heated (e.g., using electrical heater 111) to a target temperature (within a target temperature range, for example, about 400-about 600° C.). The electrically-heated reformer may be heated by initiating power supply to the electrical heater.

At step 602, ammonia (e.g., incoming ammonia stream 104) may be directed to the electrically-heated reformer, and ammonia may be reformed using $NH_3$ reforming catalysts in the electrically-heated reformer to generate hydrogen and nitrogen (e.g., an $H_2/N_2$ mixture, reformate stream 120).

At step 603, at least a portion of the reformate stream (generated by the electrically-heated reformer) may be reacted with air (e.g., air stream 118) in a combustion reaction (e.g., in the combustion heater 109) to heat the combustion-heated reformer (e.g., combustion-heated reformer 109).

At step 604, the electrically-heated reformer may be optionally turned off or reduced (e.g., after the combustion-heated reformer reaches a target temperature range). The electrically-heated reformer may be turned off or reduced by reducing the power supply to the electrical heater.

At step 605, the flow rate of the incoming ammonia flow may be increased to a predefined flow rate (e.g., to generate a target flow rate of $H_2/N_2$ mixture in the reformate stream).

In some cases, step 601 and step 602 may be performed in sequence or in parallel. In some cases, at least two steps in steps 601-605 may be performed in sequence or in parallel. Once step 605 is performed, and self-sustained auto-thermal reforming is maintained (i.e., at a steady-state condition, or predetermined operational condition), the ammonia flow rate may be further increased above a pre-defined rate depending on operating requirements (e.g., fuel cell output power, electrically-heated reformer temperature(s), combustion-heated reformer temperature(s), reactor pressure(s), ammonia flowrate, etc.) while maintaining auto-thermal reforming. Step 604 may be executed or unexecuted depending on combustion-heated reformer temperature and ammonia conversion efficiency.

In some embodiments, instead of the combustion-heated reformer, the electrically-heated reformer may provide the majority or all of the hydrogen and nitrogen in the reformate stream (e.g., greater than about 50% of the hydrogen and nitrogen by volume).

Second Example Method of Initiating Ammonia Reforming

Figure 8:
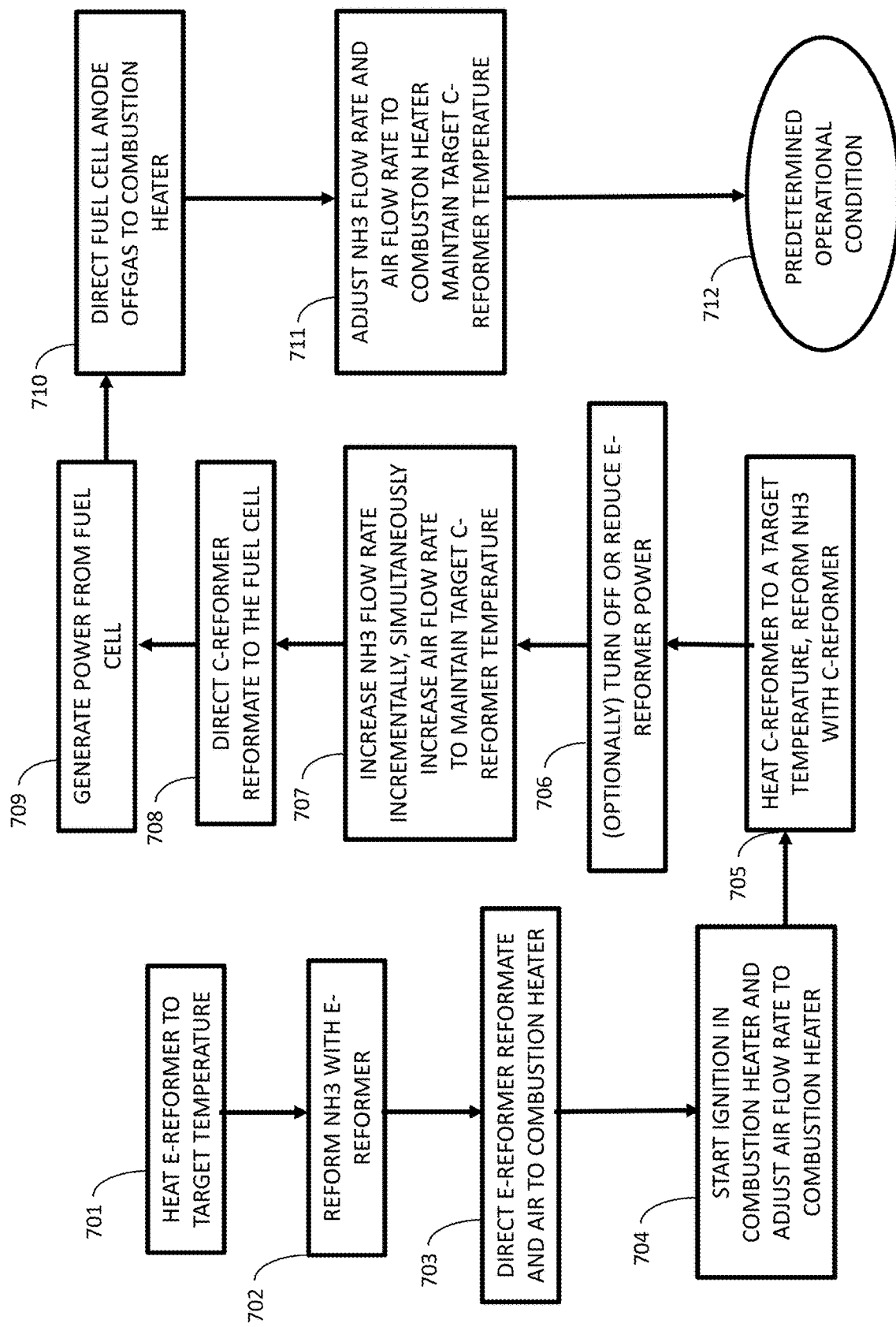

FIG. 8 is a flow chart illustrating a method of initiating ammonia reforming 700.

At step 701, an electrically-heated reformer (e.g., electrically-heated reformer 110) may be heated (e.g., using electrical heater 111) to a target temperature (within a target temperature range, for example, about 400-about 600° C.). The electrically-heated reformer may be heated by initiating power supply to the electrical heater.

At step 702, ammonia (e.g., incoming ammonia stream 104) may be directed to the electrically-heated reformer, and ammonia may be reformed using $NH_3$ reforming catalysts in the electrically-heated reformer to generate hydrogen and nitrogen (e.g., an $H_2/N_2$ mixture, reformate stream 120).

At step 703, at least a portion of the reformate stream (generated by the electrically-heated reformer) and air (e.g., air stream 118) may be directed to the combustion heater.

At step 704, the reformate stream may be reacted with the air in a combustion reaction (in the combustion heater 109) to heat the combustion-heated reformer (e.g., combustion-heated reformer 109). An ignition device (e.g., spark plug) may be activated to ignite the reformate and air in the combustion heater. The flow rate of the air to the combustion heater may be adjusted to increase the temperature of the combustion-heated reformer. In some instances, the flow rate of the air is modulated to maintain a target temperature ramp rate of the combustion-heated reformer.

Figure 13:
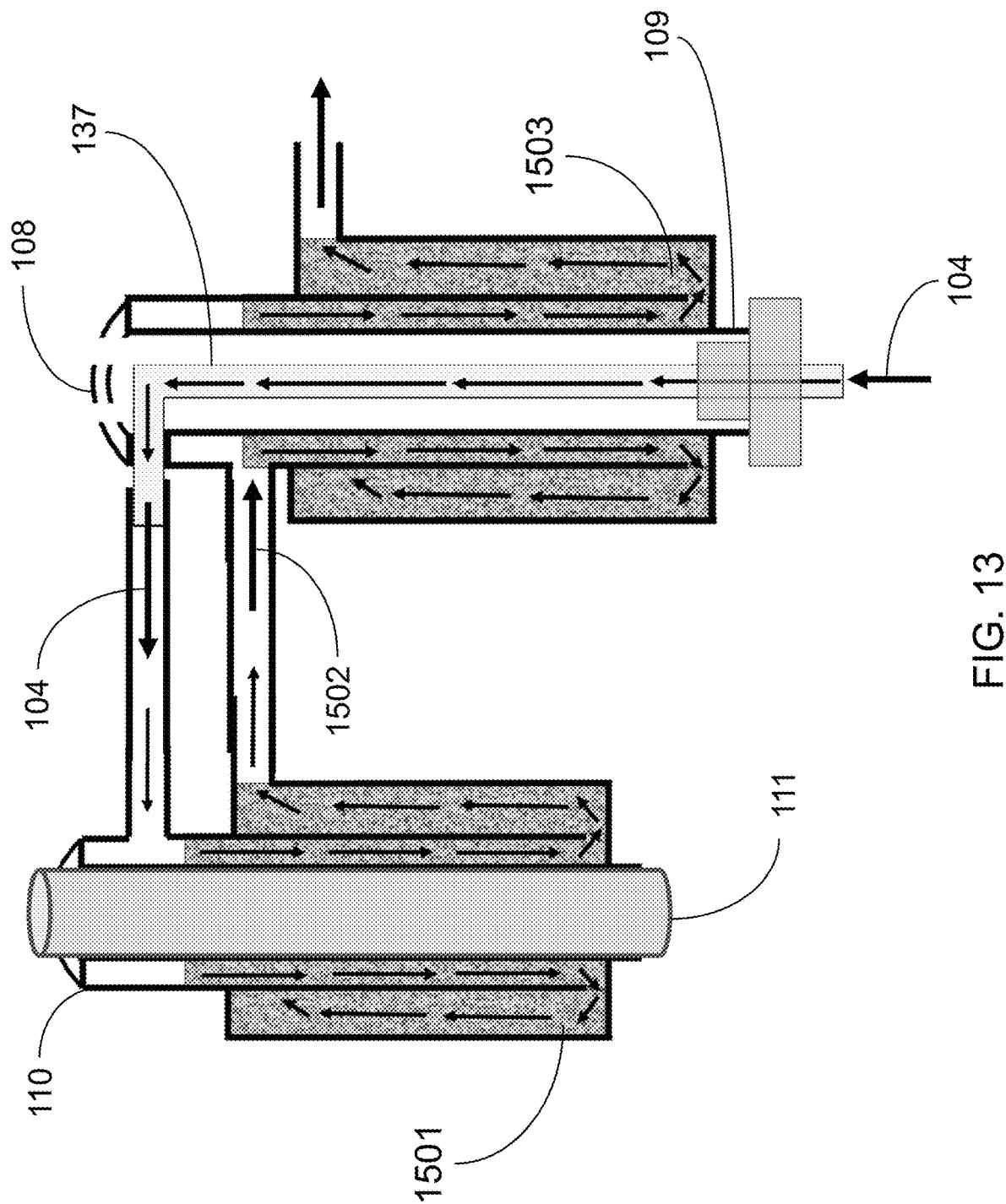
FIG. 13 is a schematic diagram illustrating utilization of an oxidation-resistant catalyst to generate reformate to purge the ammonia reforming system shown in FIGS. 1A-4B, in accordance with one or more embodiments of the present disclosure.

At step 705, ammonia (e.g., incoming ammonia stream 104) may be reformed (after the combustion-heated reformer reaches a target temperature range) using $NH_3$ reforming catalysts in the combustion-heated reformer to generate hydrogen and nitrogen (e.g., an $H_2/N_2$ mixture, reformate stream 120). In some instances, the combustion-heated reformer may fluidically communicate in series or in parallel with the electrically-heated reformer (e.g., as shown in FIG. 13).

At step 706, heating the electrically-heated reformer may be optionally turned off or reduced (e.g., after the combustion-heated reformer reaches a target temperature range). The electrically-heated reformer may be turned off or reduced by reducing the power supply to the electrical heater.

At step 707, the flow rate of the incoming ammonia stream may be incrementally increased to a predefined flow rate (e.g., to generate a target flow rate of $H_2/N_2$ mixture in the reformate stream). Simultaneously, the flow rate of the air stream (to the combustion heater) may be increased. By simultaneously increasing both the flow rate of the incoming ammonia stream and the flow rate of the air stream, the combustion-heated reformer may be maintained in a target temperature range.

At step 708, the reformate generated by the combustion-heated reformer (and optionally the reformate generated by the electrically-heated reformer) may be directed (e.g., using one or more flow control units, pumps, valves, and/or regulators) to the fuel cell (e.g., fuel cell 124).

At step 709, the fuel cell may generate an electrical power output (to supply to an electrical load, e.g., an electrical grid, an electrical battery, or a motor for a vehicle).

At step 710, the anode off-gas from the fuel cell (e.g., anode off-gas 128) may be optionally directed to the combustion heater to be combusted. For example, a three-way valve may direct the reformate from (1) being provided directly to the combustion heater to (2) being provided to the fuel cell (and, subsequently, the anode off-gas may be provided to the combustion-heater). In some instances, the step 710 is performed before the step 709, or may executed simultaneously.

At step 711, the flow rate of the incoming ammonia stream and the flow rate of the air stream may be adjusted to maintain the target temperature in the combustion-heated reformer.

At step 712, the ammonia reforming method (or system) may achieve a predetermined operational condition (steady-state condition)

It is noted that step 706 may be executed or unexecuted based on the combustion-heated reformer temperature. For example, step 706 may be unexecuted based on the combustion-heated reformer temperature being less than a predetermined threshold temperature. Step 709 may be executed any time after step 708.

Third Example Method of Initiating Ammonia Reforming

Figure 9:
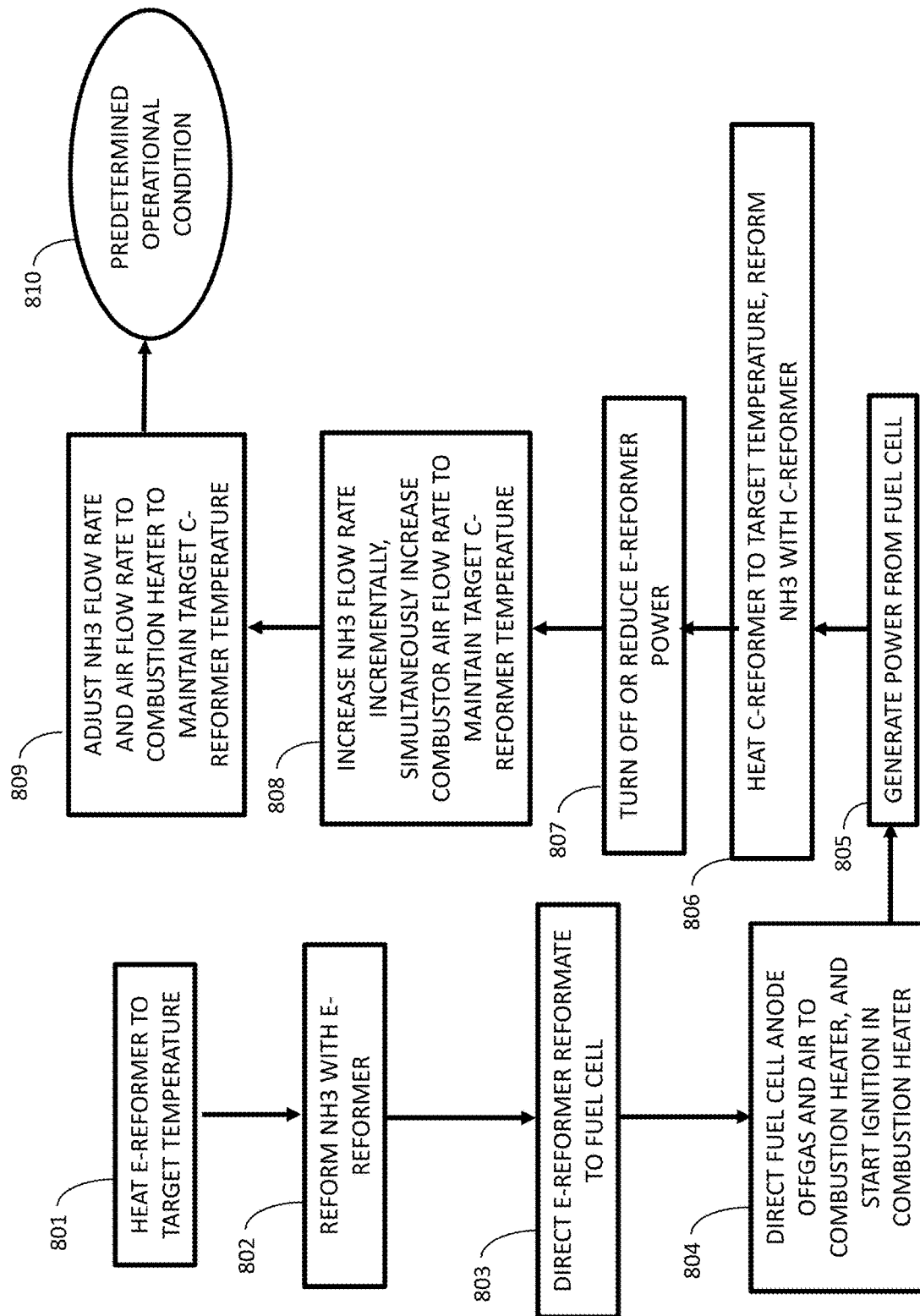

FIG. 9 is a flow chart illustrating a method of initiating ammonia reforming 800.

At step 801, an electrically-heated reformer (e.g., electrically-heated reformer 110) may be heated (e.g., using electrical heater 111) to a target temperature (within a target temperature range, for example, about 400-about 600° C.). The electrically-heated reformer may be heated by initiating power supply to the electrical heater.

At step 802, ammonia (e.g., incoming ammonia stream 104) may be directed to the electrically-heated reformer, and ammonia may be reformed using $NH_3$ reforming catalysts in the electrically-heated reformer to generate hydrogen and nitrogen (e.g., an $H_2/N_2$ mixture, reformate stream 120).

At step 803, at least a portion of the reformate stream (generated by the electrically-heated reformer) may be directed to a fuel cell 124.

At step 804, the anode off-gas from the fuel cell (e.g., anode off-gas 128) may be optionally directed to a combustion heater to be combusted with air (e.g., air stream 118). An ignition device (e.g., spark plug) may be activated to ignite the anode off-gas and air in the combustion heater. The flow rate of the air to the combustion heater may be adjusted to increase the temperature of the combustion-heated reformer.

At step 805, the fuel cell may generate an electrical power output (to supply to an electrical load, e.g., a motor for a vehicle). In some instances, the step 805 may be performed before the step 804 or may performed simultaneously.

At step 806, ammonia (e.g., incoming ammonia stream 104) may be reformed (after the combustion-heated reformer reaches a target temperature range) using $NH_3$ reforming catalysts in the combustion-heated reformer to generate hydrogen and nitrogen (e.g., an $H_2/N_2$ mixture, reformate stream 120). In some cases, the combustion-heated reformer may fluidically communicate in series or in parallel with the electrically-heated reformer (e.g., as shown in FIG. 13).

At step 807, heating the electrically-heated reformer may be optionally turned off or reduced (e.g., after the combustion-heated reformer reaches a target temperature range). The electrically-heated reformer may be turned off or reduced by reducing the power supply to the electrical heater.

At step 808, the flow rate of the incoming ammonia stream may be incrementally increased to a predefined flow rate (e.g., to generate a target flow rate of $H_2/N_2$ mixture in the reformate stream). Simultaneously, the flow rate of the air stream (to the combustion heater) may be increased. By simultaneously increasing both the flow rate of the incoming ammonia stream and the flow rate of the air stream, the combustion-heated reformer may be maintained in a target temperature range.

At step 809, optionally, the flow rate of the incoming ammonia stream and the flow rate of the air stream may be further adjusted to maintain the target temperature in the combustion-heated reformer.

At step 810, the ammonia reforming method (or system) may achieve a predetermined operational condition (steady-state condition)

It is noted that step 807 may be executed or unexecuted based on the combustion-heated reformer temperature. For example, step 807 may be unexecuted based on the combustion-heated reformer temperature being less than a predetermined threshold temperature. Step 805 may be executed any time after step 803.

Fourth Example Method of Initiating Ammonia Reforming

Figure 10:
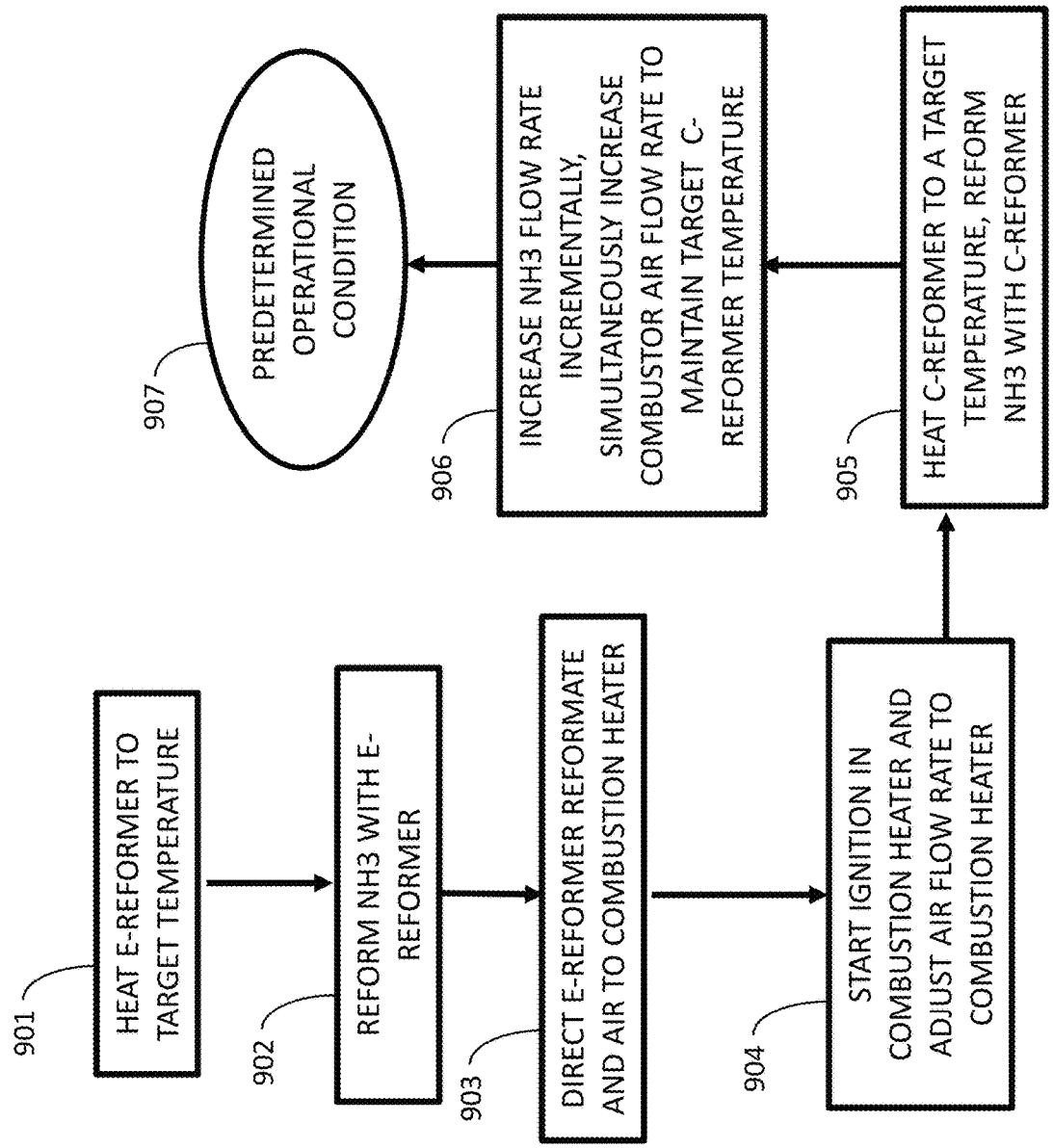

FIG. 10 is a flow chart illustrating a method of initiating ammonia reforming 900.

At step 901, an electrically-heated reformer (e.g., electrically-heated reformer 110) may be heated (e.g., using electrical heater 111) to a target temperature (within a target temperature range, for example, about 400-about 600° C.). The electrically-heated reformer may be heated by initiating power supply to the electrical heater.

At step 902, ammonia (e.g., incoming ammonia stream 104) may be directed to the electrically-heated reformer, and ammonia may be reformed using $NH_3$ reforming catalysts in the electrically-heated reformer to generate hydrogen and nitrogen (e.g., an $H_2/N_2$ mixture, reformate stream 120).

At step 903, at least a portion of the reformate stream (generated by the electrically-heated reformer) and air (e.g., air stream 118) may be directed to the combustion heater.

At step 904, the reformate stream may be reacted with the air in a combustion reaction (in the combustion heater 109) to heat the combustion-heated reformer (e.g., combustion-heated reformer 109). An ignition device (e.g., spark plug) may be activated to ignite the reformate and air in the combustion heater. The flow rate of the air to the combustion heater may be adjusted to increase the temperature of the combustion-heated reformer.

At step 905, ammonia (e.g., incoming ammonia stream 104) may be reformed (after the combustion-heated reformer reaches a target temperature range) using $NH_3$ reforming catalysts in the combustion-heated reformer to generate hydrogen and nitrogen (e.g., an $H_2/N_2$ mixture, reformate stream 120). In some cases, the combustion-heated reformer may fluidically communicate in series or in parallel with the electrically-heated reformer (e.g., as shown in FIG. 13).

At step 906, the flow rate of the incoming ammonia stream may be incrementally increased to a predefined flow rate (e.g., to generate a target flow rate of $H_2/N_2$ mixture in the reformate stream). Simultaneously, the flow rate of the air stream (to the combustion heater) may be increased. By simultaneously increasing both the flow rate of the incoming ammonia stream and the flow rate of the air stream, the combustion-heated reformer may be maintained in a target temperature range.

At step 907, the ammonia reforming method (or system) may achieve a predetermined operational condition (steady-state condition)

Methods of Initiating Ammonia Reforming System

Figure 11B:
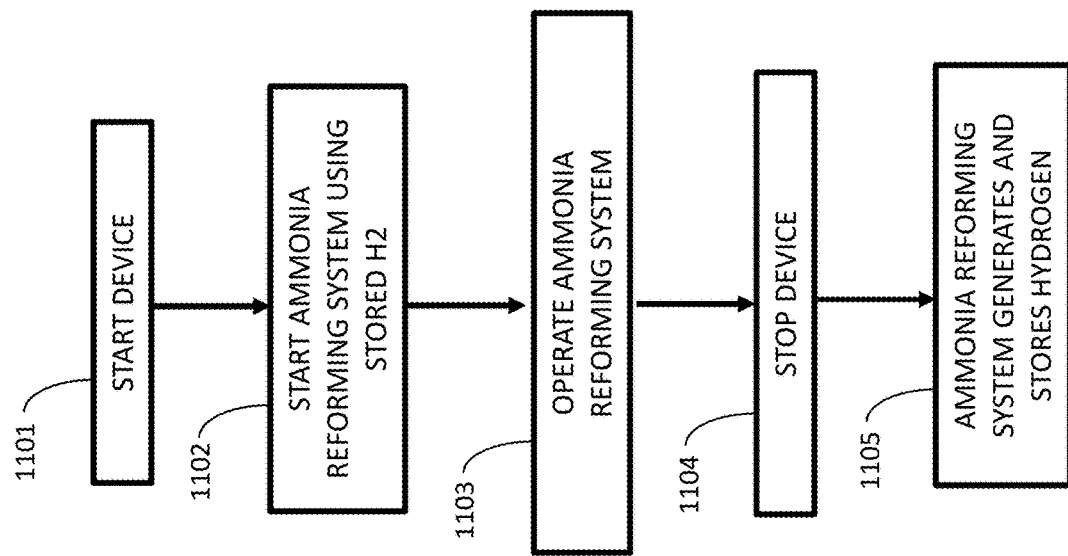
Figure 11A:
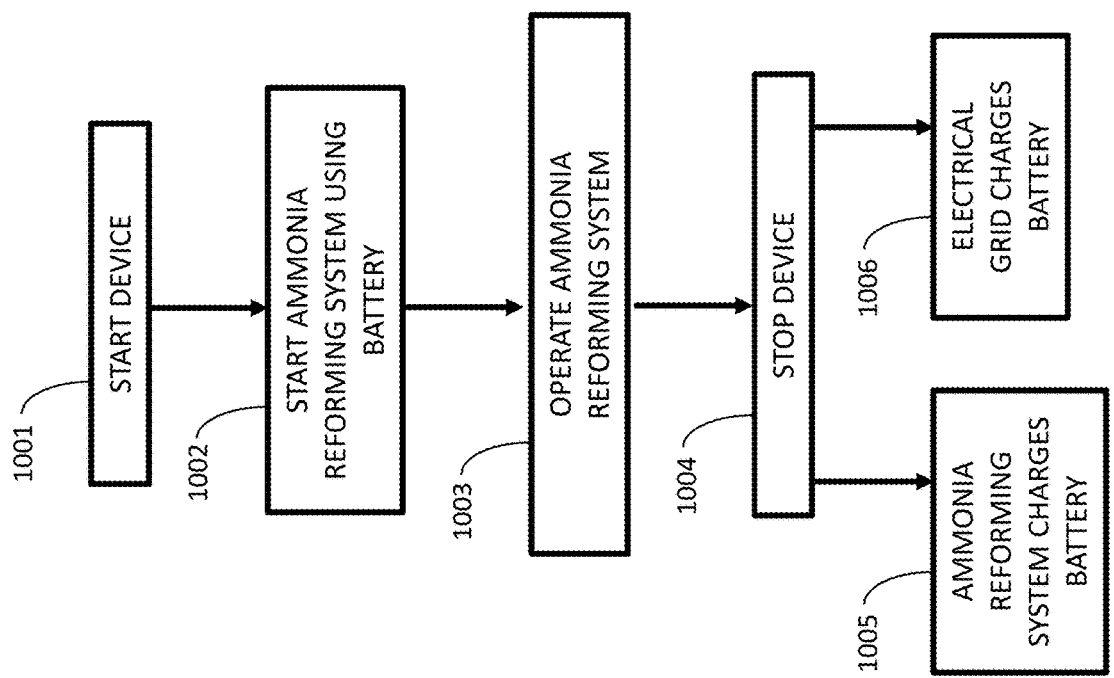
Figure 11C:
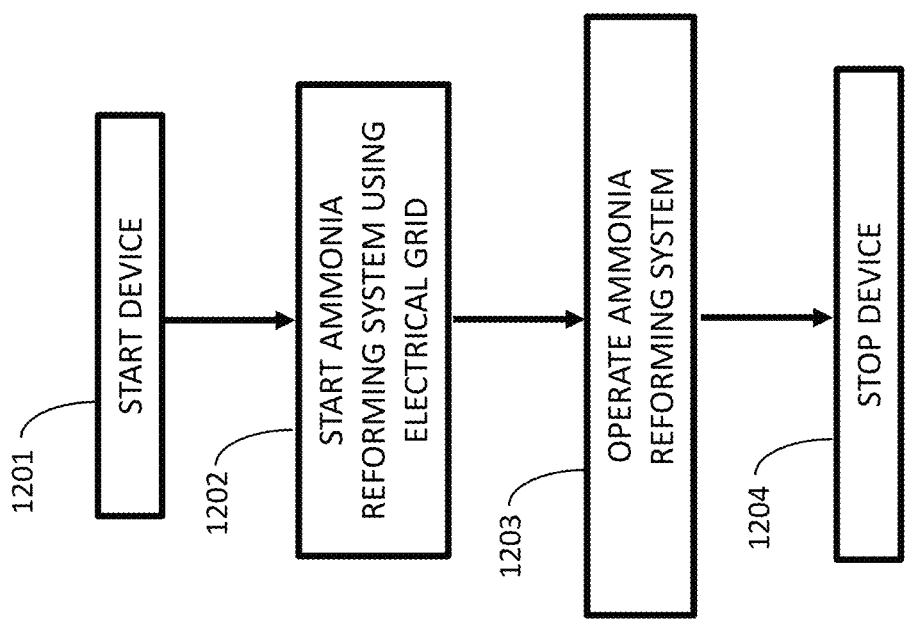

FIGS. 11A-11C are flow charts illustrating various methods of initiating an ammonia reforming system (e.g., ammonia reforming system 100) to power a device. The device may be a load powered by a fuel cell of the ammonia reforming system (for example, an electrical motor for a mobile vehicle, a stationary data center, a cell phone tower, or a charging station) or an internal combustion engine powered by reformate generated by the ammonia reforming system.

Method of Initiating Ammonia Reforming System Using Battery

FIG. 11A is a flow chart illustrating a method of initiating an ammonia reforming system using a battery (to power a device).

At step 1001, the device may be started. For example, an electrical vehicle or device may be switched on.

At step 1002, the ammonia reforming system may be started using a battery. For example, an electrical heater may receive electrical power from the battery to heat an electrically-heated reformer, and ammonia may be reformed using the $NH_3$ reforming catalysts in the electrically-heated reformer.

At step 1003, the ammonia reforming system may be further operated. For example, any of the steps described with respect to FIGS. 7-10 may be executed or performed.

At step 1004, the device may be stopped. For example, an electrical vehicle or device may be switched off.

At step 1005, the ammonia reforming system may charge the battery (for example, by providing fuel cell power to the battery). In some embodiments, an electrical grid (e.g., external electrical grid) may charge the battery.

Method of Initiating Ammonia Reforming System Using Stored Hydrogen

FIG. 11B is a flow chart illustrating a method of initiating an ammonia reforming system using stored hydrogen (to power a device).

At step 1101, the device may be started. For example, an electrical vehicle or device may be switched on.

At step 1102, the ammonia reforming system may be started using stored hydrogen (e.g., stored in a hydrogen storage tank). For example, a combustion heater may combust the hydrogen and air to heat a combustion-heated reformer, and ammonia may be reformed using the $NH_3$ reforming catalysts in the combustion-heated reformer.

At step 1103, the ammonia reforming system may be further operated. For example, any of the steps described with respect to FIGS. 7-10 may be executed or performed.

At step 1104, the device may be stopped. For example, an electrical vehicle may be switched off.

At step 1105, the ammonia reforming system may generate hydrogen, and store the hydrogen (e.g., in the hydrogen storage tank). It is noted that reformate (e.g., hydrogen/nitrogen mixture) may be stored in the hydrogen storage tank.

Method of Initiating Ammonia Reforming System Using Electrical Grid

FIG. 11C is a flow chart illustrating a method of initiating an ammonia reforming system using an electrical grid (to power a device).

At step 1201, the device may be started. For example, a cell phone tower or charging device may be switched on.

At step 1202, the ammonia reforming system may be started using electrical power from an electrical grid. For example, an electrical heater may receive electrical power from the electrical grid to heat an electrically-heated reformer, and ammonia may be reformed using the $NH_3$ reforming catalysts in the electrically-heated reformer.

At step 1203, the ammonia reforming system may be further operated. For example, any of the steps described with respect to FIGS. 7-10 may be executed or performed.

At step 1204, the device may be stopped. For example, a cell phone tower or charging device may be switched off.

Method of Operating Ammonia Reforming System

Figure 12A:
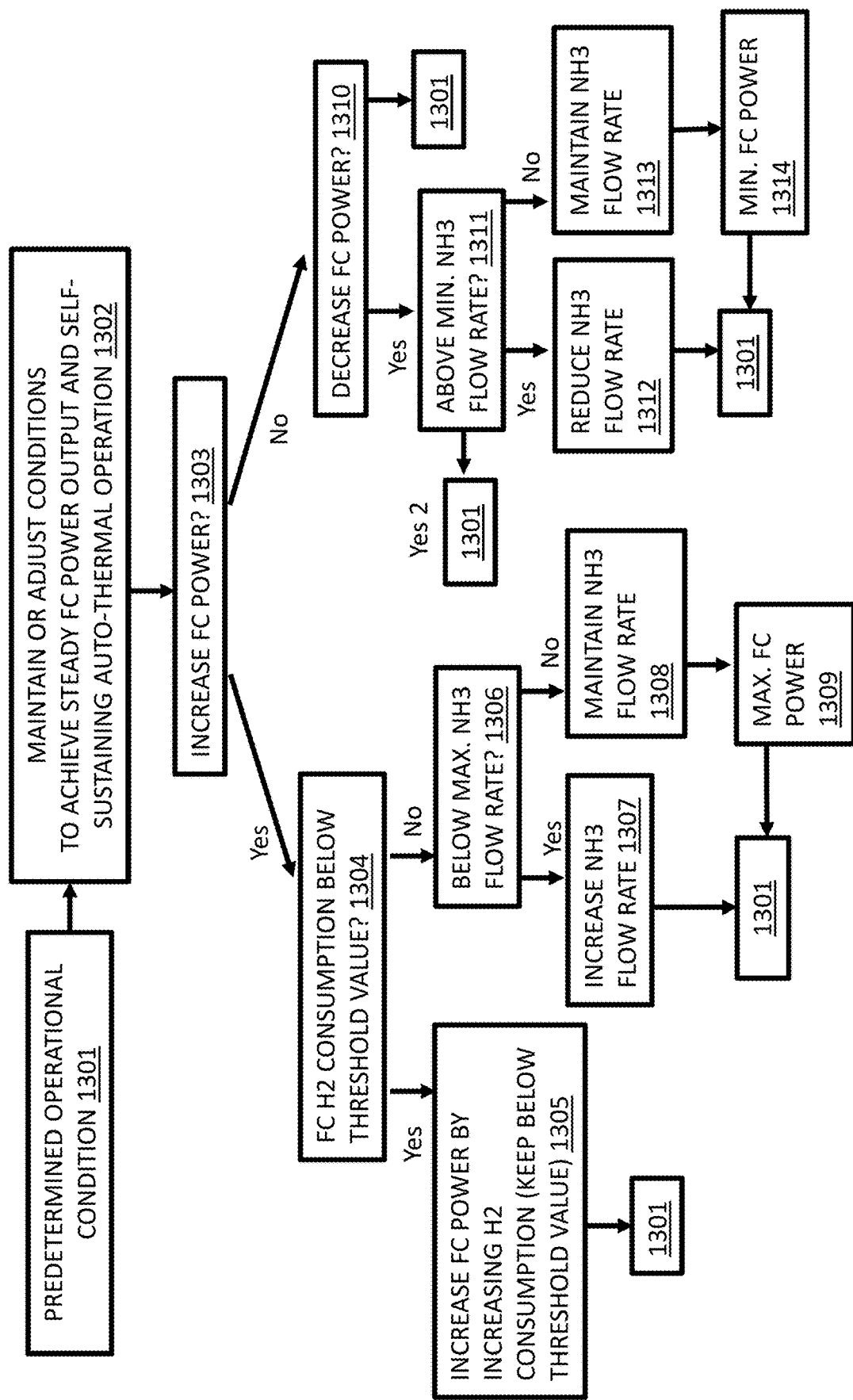
FIGS. 12A-12B are flow charts illustrating post-startup processes for an ammonia reforming method, in accordance with one or more embodiments of the present disclosure.

FIG. 12A is a flow chart illustrating a method of operating ammonia reforming (e.g., ammonia reforming system 100), in accordance with one or more embodiments of the present disclosure.

At step 1301, for a set of given system operational parameters, self-sustaining auto-thermal operational conditions may be predetermined (e.g., minimum and maximum $NH_3$ flow rates, corresponding fuel cell (FC) power and hydrogen consumption rates, minimum and maximum battery states of charge (SOC), minimum and maximum air flow rates, etc.).

At step 1302, operational parameters may be maintained and/or adjusted to maintain and/or adjust fuel cell power output (and self-sustained autothermal reforming).

At step 1303, the method may comprise monitoring the power output of the fuel cell, and automatically or manually adjusting (increasing or decreasing) the power output (based on the electrical load coupled to the fuel cell). The method may adjust various operational parameters including the flow rate of the air stream to the combustion heater, the flow rate of the incoming ammonia stream, the hydrogen consumption rate of the fuel cell, and/or the electrical power to the electrical heater. In some cases, a controller may control $NH_3$ flow rate, control air flow rate, control $NH_3$ flow pressures, control air flow pressures, control valves, control FC power output, control battery power output, control E-reformer power input, control FC hydrogen consumption rate, or any combination thereof. In some cases, one or more sensors may measure temperatures, pressures, fuel cell power output, battery power outputs, battery SOC, fuel cell hydrogen consumption rate, $NH_3$ conversion efficiency, or any combination thereof.

At step 1304, based on the fuel cell power being less than the electrical load power, the method may comprise increasing the power output of the fuel cell. The hydrogen consumption rate of the fuel cell may be compared to a predetermined threshold consumption rate (the threshold consumption rate may be a specific value or a range).

At step 1305, based on the hydrogen consumption rate being less than the predetermined threshold, the method may comprise increasing the power output of the fuel cell by increasing the hydrogen consumption rate (while still keeping the hydrogen consumption rate less than the predetermined threshold). The method may then proceed to step 1301.

At step 1306, based on the hydrogen consumption rate of the fuel cell being equal to or above the predetermined threshold, the method may comprise comparing the ammonia flow rate into the system to a predetermined ammonia flow rate. In some cases, the predetermined ammonia flow rate may be a maximum ammonia flow rate for the system.

At step 1307, the method may comprise increasing the ammonia flow rate (based on the flow rate of the incoming ammonia stream being less than the predetermined ammonia flow rate). The method may then proceed to step 1301.

At step 1308, the method may comprise maintaining the ammonia flow rate (based on the flow rate of the incoming ammonia stream being greater than the predetermined ammonia flow rate).

At step 1309, the method may comprise maintaining the power output of the fuel cell (based on the flow rate of the incoming ammonia stream being equal to or greater than the predetermined ammonia flow rate). In some cases, the power output of the fuel cell may be a maximum power output of the fuel cell. The method may then proceed to step 1301.

At step 1310, based on the fuel cell power being greater than the electrical load power, the method may comprise decreasing the power output of the fuel cell. Otherwise, the fuel cell power may not be decreased, and the method may proceed to step 1301.

At step 1311, the method may comprise comparing the flow rate of the incoming ammonia stream to a predetermined ammonia flow rate. In some cases, the predetermined ammonia flow rate may be a minimum ammonia flow rate. In some cases, regardless of the flow rate of the incoming ammonia stream being equal to or greater than the minimum ammonia flow rate, method may proceed to step 1301.

At step 1312, the method may comprise reducing the flow rate of the incoming ammonia stream (based on the flow rate of the incoming ammonia stream being greater than the predetermined ammonia flow rate). The method may then proceed to step 1301.

At step 1313, the method may comprise maintaining the flow rate of the incoming ammonia stream (based on the flow rate of the incoming ammonia stream being equal to or less than the predetermined ammonia flow rate).

At step 1314, the method may comprise maintaining the power output of the fuel cell (based on the flow rate of the incoming ammonia stream being equal to or less than the predetermined ammonia flow rate). The method may then proceed to step 1301.

In some cases, at step 1311, the method may or may not comprise comparing the flow rate of the incoming ammonia stream to a predetermined ammonia flow rate. Regardless of the flow rate of the incoming ammonia stream being less than, equal to, or greater than the predetermined ammonia flow rate, the method may further comprise maintaining the flow rate of the incoming ammonia stream and proceeding to step 1301. In some cases, the predetermined ammonia flow rate may be a minimum ammonia flow rate. In this way, the fuel cell power is reduced and the incoming ammonia flow rate is maintained or at least within a desired range.

In some cases, the method may comprise a shutdown process. In some cases, the shutdown process may comprise reducing any one of or a combination of ammonia flow rate, air flow rate, and fuel cell power to zero.

In some cases, the method may comprise performing or executing a hot standby mode. In some cases, performing or executing the hot standby mode may comprise reducing the ammonia flow rate, air flow rate, and/or the fuel cell power to zero.

Method of Operating Ammonia Reforming System Using a Battery

Figure 12B:
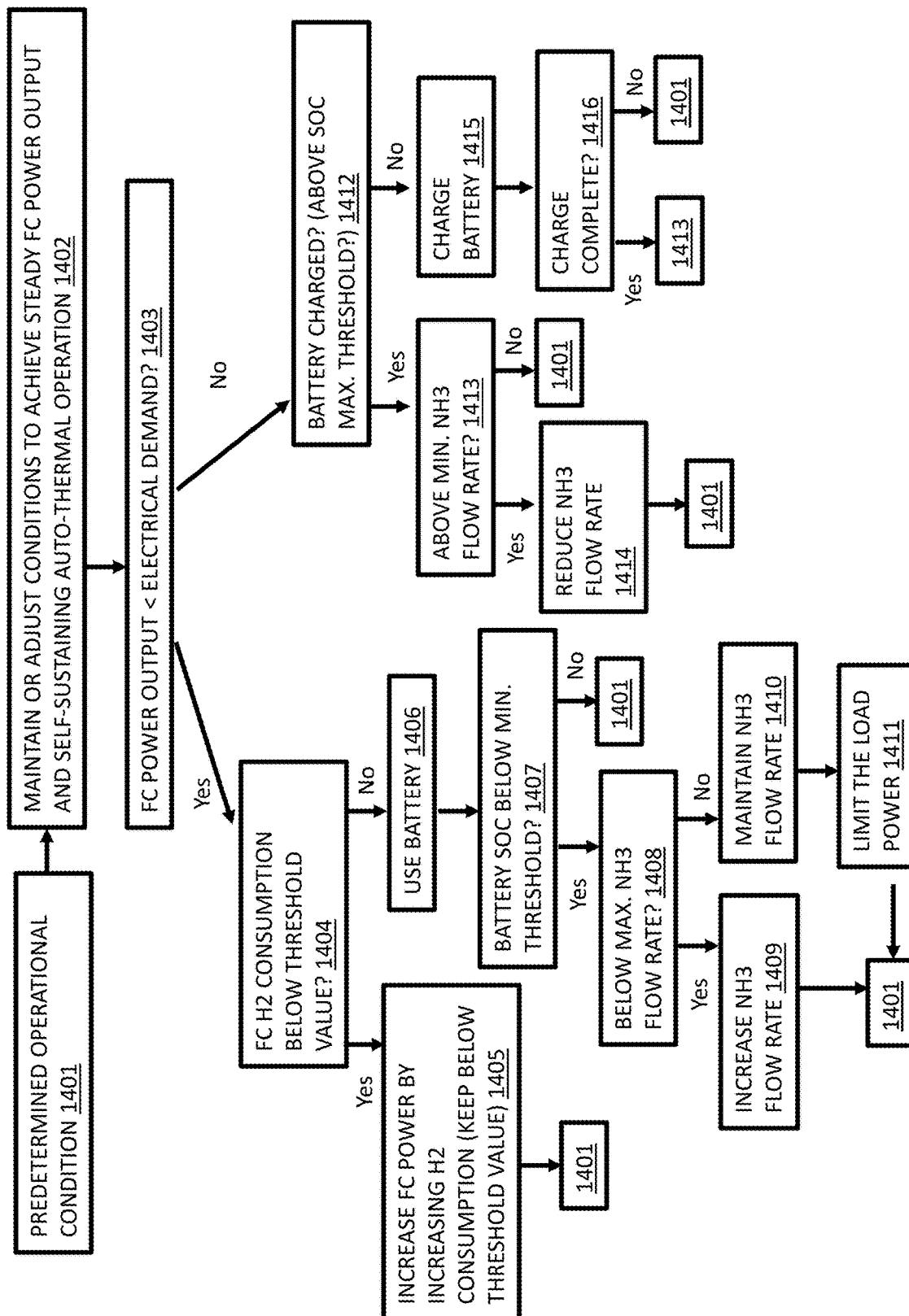

FIG. 12B is a flow chart illustrating a method of operating ammonia reforming (e.g., ammonia reforming system 100) using a battery, in accordance with one or more embodiments of the present disclosure.

At step 1401, for a set of given system operational parameters, self-sustaining auto-thermal operational conditions may be predetermined (e.g., minimum and maximum NH$_3$ flow rates, corresponding FC power and hydrogen consumption rates, minimum and maximum battery states of charge (SOC), minimum and maximum air flow rates, etc.).

At step 1402, operational parameters may be maintained and/or adjusted to maintain and/or adjust fuel cell power output (and self-sustained autothermal reforming).

At step 1403, the method may comprise monitoring the power output of the fuel cell, and automatically or manually adjusting (increasing or decreasing) the power output (based on the electrical load coupled to the fuel cell). The method may adjust various operational parameters including the flow rate of the air stream to the combustion heater, the flow rate of the incoming ammonia stream, the hydrogen consumption rate of the fuel cell, and/or the electrical power to the electrical heater. In some cases, one or more controllers may control NH$_3$ flow rate, control air flow rate, control NH$_3$ flow pressures, control air flow pressures, control valves, control FC power output, control battery power output, control E-reformer power input, control FC hydrogen consumption rate, or any combination thereof. In some cases, one or more sensors may measure temperatures, pressures, fuel cell power output, battery power outputs, battery SOC, fuel cell hydrogen consumption rate, and NH$_3$ conversion efficiency.

At step 1404, based on the fuel cell power being less than the electrical load power, the method may comprise comparing the FC hydrogen consumption rate to a predetermined threshold FC hydrogen consumption rate. In some cases, the predetermined threshold FC hydrogen consumption rate may be a maximum consumption rate.

At step 1405, based on the hydrogen consumption rate being less than the predetermined threshold, the method may comprise increasing the power output of the fuel cell by increasing the hydrogen consumption rate (while still keeping the hydrogen consumption rate less than the predetermined threshold). The method may then proceed to step 1401.

At step 1406, based on the hydrogen consumption rate of the fuel cell being equal to or above the predetermined threshold, the battery may be used to provide electrical power to the electrical load.

At step 1407, the battery state of charge (SOC) may be compared to a predetermined minimum threshold.

At step 1408, based on the battery SOC being less than the predetermined minimum threshold, the flow rate of the incoming ammonia stream may be compared to a predetermined ammonia flow rate. In some cases, the predetermined ammonia flow rate may be a maximum ammonia flow rate for the system.

At step 1409, the method may comprise increasing the flow rate of the incoming ammonia stream (based on the flow rate of the incoming ammonia stream being less than the predetermined ammonia flow rate). The method may then proceed to step 1401.

At step 1410, the method may comprise maintaining the flow rate of the incoming ammonia stream (based on the flow rate of the incoming ammonia stream being equal to or greater than the predetermined ammonia flow rate).

At step 1411, the method may comprise limiting an electrical load associated with the power demand. The method may then proceed to step 1401.

At step 1412, the method may comprise decreasing the power output of the fuel cell, and comparing a battery SOC to a predetermined threshold.

At step 1413, based on the battery SOC being equal to or greater than the predetermined threshold, the method may comprise comparing the flow rate of the incoming ammonia stream to a predetermined ammonia flow rate. In some cases, the predetermined ammonia flow rate may be a minimum ammonia flow rate. Based on the flow rate of the incoming ammonia stream being less than the predetermined ammonia flow rate, method may then proceed to step 1401.

In some cases, at step 1413, regardless of the flow rate of the incoming ammonia stream being equal to or greater than the minimum ammonia flow rate, method may comprise reducing the fuel cell power output and proceed to step 1401. In this way, the fuel cell power is reduced and the incoming ammonia flow rate is maintained or at least within a desired range.

At step 1414, the method may comprise reducing the flow rate of the incoming ammonia stream (based on the flow rate of the incoming ammonia stream being greater than the predetermined ammonia flow rate). The method may then proceed to step 1401.

At step 1415, based on the battery SOC being less than the predetermined threshold, the method may comprise charging the battery using electrical power generated by the fuel cell.

At step 1416, the method may comprise determining if the battery is fully charged. Based on the battery being fully charged, the method may proceed to step 1413 or step 1401. Based on the battery being less than fully charged, the method may proceed to step 1401.

In some cases, the method may comprise a shutdown process. In some cases, the shutdown process may comprise reducing any one of or a combination of ammonia flow rate, air flow rate, and fuel cell power to zero.

In some cases, the method may comprise performing or executing a hot standby mode. In some cases, performing or executing the hot standby mode may comprise reducing the ammonia flow rate, the air flow rate, and/or the fuel cell power to zero.

In some cases, by combining any of the methods illustrated in FIG. 12A-12B, the method may comprise the fuel cell providing power to the battery, and the battery may provide power for the electrical load. In some cases, the fuel cell may provide power to charge the battery, and the battery may provide power for the electrical load. In some cases, if the battery SOC is close to, equal to, or above the predetermined threshold maximum SOC, the system may execute the hot standby mode, or shut down the ammonia reforming system. In some cases, if the battery SOC falls below the threshold maximum SOC, the system may unexecute the hot standby mode and generate power from the fuel cell.

Oxidation Resistant Catalyst for Purging

FIG. 13 is a schematic diagram illustrating utilization of an oxidation-resistant catalyst 1501 to generate reformate to purge the ammonia reforming system 100 shown in FIGS. 1A-4B, in accordance with one or more embodiments of the present disclosure.

In some cases, the electrically-heated reformer 110 may comprise oxidation-resistant catalyst 1501 therein. The electrical heater 111 may heat the electrically-heated reformer 110 and the catalyst 1501 to a target temperature range (e.g., about 400-about 600° C.). The oxidation-resistant catalyst 1501 may be configured to resist oxidation at the target temperature range.

Ammonia may then be reformed at the target temperature range using the oxidation-resistant catalyst 1501 to generate a reformate stream 1502 comprising hydrogen ($H_2$) and nitrogen ($N_2$).

The reformate stream 1502 may then be provided to the reformer 108 filled with oxidation-sensitive catalyst 1503. In contrast to the oxidation-resistant catalyst 1501, the oxidation-sensitive catalyst 1503 may be sensitive to oxidation at the target temperature range (e.g., about 400-about 600° C.) and/or in an environment comprising oxygen. The reformate stream 1502 (purging gas) may purge any residual gases in the reformer 108 (e.g., residual ammonia).

It is noted that, the oxidation-resistant catalyst 1501 may be configured to generate reformate to purge residual gases in any type of reactor, and that the present disclosure is not limited to purging residual gases in the reformer 108 and/or 110. For example, the oxidation resistant catalyst 1501 may be used to generate reformate to purge a steam methane reforming (SMR) reactor, a methanol reforming reactor, or any other type of reactor.

Renewable Energy System Combining Ammonia Synthesis and Ammonia Reforming

Figure 14:
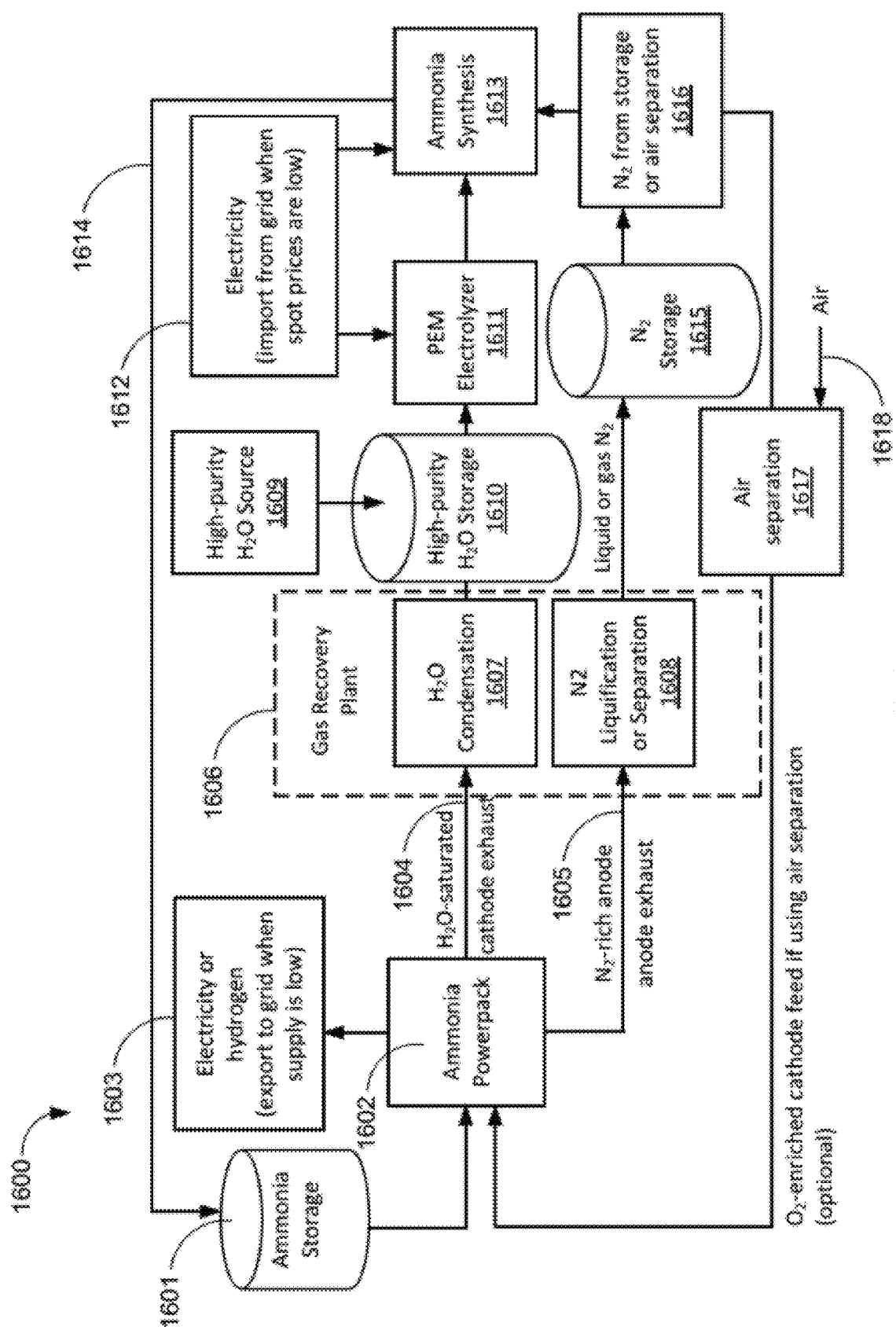
FIG. 14 is a schematic diagram illustrating a system combining ammonia synthesis and ammonia reforming, in accordance with one or more embodiments of the present disclosure.

FIG. 14 is a schematic diagram illustrating a renewable energy system 1600 combining ammonia synthesis and ammonia reforming, in accordance with one or more embodiments of the present disclosure.

A storage tank 1601 (e.g., storage tank 102) may be configured to store ammonia. An ammonia powerpack 1602 (e.g., ammonia reforming system 100) may comprise a reformer (e.g., reformers 108 and 110) configured to convert the ammonia to reformate-product hydrogen ($H_2$) and reformate-product nitrogen ($N_2$). A fuel cell may be configured to react the reformate-product $H_2$ with oxygen ($O_2$) to generate water ($H_2O$) and an electrical power output to an electrical grid.

A gas recovery module 1606 may comprise a water condenser 1607 configured to extract the $H_2O$ from a cathode exhaust 1604 of the fuel cell, and a nitrogen separator or liquefier 1608 configured to extract the reformate-product $N_2$ from an anode exhaust 1605 of the fuel cell. In some cases, the $H_2O$ may be extracted from both the cathode exhaust 1604 and the anode exhaust 1605. In some cases, the $H_2O$ may be extracted from the anode exhaust 1605. In some cases, the $N_2$ may be extracted from both the cathode exhaust 1604 and the anode exhaust 1605. In some cases, the $N_2$ may be extracted from the cathode exhaust 1604.

A water tank 1610 may be configured to store the extracted $H_2O$ and/or external $H_2O$ sourced from one or more external water sources 1609 (e.g., fresh water, distilled water, deionized water, etc.).

An electrolyzer 1611 may be configured to convert the extracted $H_2O$ and/or the external $H_2O$ (stored in the water tank 1610) to renewably-generated $H_2$ (i.e., green $H_2$) using electrical power input from the electrical grid.

An air separator 1617 may be configured to separate air 1618 (e.g., from the atmosphere) to generate air-separated $N_2$. Additionally, the air separator 1617 may be configured to generate $O_2$ for the fuel cell.

An ammonia synthesis reactor 1613 may be configured to react the renewably-generated $H_2$ and the air-separated $N_2$ to generate synthesized $NH_3$ 1614 (for example, via the Haber-Bosch process). The synthesized $NH_3$ may then be stored in the ammonia storage tank 1601 (e.g., to be reformed by the ammonia powerpack 1602). The ammonia synthesis reactor 1613 may be powered (i.e., heated) using electrical power input from the electrical grid.

In some cases, a nitrogen tank 1615 is configured to receive and store the $N_2$ from the liquefier or separator 1608, and is configured to provide the $N_2$ to the ammonia synthesis reactor 1613 to react with the renewably-generated $H_2$.

In some cases, a controller (e.g., controller 200) is operably connected to an external network (e.g., internet). The controller may be configured to determine an electricity demand of the electrical grid (e.g., using grid data received from the external network).

Based on the electricity demand being greater than a threshold electricity demand (in other words, a low supply of electricity in the electrical grid), the fuel cell of the ammonia powerpack 1602 may be directed to react the reformate-product $H_2$ with $O_2$ to generate $H_2O$, and output 1603 electricity to the electrical grid. In some cases, instead of outputting 1603 electricity to the electrical grid, the ammonia powerpack 1602 may export 1603 hydrogen to an external recipient.

In some cases, based on the electricity demand being less than a threshold electricity demand (in other words, a high supply of electricity in the electrical grid), the electrolyzer 1611 may be directed to convert the extracted $H_2O$ and/or the external $H_2O$ into the renewably-generated $H_2$ using the input electricity from the electrical grid, and/or the ammonia synthesis reactor 1613 may be directed to react the renewably-generated $H_2$ and the air-separated $N_2$ (and/or the reformate-product $N_2$) to synthesize the ammonia 1614.

In some cases, the electrical power output of the fuel cell(s) is at least about 1 kilowatt (kW) to at most about 100 megawatt (MW). In some cases, the electrical power output of the fuel cell(s) is at least about 1 kW, 5 kW, 10 kW, 50 kW, 100 kW, 500 kW, 1 MW, 5 MW, 10 MW, 50 MW, or 100 MW. In some cases, the electrical power output of the fuel cell(s) is at most about 1 kW, 5 kW, 10 kW, 50 kW, 100 kW, 500 kW, 1 MW, 5 MW, 10 MW, 50 MW, or 100 MW. In some cases, the electrical power output of the fuel cell(s) is between about 1 kW and 100 MW, 5 kW and 50 MW, 10 kW and 10 MW, 50 kW and 5 MW, 100 kW and 1 MW, or 500 kW and 100 MW. The renewable energy system may comprise a start-up time of at least about 10 minutes to at most about 3 hours, a steady operation time (e.g., of the powerpack 1602, the electrolyzer 1611 and/or the ammonia synthesis reactor 1613) of at least about 10 minutes to at most about 50 hours, and a shut-down time of at least about 10 min to at most about three hours. In some cases, the start-up time is at least about 10 min, 0.5, 1, 1.5, 2, 2.5, or 3 hours. In some cases, the start-up time is at most about 10 min, 0.5, 1, 1.5, 2, 2.5, or 3 hours. In some cases, the start-up time is between about 10 minutes and about 3 hours, between about 0.5 hours and about 2.5 hours, between about 1 hour and about 2 hours, or between about 1.5 hours and 3 hours. In some cases, the steady operation time is at least about 10 minutes, 0.5, 1, 5, 10, 15, 20, 25, 30, 35, 40, 45, or 50 hours. In some cases, the steady operation time is at most about 10 minutes, 0.5, 1, 5, 10, 15, 20, 25, 30, 35, 40, 45, or 50 hours. In some cases, the steady operation time is between about 10 minutes and 50 hours, 30 minutes and 45 hours, 1 hour and 40 hours, 5 hours and 35 hours, 10 hours and 30 hours, 15 hours and 25 hours, 20 hours and 50 hours. In some cases, the shut-down time is at least about 10 min, 0.5, 1, 1.5, 2, 2.5, or 3 hours. In some cases, the shut-down time is at most about 10 min, 0.5, 1, 1.5, 2, 2.5, or 3 hours. In some cases, the shut-down time is between about 10 minutes and 3 hours, 30 minutes and 2.5 hours, 1 hour and 2 hours, or 1.5 hours and 3 hours. The electrical grid may preferably be provided with electricity from a zero-carbon or carbon-neutral source, for example, solar energy, wind energy, geothermal energy, hydroelectric energy, and/or nuclear energy.

Multi-Stage Ammonia Filter

Figure 15A:
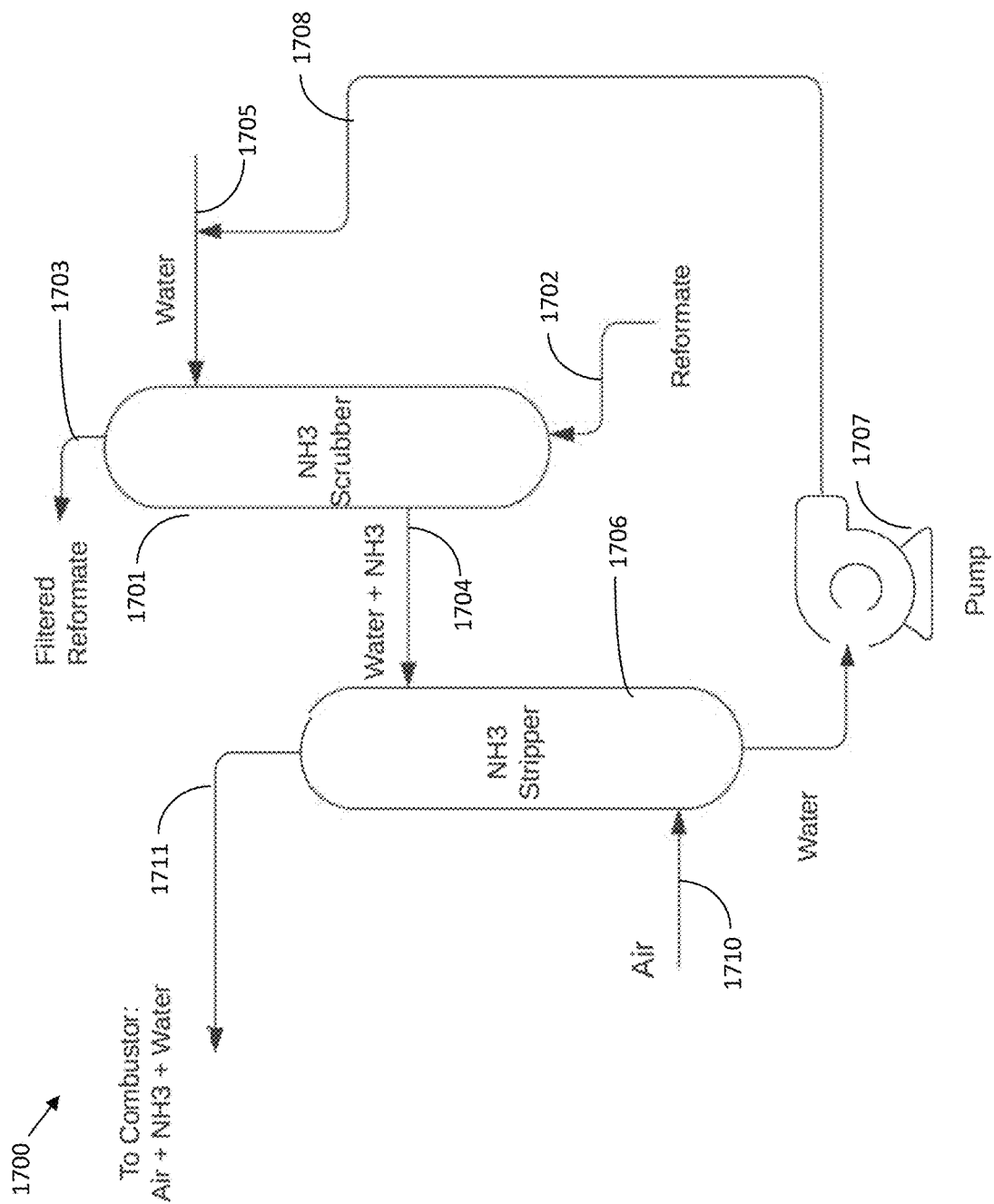
FIG. 15A is a schematic diagram illustrating a multi-stage ammonia filter, in accordance with one or more embodiments of the present disclosure.
Figure 15B:
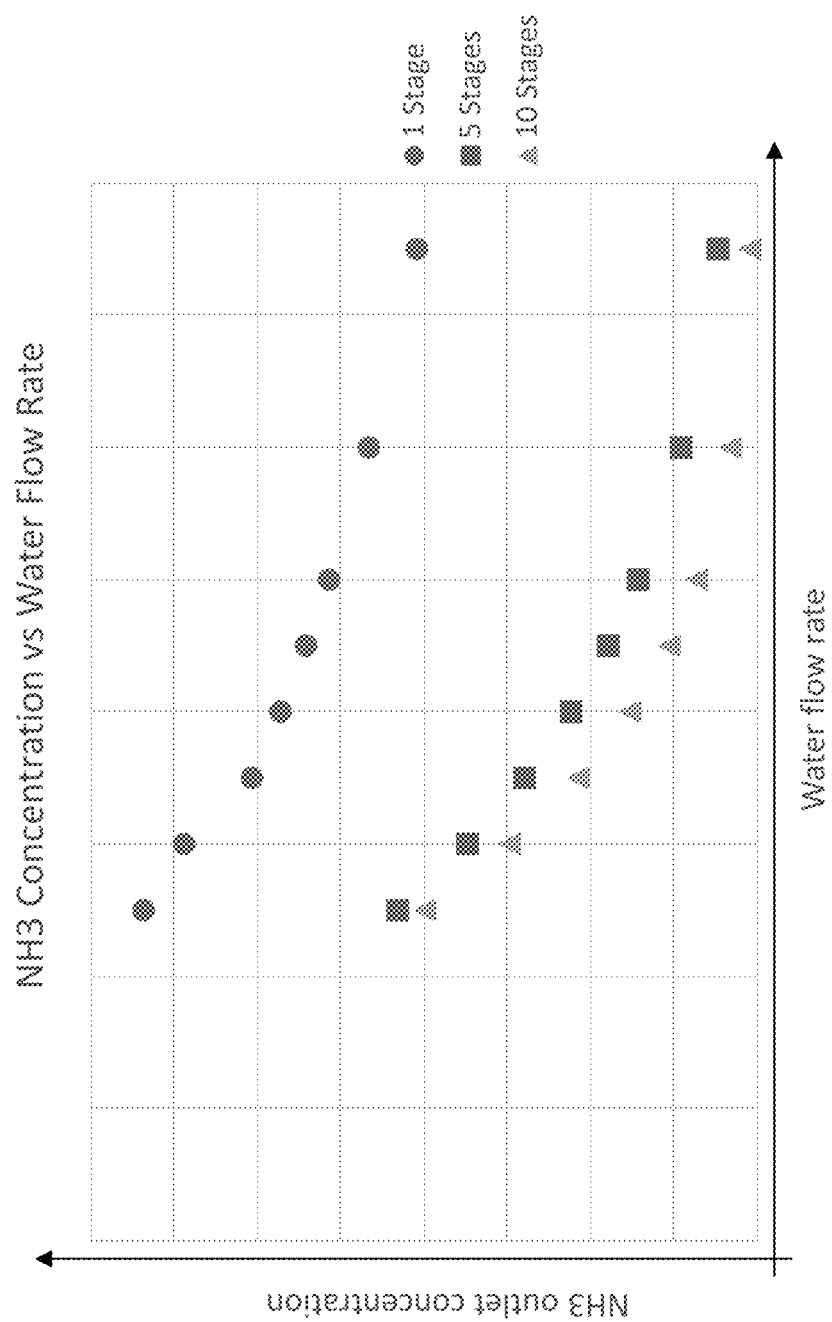
FIG. 15B is a plot illustrating performance calculation data of the multi-stage ammonia filter shown in FIG. 15A, in accordance with one or more embodiments of the present disclosure.

FIG. 15A is a schematic diagram illustrating a multi-stage ammonia filter 1700, in accordance with one or more embodiments of the present disclosure. FIG. 15B is a plot illustrating performance calculation data of a multi-stage ammonia filter 1700 at different stage numbers and water flow rates, in accordance with one or more embodiments of the present disclosure.

An ammonia scrubber 1701 may be configured to remove ammonia from a reformate stream 1702 (e.g., reformate stream 120) comprising at least $H_2$, $N_2$, and trace or residual $NH_3$ (e.g., at an ammonia concentration of about 10,000 ppm or greater). A filtered reformate stream 1703 (e.g., filtered reformate stream 123) may be output from the scrubber 1701 with the trace or residual $NH_3$ reduced (e.g., to an ammonia concentration less than about 500 ppm). The filtered reformate stream 1703 may be subsequently directed to a combustion heater (e.g., combustion heater 109) or to a fuel cell (e.g., fuel cell 124).

The ammonia scrubber 1701 may comprise one or more equilibrium stages. Each of the equilibrium stages may comprise water configured to absorb the trace or residual $NH_3$. The ammonia scrubber 1701 may be configured to receive input water (e.g., water condensate 1705 from a fuel cell) and discharge output water (e.g., a mixture 1704 of water and scrubbed $NH_3$). In some cases, the input water comprises fresh water, seawater, distilled water, and/or deionized water.

The discharged output water may be provided to an ammonia stripper 1706 in fluid communication with the ammonia scrubber 1701. Ammonia may be removed from the discharged output water by passing air 1710 into the discharged output water in the ammonia stripper 1706. A stripped mixture 1711 (comprising air, water, and ammonia) may then be discharged from the ammonia stripper 1706. In some cases, the stripped mixture 1711 is directed to a combustion heater (e.g., combustion heater 109).

In some instances, a pump 1707 may be configured to circulate water 1708 from the ammonia stripper 1706 to the ammonia scrubber 1701. The water 1708 may be combined with the fuel cell condensate 1705 or any other external water sources before being directed into the ammonia scrubber 1701. In this way, the multi-stage ammonia filter 1700 may be continuously regenerated (e.g., without having to replace one or more adsorbent filters), and an ammonia reforming system (e.g., ammonia reforming system 100) may be prevented from stopping (to regenerate the ammonia filter).

In some instances, increasing the number of equilibrium stages and/or the water flow rates may increase $NH_3$ absorption (and reduce $NH_3$ concentration) in the filtered reformate stream 1703 as illustrated in FIG. 15B. In some instances, the $NH_3$ concentration at the filtered reformate stream 1703 is below about 100, 500, 1000, 2000, 3000, 4000, 5000, 6000, 7000, 8000, or 9000 parts per million (ppm). In some instances, the $NH_3$ concentration at the filtered reformate stream 1703 is at most about 100, 500, 1000, 2000, 3000, 4000, 5000, 6000, 7000, 8000, or 9000 ppm. In some instances, the $NH_3$ concentration at the filtered reformate stream 1703 is at least about 100, 500, 1000, 2000, 3000, 4000, 5000, 6000, 7000, 8000, or 9000 ppm. In some instances, the $NH_3$ concentration at the filtered reformate stream 1703 is between about 100 and 9000, 500 and 8000, 1000 and 7000, 2000 and 6000, 3000 and 5000, or 4000 and 9000 ppm. In some instances, the equilibrium stages in the ammonia scrubber may be at least 1, 2, 3, 4, 5, 6, 7, 8, 9, 10, 15, or 20 stages. In some instances, the equilibrium stages in the ammonia scrubber may be at most 1, 2, 3, 4, 5, 6, 7, 8, 9, 10, 15, or 20 stages. In some instances, the water flow rate may be at least about 1, 2, 4, 6, 8, 10, 12, 14, 16, 18, 20, 25, or 30 kilogram (kg)/second (s). In some instances, the water flow rate may be at most about 1, 2, 4, 6, 8, 10, 12, 14, 16, 18, 20, 25, or 30 kg/s. In some instances, the water flow rate may be between about 1 and 30, 2 and 25, 4 and 20, 6 and 18, 8 and 16, 10 and 14, or 12 and 30 kg/s.

Computer Systems

Figure 16:
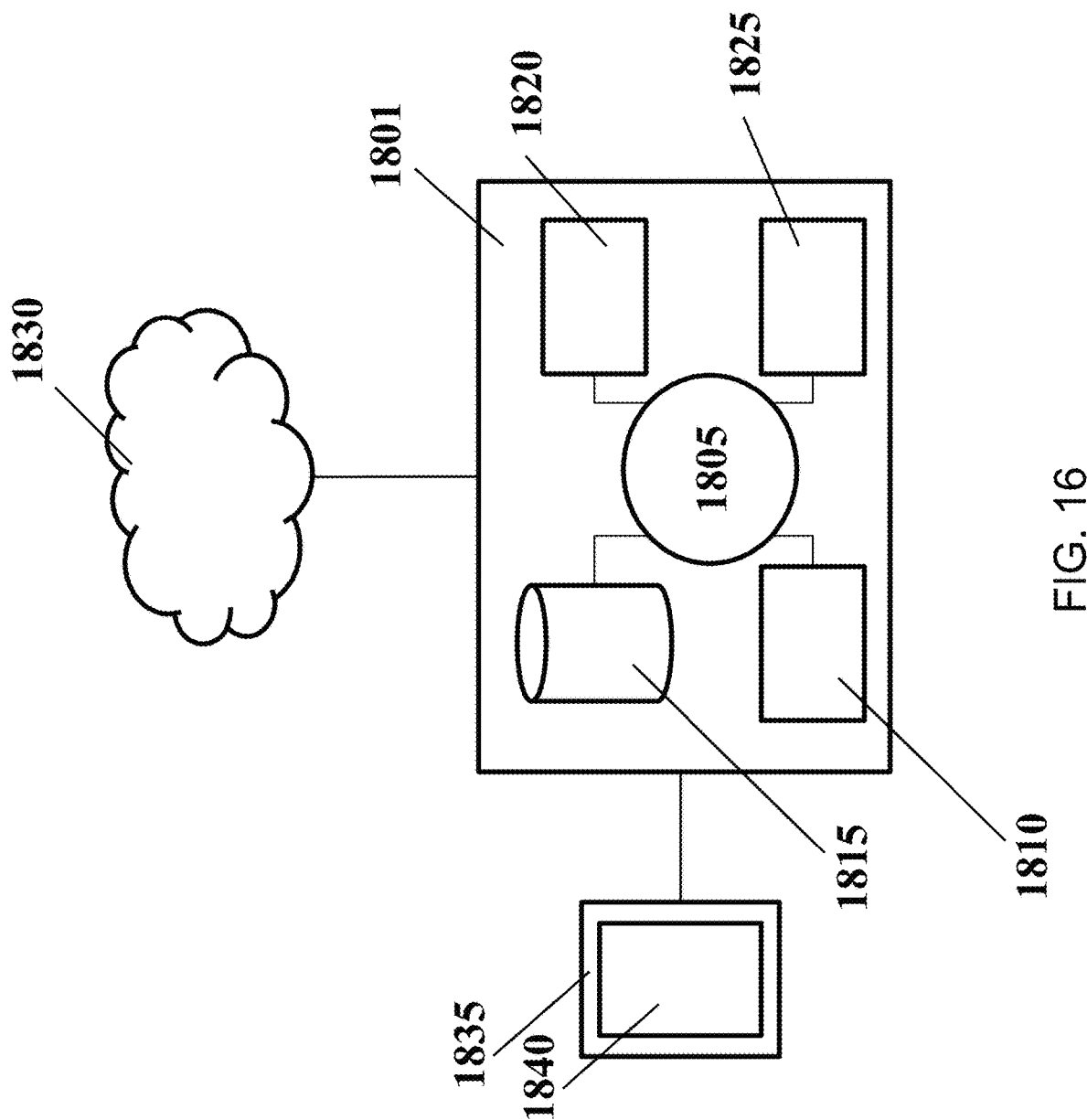
FIG. 16 is a block diagram illustrating a computer system that is programmed or otherwise configured to implement methods and systems provided herein.

The present disclosure provides computer systems (e.g., controllers, computing devices and/or computers) that are programmed to implement methods of the disclosure. FIG. 16 shows a computer system 1801 that is programmed or otherwise configured to control the systems disclosed herein. The computer system 1801 can regulate various aspects of the systems disclosed in the present disclosure. The computer system 1801 can be an electronic device of a user or a computer system that is remotely located with respect to the electronic device. The electronic device can be a mobile electronic device.

The computer system 1801 includes a central processing unit (CPU, also "processor" and "computer processor" herein) 1805, which can be a single core or multi core processor, or a plurality of processors for parallel processing. The computer system 1801 also includes memory or memory location 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The computer system 1801 can be operatively coupled to a computer network ("network") 1830 with the aid of the communication interface 1820. The network 1830 can be the Internet, an internet and/or extranet, or an intranet and/or extranet that is in communication with the Internet. The network 1830 in some cases is a telecommunication and/or data network. The network 1830 can include one or more computer servers, which can enable distributed computing, such as cloud computing. The network 1830, in some cases with the aid of the computer system 1801, can implement a peer-to-peer network, which may enable devices coupled to the computer system 1801 to behave as a client or a server.

The CPU 1805 can execute a sequence of machine-readable instructions, which can be embodied in a program or software. The instructions may be stored in a memory location, such as the memory 1810. The instructions can be directed to the CPU 1805, which can subsequently program or otherwise configure the CPU 1805 to implement methods of the present disclosure. Examples of operations performed by the CPU 1805 can include fetch, decode, execute, and writeback.

The CPU 1805 can be part of a circuit, such as an integrated circuit. One or more other components of the system 1801 can be included in the circuit. In some cases, the circuit is an application specific integrated circuit (ASIC).

The storage unit 1815 can store files, such as drivers, libraries and saved programs. The storage unit 1815 can store user data, e.g., user preferences and user programs. The computer system 1801 in some cases can include one or more additional data storage units that are external to the computer system 1801, such as located on a remote server that is in communication with the computer system 1801 through an intranet or the Internet.

The computer system 1801 can communicate with one or more remote computer systems through the network 1830. For instance, the computer system 1801 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1801 via the network 1830.

Methods as described herein can be implemented by way of machine (e.g., computer processor) executable code stored on an electronic storage location of the computer system 1801, such as, for example, on the memory 1810 or electronic storage unit 1815. The machine executable or machine readable code can be provided in the form of software. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1801 can include or be in communication with an electronic display 1835 that comprises a user interface (UI) 1840 for providing. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1805.

It is noted that the computer system 1801 may be substantially similar or substantially identical to the controller 200 described with respect to FIGS. 5A and 5I. For example, the processor(s) 202 may be substantially similar or substantially identical to the central processing unit 1805, and the memory 204 may be substantially similar or substantially identical to the memory 1810.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for reforming ammonia, comprising:
   a. directing ammonia to a reformer at an ammonia flow rate to produce a reformate stream comprising hydrogen and nitrogen;
   b. combusting a first portion of the reformate stream with oxygen at an oxygen flow rate in a combustion heater to heat the reformer;
   c. processing a second portion of the reformate stream in a hydrogen processing module;
   d. measuring a temperature in the reformer or the combustion heater;
   e. performing one or more of the following steps in response to the measured temperature being outside of a target temperature range of the reformer or the combustion heater to adjust the measured temperature to be within the target temperature range:
      i. changing the ammonia flow rate;
      ii. changing the oxygen flow rate;
      iii. changing a percentage of the reformate stream that is the second portion of the reformate stream;
      iv. changing a percentage of the reformate stream that is the first portion of the reformate stream; or
      v. changing a percentage of the reformate stream that is vented or flared out of the combustion heater; and
   f. repeatedly performing one or more of (i)-(v) by an amount that is based at least in part on a temperature difference, wherein the temperature difference is between a temperature measured in the reformer or the combustion heater and a set point temperature within the target temperature range.

2. The method of claim 1, wherein the hydrogen processing module is a fuel cell.

3. The method of claim 1, wherein the reformer comprises an ammonia reforming catalyst.

4. The method of claim 1, wherein at least two of (i)-(v) are performed.

5. The method of claim 1, wherein at least three of (i)-(v) are performed.

6. The method of claim 1, wherein all of (i)-(v) are performed.

7. The method of claim 1, wherein the temperature is measured using a temperature sensor.

8. The method of claim 1, wherein the measured temperature is communicated to a controller.

9. The method of claim 1, wherein one or more of (i)-(v) are performed with the aid of a controller.

10. The method of claim 1, wherein at least one of (iii)-(v) are performed using a flow control module.

11. The method of claim 1, wherein at least one of (iii)-(v) are performed by changing the second portion of the reformate stream processed in the hydrogen processing module.

12. The method of claim 1, comprising:
   based at least in part on the measured temperature being greater than the target temperature range, performing one or more of:
   a. increasing the ammonia flow rate;
   b. decreasing the oxygen flow rate;
   a. increasing the percentage of the reformate stream that is the second portion of the reformate stream that is processed by the hydrogen processing module;
   b. decreasing the percentage of the reformate stream that is the first portion of the reformate stream; or
   c. increasing the percentage of the reformate stream that is vented or flared out of the combustion heater.

13. The method of claim 12, wherein increasing the percentage of the reformate stream that is the second portion of the reformate stream decreases the first portion of the reformate stream that is combusted.

14. The method of claim 13, wherein the hydrogen processing module is a fuel cell, and the first portion of the reformate stream comprises an anode off-gas that is directed from the fuel cell to the combustion heater.

15. The method of claim 12, wherein decreasing the percentage of the reformate stream that is the first portion comprises decreasing the ammonia flow rate to the reformer to produce less hydrogen in the reformate stream.

16. The method of claim 12, wherein the hydrogen processing module is a fuel cell, and increasing the percentage of the reformate stream that is the second portion that is processed by the hydrogen processing module increases an amount of power output by the fuel cell.

17. The method of claim 1, comprising:
   based at least in part on the measured temperature being less than the target temperature range, performing one or more of:
   a. decreasing the ammonia flow rate
   b. increasing the oxygen flow rate;
   a. decreasing the percentage of the reformate stream that is the second portion of the reformate stream that is processed by the hydrogen processing module;
   b. increasing the percentage of the reformate stream that is the first portion of the reformate stream; or
   c. decreasing the percentage of the reformate stream that is vented or flared out of the combustion heater.

18. The method of claim 17, wherein decreasing the percentage of the reformate stream that is the second portion increases the first portion of the reformate stream that is combusted.

19. The method of claim 18, wherein the hydrogen processing module is a fuel cell, and the first portion of the reformate stream comprises an anode off-gas that is directed from the fuel cell to the combustion heater.

20. The method of claim 17, wherein increasing the percentage of the reformate stream that is the first portion comprises increasing the ammonia flow rate to the reformer to produce more hydrogen in the reformate stream.

21. The method of claim 17, wherein the hydrogen processing module is a fuel cell, and decreasing the percentage of the reformate stream that is the second portion processed by the hydrogen processing module decreases an amount of power output by the fuel cell.

22. The method of claim 1, wherein one or more of (i)-(v) are changed by a proportional factor.

23. The method of claim 22, wherein the proportional factor is different for each of (i)-(v).

24. The method of claim 1, wherein (f) is repeated until the measured temperature is within the target temperature range.

25. The method of claim 1, wherein at least part of the first portion is directed from the reformer to the combustion heater without being directed to the hydrogen processing module.

26. A method for reforming ammonia, comprising:
a. directing ammonia to a reformer at an ammonia flow rate to produce a reformate stream comprising hydrogen and nitrogen;
b. combusting a first portion of the reformate stream with oxygen at an oxygen flow rate in a combustion heater to heat the reformer;
c. processing a second portion of the reformate stream in a hydrogen processing module;
d. measuring a temperature in the reformer or the combustion heater;
e. performing one or more of the following steps in response to the measured temperature being outside of a target temperature range of the reformer or the combustion heater to adjust the measured temperature to be within the target temperature range:
  i. changing the ammonia flow rate;
  ii. changing the oxygen flow rate;
  iii. changing a percentage of the reformate stream that is the second portion of the reformate stream;
  iv. changing a percentage of the reformate stream that is the first portion of the reformate stream; or
  v. changing a percentage of the reformate stream that is vented or flared out of the combustion heater;
wherein the temperature measured in the reformer or the combustion heater is a first temperature that is measured at a first time point;
f. at second time point subsequent to the first time point, measuring a second temperature of the reformer or the combustion heater;
g. calculating a time period between the first time point and the second time point;
h. calculating a temperature difference between the first temperature and the second temperature; and
j. changing one or more of (i)-(v) by an amount that is based at least in part on the time period and the temperature difference.

27. The method of claim 26, wherein the hydrogen processing module is a fuel cell.

28. The method of claim 26, wherein the reformer comprises an ammonia reforming catalyst.

29. The method of claim 26, wherein at least two of (i)-(v) are performed.

30. The method of claim 26, wherein at least three of (i)-(v) are performed.

31. The method of claim 26, wherein all of (i)-(v) are performed.

32. The method of claim 26, wherein the temperature is measured using a temperature sensor.

33. The method of claim 26, wherein the measured temperature is communicated to a controller.

34. The method of claim 26, wherein one or more of (i)-(v) are performed with the aid of a controller.

35. The method of claim 26, wherein at least one of (iii)-(v) are performed using a flow control module.

36. The method of claim 26, wherein at least one of (iii)-(v) are performed by changing the second portion of the reformate stream processed in the hydrogen processing module.

37. The method of claim 26, comprising:
based at least in part on the measured temperature being greater than the target temperature range, performing one or more of:
  a. increasing the ammonia flow rate;
  b. decreasing the oxygen flow rate;
  c. increasing the percentage of the reformate stream that is the second portion of the reformate stream that is processed by the hydrogen processing module;
  d. decreasing the percentage of the reformate stream that is the first portion of the reformate stream; or
  e. increasing the percentage of the reformate stream that is vented or flared out of the combustion heater.

38. The method of claim 37, wherein increasing the percentage of the reformate stream that is the second portion of the reformate stream decreases the first portion of the reformate stream that is combusted.

39. The method of claim 38, wherein the hydrogen processing module is a fuel cell, and the first portion of the reformate stream comprises an anode off-gas that is directed from the fuel cell to the combustion heater.

40. The method of claim 37, wherein decreasing the percentage of the reformate stream that is the first portion comprises decreasing the ammonia flow rate to the reformer to produce less hydrogen in the reformate stream.

41. The method of claim 37, wherein the hydrogen processing module is a fuel cell, and increasing the percentage of the reformate stream that is the second portion that is processed by the hydrogen processing module increases an amount of power output by the fuel cell.

42. The method of claim 26, comprising:
based at least in part on the measured temperature being less than the target temperature range, performing one or more of:
  a. decreasing the ammonia flow rate
  b. increasing the oxygen flow rate;
  c. decreasing the percentage of the reformate stream that is the second portion of the reformate stream that is processed by the hydrogen processing module;
  d. increasing the percentage of the reformate stream that is the first portion of the reformate stream; or
  e. decreasing the percentage of the reformate stream that is vented or flared out of the combustion heater.

43. The method of claim 42, wherein decreasing the percentage of the reformate stream that is the second portion increases the first portion of the reformate stream that is combusted.

44. The method of claim 43, wherein the hydrogen processing module is a fuel cell, and the first portion of the reformate stream comprises an anode off-gas that is directed from the fuel cell to the combustion heater.

45. The method of claim 42, wherein increasing the percentage of the reformate stream that is the first portion comprises increasing the ammonia flow rate to the reformer to produce more hydrogen in the reformate stream.

46. The method of claim 42, wherein the hydrogen processing module is a fuel cell, and decreasing the percentage of the reformate stream that is the second portion processed by the hydrogen processing module decreases an amount of power output by the fuel cell.

47. The method of claim 26, further comprising repeating (f)-(j) until the measured temperature is within the target temperature range.

48. The method of claim 26, wherein at least part of the first portion is directed from the reformer to the combustion heater without being directed to the hydrogen processing module.

* * * * *